US008944662B2

(12) United States Patent
Thompson et al.

(10) Patent No.: US 8,944,662 B2
(45) Date of Patent: Feb. 3, 2015

(54) DIFFRACTIVE LUMINAIRES

(75) Inventors: David S. Thompson, West Lakeland, MN (US); Zhaohui Yang, North Oaks, MN (US); Matthew S. Stay, Saint Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 309 days.

(21) Appl. No.: 13/572,835

(22) Filed: Aug. 13, 2012

(65) Prior Publication Data
US 2014/0043856 A1 Feb. 13, 2014

(51) Int. Cl.
*F21V 8/00* (2006.01)

(52) U.S. Cl.
USPC .......................................... 362/613; 362/619

(58) Field of Classification Search
USPC .................... 362/612, 616, 618, 619
See application file for complete search history.

(56) References Cited

U.S. PATENT DOCUMENTS

| | | | |
|---|---|---|---|
| 4,082,415 A | 4/1978 | Brooks | |
| 4,550,973 A | 11/1985 | Hufnagel | |
| 5,537,245 A | 7/1996 | Migozzi | |
| 5,543,228 A | 8/1996 | Taniguchi | |
| 5,703,667 A | 12/1997 | Ochiai | |
| 6,773,126 B1 | 8/2004 | Hatjasalo | |
| 7,688,511 B2 | 3/2010 | Komatsu | |
| 7,768,685 B2 | 8/2010 | Hoshino | |
| 2004/0130879 A1 | 7/2004 | Choi | |
| 2004/0156182 A1 | 8/2004 | Hatjasalo | |
| 2005/0088545 A1* | 4/2005 | Ito | 348/239 |
| 2005/0111814 A9 | 5/2005 | Chen | |
| 2005/0213348 A1 | 9/2005 | Parikka | |
| 2006/0279296 A1 | 12/2006 | Lee | |
| 2007/0076417 A1 | 4/2007 | Yang | |
| 2008/0037127 A1 | 2/2008 | Weber | |
| 2008/0184636 A1 | 8/2008 | Fisher | |
| 2009/0127849 A1 | 5/2009 | Kim | |
| 2009/0181484 A1 | 7/2009 | Lee | |

(Continued)

FOREIGN PATENT DOCUMENTS

| | | |
|---|---|---|
| DE | 20 2008 001 960 | 5/2008 |
| EP | 1351074 | 10/2003 |

(Continued)

OTHER PUBLICATIONS

U.S. Appl. No. 13/572,806, Yang, filed Aug. 13, 2012, for Diffractive Lighting Devices With 3-Dimensional Appearance.

(Continued)

*Primary Examiner* — David V Bruce

(57) ABSTRACT

Extended area lighting devices, which are useful e.g. as luminaires, include a light guide and diffractive surface features on a major surface of the light guide. The diffractive surface features are tailored to extract guided-mode light from the light guide. The light guides can be combined with other components and features such as light source(s) to inject guided-mode light into the light guide, light source(s) to project light through the light guide as non-guided-mode light, a framework of interconnected support members (attached to multiple such light guides), and/or a patterned low index subsurface layer that selectively blocks some guided mode light from reaching the diffractive surface features, to provide unique and useful lighting devices. Related optical devices, and optical films having diffractive features that can be used to construct such devices and light guides, are also disclosed.

25 Claims, 29 Drawing Sheets

(56) References Cited

U.S. PATENT DOCUMENTS

| | | |
|---|---|---|
| 2010/0079841 A1 | 4/2010 | Levola |
| 2010/0122329 A1 | 5/2010 | Jakobsson |
| 2010/0165660 A1 | 7/2010 | Weber |
| 2010/0208349 A1 | 8/2010 | Beer |
| 2010/0208557 A1* | 8/2010 | Kuiseko et al. ............ 369/13.17 |
| 2010/0238686 A1 | 9/2010 | Weber |
| 2011/0127637 A1 | 6/2011 | Chakravarti |
| 2011/0141395 A1 | 6/2011 | Yashiro |
| 2011/0182076 A1 | 7/2011 | Sherman |
| 2011/0222295 A1 | 9/2011 | Weber |
| 2011/0242837 A1 | 10/2011 | Cornelissen |
| 2011/0274399 A1 | 11/2011 | Ben Bakir |
| 2011/0279997 A1 | 11/2011 | Weber |
| 2012/0057235 A1 | 3/2012 | Chang |
| 2012/0098421 A1 | 4/2012 | Thompson |
| 2012/0099323 A1 | 4/2012 | Thompson |
| 2012/0113678 A1* | 5/2012 | Cornelissen et al. ......... 362/607 |

FOREIGN PATENT DOCUMENTS

| | | |
|---|---|---|
| GB | 2340280 | 2/2000 |
| JP | 3045499 | 5/2000 |
| JP | 2000/260203 | 9/2000 |
| KR | 2009/0009443 | 9/2009 |
| KR | 20090108912 | 10/2009 |
| WO | WO 2008/053078 | 5/2008 |
| WO | WO 2008/081071 | 7/2008 |
| WO | WO 2008/144644 | 11/2008 |
| WO | WO 2008/144656 | 11/2008 |
| WO | Wo 2009/127849 | 10/2009 |
| WO | WO 2010/004187 | 1/2010 |
| WO | WO 2010/119426 | 10/2010 |
| WO | WO 2010/120422 | 10/2010 |
| WO | WO 2010/120468 | 10/2010 |
| WO | WO 2010/122329 | 10/2010 |
| WO | WO 2011/088161 | 7/2011 |
| WO | WO 2012/054320 | 4/2012 |
| WO | WO 2012/075352 | 6/2012 |
| WO | WO 2012/075384 | 6/2012 |
| WO | WO 2012/116129 | 8/2012 |
| WO | WO 2012/116199 | 8/2012 |
| WO | WO 2012/116215 | 8/2012 |
| WO | WO 2012/158414 | 11/2012 |

OTHER PUBLICATIONS

U.S. Appl. No. 13/572,813, Thompson, filed Aug. 13, 2012, for Lighting Devices with Patterned Printing of Diffractive Extraction Features.

U.S. Appl. No. 13/572,823, Yang, filed Aug. 13, 2012, for Colorful Diffractive Luminaires Providing White Light Illumination.

PCT International Search Report for PCT/US2013/053895, mailed Nov. 26, 2013.

* cited by examiner

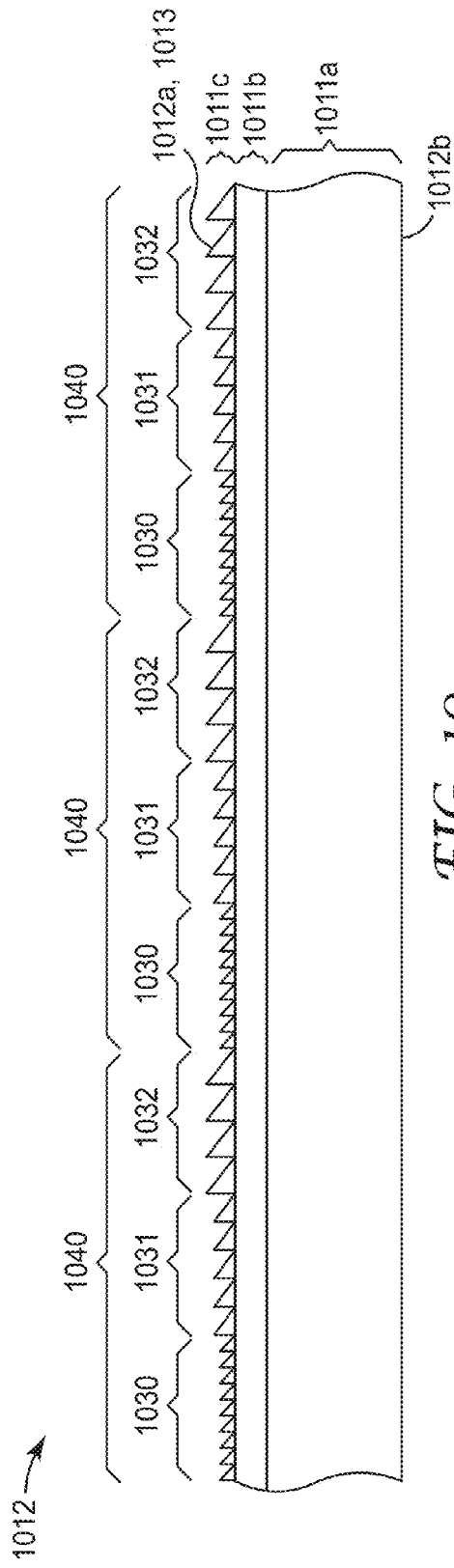
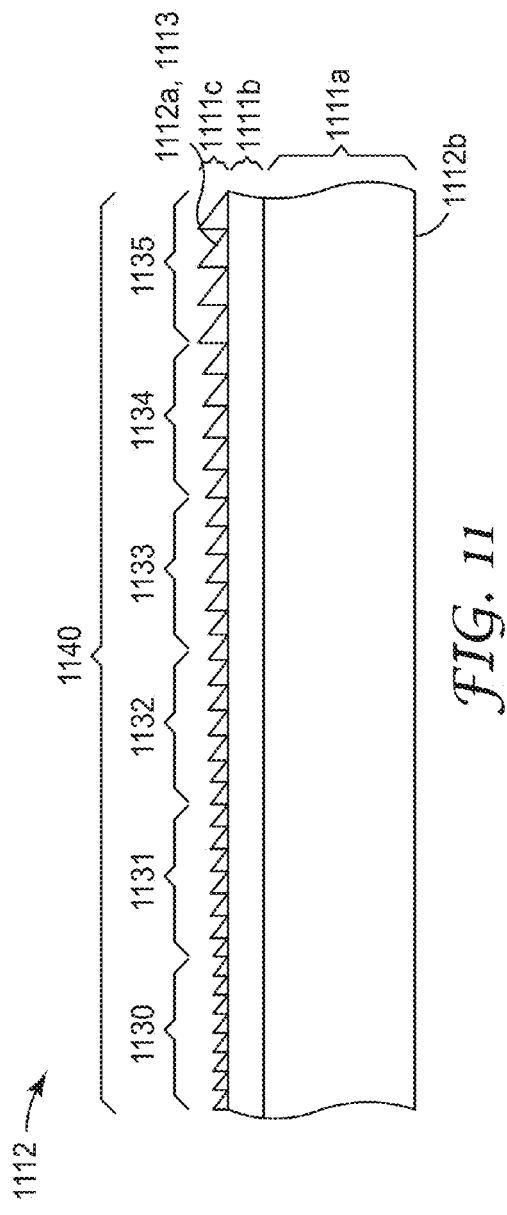
FIG. 10
FIG. 11

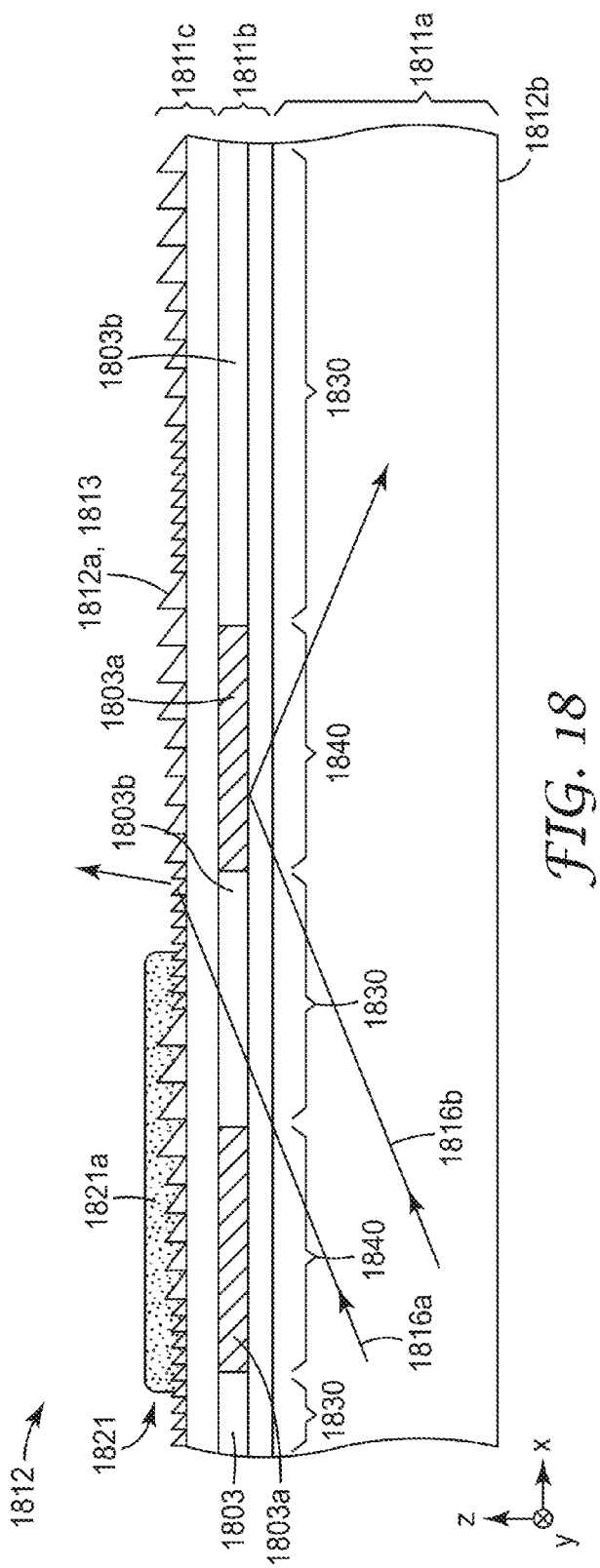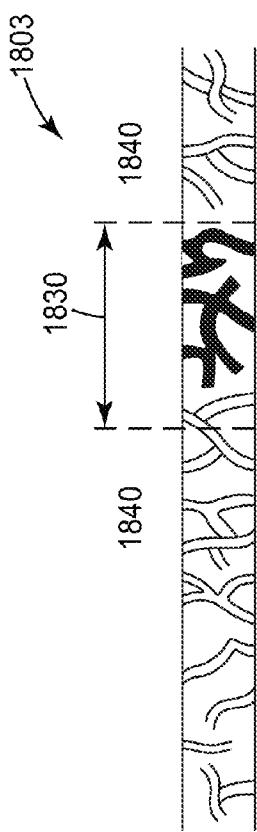
FIG. 18
FIG. 18a

DIFFRACTIVE LUMINAIRES

FIELD OF THE INVENTION

This invention relates generally to lighting devices, with particular application to lighting devices that incorporate a light guide and diffractive elements to couple guided-mode light out of the light guide. The invention also relates to associated articles, systems, and methods.

BACKGROUND

Extended area lighting devices that use a light guide to spread light from discrete edge-mounted CCFL or LED light sources over the extended area of the light guide are known. Edge-lit backlights used in liquid crystal displays (LCDs) are a major example of such lighting devices. Ordinarily, it is important for such lighting devices to have a color and brightness that are uniform, or at least slowly varying, as a function of position on the extended area output surface. It is also ordinarily important for such lighting devices to emit light of a substantially white color, so that the filtering action of the liquid crystal panel can produce full color pixels and pictures ranging from blue through red.

In order to extract guided-mode light out of the light guide, edge-lit backlights often configure a major surface of the light guide to have a printed pattern of diffusive paint or other scattering material, or to have a structured surface e.g. as provided by a series of grooves or prisms whose facets are designed to change the direction of light by refraction or reflection. It is not common to extract guided-mode light out of the light guide using diffractive grooves or prisms on the major surface, because diffraction has a strong wavelength dependence which could easily produce a highly colored appearance, and a highly colored appearance is unacceptable in most end-use applications.

BRIEF SUMMARY

We have developed a new family of extended area lighting devices that extract light from an extended light guide using diffractive surface features on a major surface of the light guide. The diffractive surface features interact with guided-mode light to couple the light out of the light guide.

The light guides can be combined with other components and features such as a light source to inject guided-mode light into the light guide, a light source to project light through the light guide as non-guided-mode light, a framework of interconnected support members (attached to multiple such light guides), and/or a patterned low index subsurface layer that selectively blocks some guided mode light from reaching the diffractive surface features, to provide unique and useful lighting devices. Related optical devices, and optical films having diffractive features that can be used to construct such devices and light guides, are also disclosed.

The lighting devices may be used as luminaires to provide general lighting or decorative lighting in an office space or other living or working environment. Alternatively, the lighting devices may be used in other applications such as security applications. The diffractive surface features used in these devices can provide low optical distortion for non-guided-mode light that propagates through the light guide, to permit viewing of objects through the light guide.

We describe herein, inter alia, lighting devices such as luminaires that include a light guide, a first light source, and a second light source. The light guide has opposed major surfaces, and at least one of the major surfaces has diffractive surface features therein adapted to couple guided-mode light out of the light guide. The first light source is configured to inject light into the light guide. The second light source is configured to project light through the light guide as non-guided-mode light.

The light guide may have a low optical distortion such that the light projected by the second light source is not substantially deviated by the light guide. The opposed major surfaces of the light guide may include a first major surface opposed to a second major surface, and the projected light from the second light source may enter the first major surface and exit the second major surface, and the diffractive surface features may be configured to couple more guided-mode light out of the second major surface than out of the first major surface.

We also disclose lighting devices such as luminaires that include a framework, a plurality of light guides, and a plurality of light sources. The framework includes a plurality of interconnected support members, and the plurality of light guides are attached to the framework. Each of the light guides has opposed major surfaces, and at least one of the major surfaces of each light guide has diffractive surface features therein adapted to couple guided-mode light out of the light guide. The plurality of light sources are disposed on and/or in the support members, and the light sources are distributed to inject light into all of the light guides.

At least some of the light guides may have a low optical distortion such that objects can be viewed through such light guides. Further, at least some of the light guides, or all of the light guides, may be substantially co-planar. In some cases, at least some of the light guides may be arranged in a helix, or may be arranged to collectively form a concave shape. In some cases, the light guides may collectively form a 3-dimensional structure that is closed and hollow.

For at least some of the light guides, the diffractive surface features may couple guided-mode light preferentially out of one of the opposed major surfaces, designated an output major surface. The output major surfaces for such light guides may face generally in a same direction, e.g., surface normal vectors of such light guides may have a scalar product that is positive.

The plurality of light sources may include light sources of substantially different first, second, and third output colors, such as red, green, and blue, and the light sources may be distributed such that at least a first one of the light guides is illuminated predominantly with light source(s) of the first output color, at least a second one of the light guides is illuminated predominantly with light source(s) of the second output color, and at least a third one of the light guides is illuminated predominantly with light source(s) of the third output color.

We also disclose lighting devices such as luminaires that include a tube-shaped light guide and a first light source configured to inject light into the light guide. The light guide has a first major surface on which diffractive surface features are formed, the diffractive surface features adapted to couple guided-mode light out of the light guide. The tube-shaped light guide may be hollow and may have two open ends and an annular-shaped side surface proximate one of the open ends. The first light source may be disposed to inject light into the annular-shaped side surface. The tube-shaped light guide may be substantially cylindrical in shape, or substantially conical in shape.

We also disclose optical devices that include a light guide and a patterned low index subsurface layer. The light guide has opposed major surfaces, and at least one of the major surfaces has diffractive surface features therein adapted to couple guided-mode light out of the light guide. The patterned low index subsurface layer is configured to selectively block some guided mode light from reaching at least some of the diffractive surface features. The patterned low index subsurface layer may include first and second layer portions, and the first layer portions may include a nanovoided polymeric material and the second layer portions may include the same nanovoided polymeric material and an additional material. Alternatively, the second layer portions may be composed of a polymer material that is not nanovoided. Furthermore, patterned low index subsurface layer may be composed of one or more polymer materials none of which are nanovoided. The optical device may include a light source disposed to inject light into the light guide.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIGS. 10 and 11 are schematic side or sectional views of light guides with diffractive surface features, the diffractive surface features including groups of surface features of different pitches;

FIGS. 18 and 19 are schematic side or sectional views of additional light guides with patterned printing, these light guides also having a patterned low index subsurface layer;

FIG. 18a is a schematic cross sectional view of an exemplary patterned low index subsurface layer;

In the figures, like reference numerals designate like elements.

DETAILED DESCRIPTION OF ILLUSTRATIVE EMBODIMENTS

As mentioned above, we have found that unique lighting devices, suitable for use for example as luminaires for general lighting or decorative lighting applications, can be made by combining an extended area light guide with other components or features, where the light guide includes diffractive surface features formed on a major surface thereof to couple guided-mode light out of the light guide. The other components and features may include one or more of: discrete and/or extended light source(s) to inject guided-mode light into the light guide; light source(s) to project light through the light guide as non-guided-mode light; a patterned low index subsurface layer that selectively blocks some guided mode light from reaching the diffractive surface features; other light guides having diffractive surface features formed thereon; a framework of interconnected support members, which may be attached to multiple such light guides and may contain light sources to inject light into the light guides; different shapes for the light guide, including curved shapes and other non-flat shapes, and hollow tubular shapes.

In some cases, out-coupled light from the light guide may exhibit a band or pattern of bands whose apparent shape changes with viewing position. The bands may have a 3-dimensional appearance for at least some viewing positions.

In some cases, a patterned light transmissive layer may be included that optically contacts some diffractive surface features but not other diffractive surface features. The patterned layer may define indicia, and the diffractive features may provide low distortion for viewing objects through the light guide such that the indicia is not readily apparent to users when guided-mode light does not propagate within the light guide.

In some cases, the diffractive surface features may include diffractive features of different pitches in non-overlapping regions of the major surface tailored to extract guided-mode light of different colors from the light guide in different directions. The diffractive features may extract light such that an ordinary user observes substantially different colors in different regions of the light guide, providing a colorful appearance. Notwithstanding this, the diffractive features may also extract light such that the lighting device illuminates a reference surface, disposed at an intermediate distance from the light guide, with illumination light that is substantially uniform in color and, if desired, substantially white.

Figure 1:
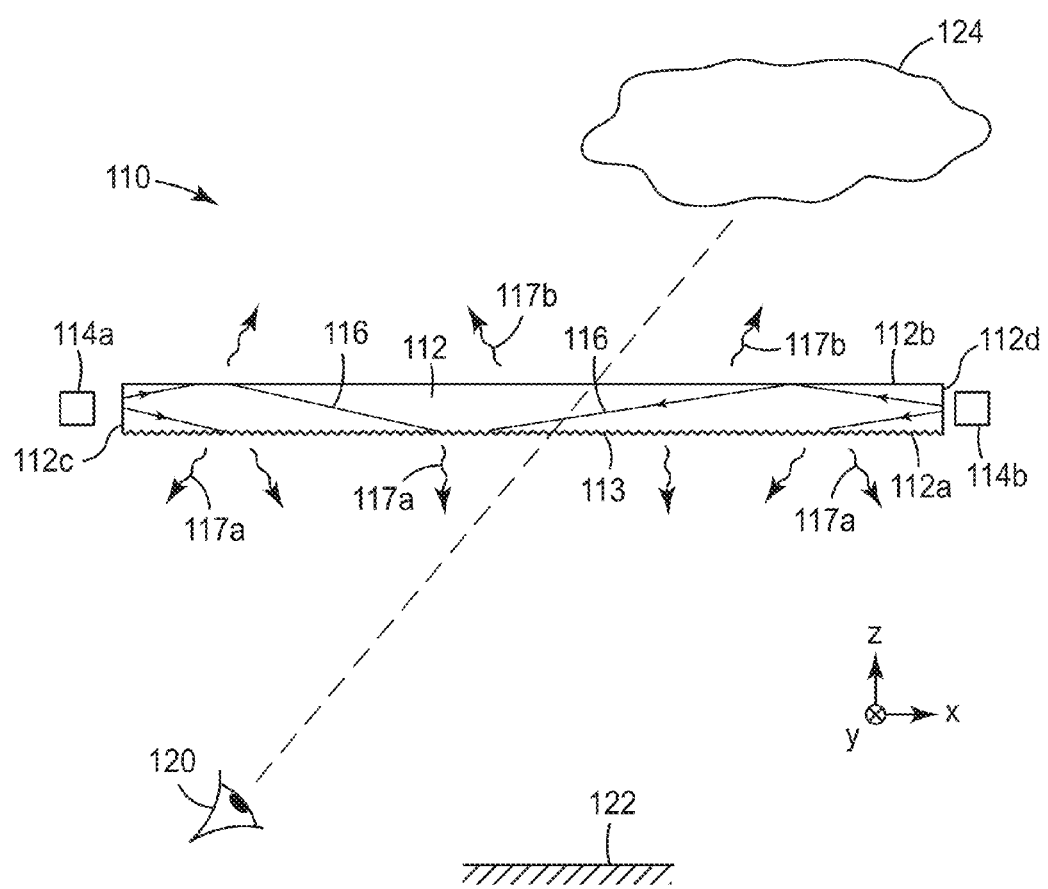
FIG. 1 is a schematic side or sectional view of a lighting device utilizing diffractive surface features on a major surface of a light guide.

An exemplary lighting device 110 is shown in schematic side or sectional view in FIG. 1. The lighting device 110 includes an extended area light guide 112 and discrete light sources 114a, 114b. The lighting device 110 may be mounted in any desired configuration but in this case it is shown mounted physically above the user 120, e.g. in or near a ceiling of a room or building. If desired, the device 110 may be designed to provide substantially uniform white light illumination on a surface 122 such as a tabletop or floor. However, when the user 120 looks directly at the device 110, the user may see a pattern of substantially different colors across the emitting area of the device 110. The pattern of colors is due at least in part to guided-mode light of different wavelengths or colors being extracted from the light guide by the diffractive surface features at different angles, or, more precisely, in different angular distributions.

When looking directly at the device 110, the user may also see one or more bands having a 3-dimensional appearance in the emitting area of the device. A given band is the result of the interaction of light emitted from one of the discrete light sources and diffractive surface features on one or both major surfaces of the light guide. Alternatively, a given band may be the result of the interaction of light reflected or absorbed by a localized region of high or low reflectivity in a non-uniform reflective structure extending along a side surface of the light guide. Details of such bands are described in commonly assigned patent application publication US 2014/0043846 (Yang et al.).

The user may also in some cases see indicia or other spatial patterns in the emitting area of the device resulting from the patterned printing of the diffractive surface features. The patterned printing provides a second light transmissive medium in optical contact with some diffractive surface features on at least one major surface of the light guide. Other diffractive surface features on the same major surface are in optical contact with a different first light transmissive medium. Details of such indicia are described in commonly assigned U.S. Pat. No. 8,834,004 (Thompson et al.).

In addition to the pattern of colors, the indicia, and the bands in the emitting area of the device, the user 120 may also observe objects such as object 124 through the light guide 112 with little or no optical distortion. Light emitted by or reflected by such objects is able to propagate through the light guide as non-guided-mode light, only a small amount of which is deflected by the diffractive surface features.

The light guide 112 is extended along two in-plane directions, shown in FIG. 1 as an x- and y-axis of a Cartesian coordinate system, so that the light guide has opposed major surfaces 112a, 112b, as well as side surfaces 112c, 112d. Diffractive surface features 113 are provided on at least one of the major surfaces of the light guide 112, such as surface 112a as shown in the figure, or in other embodiments surface 112b, or both surfaces 112a and 112b. In any case, the diffractive surface features are tailored to couple guided-mode light out of the light guide by diffraction. The guided-mode light is shown in the figure as light 116, and out-coupled light emitted from the light guide is shown as light 117a, 117b. Light 117a passes through the surface 112a in the general direction of the user 120 or surface 122, and light 117b passes through the surface 112b in the general direction away from the user 120 or surface 122. In some cases the lighting device 110 may be mounted so that the light 117b provides indirect illumination to the room, e.g. by redirecting the light 117b back into the room by reflection from the ceiling or from another reflective member.

In this regard, a reflective film or layer may be applied to all or a portion of the surface 112b, or it may be positioned near the surface 112b, so as to redirect the light 117b so it emerges from the surface 112a. The reflective film may reflect light diffusely, spectrally, or semi-spectrally, and may reflect light uniformly or non-uniformly as a function of wavelength, and it may reflect normally incident light uniformly or non-uniformly as a function of polarization. The reflective film may for example be or comprise: white paint or paints of any other color; high reflectivity mirror films, e.g., films with metal coatings such as aluminum, silver, nickel, or the like, or non-metallic mirror films such as 3M™ Vikuiti™ ESR; multilayer optical films having organic (e.g. polymeric) or inorganic constituent optical layers with a layer thickness profile tailored to reflect light over some or all of the visible spectrum at normal incidence or at another desired incidence angle; ESR films with diffuse coatings; white reflectors having glossy surfaces; reflectors with brushed metal surfaces, including films with metal coatings whose surface is roughened to provide semi-specular or diffuse reflectivity; reflectors with structured surfaces; microcavitated PET films; 3M™ Light Enhancement Films; and/or reflective polarizing films, including but not limited to Vikuiti™ Diffuse Reflective Polarizer Film (DRPF), Vikuiti™ Dual Brightness Enhancement Film (DBEF), Vikuiti™ Dual Brightness Enhancement Film II (DBEF II), and multilayer optical films having different reflectivities for normally incident light of different polarizations but an average reflectivity of greater than 50% for such normally incident light, over some or all of the visible spectrum. See also the optical films disclosed in: US 2008/0037127 (Weber), "Wide angle Mirror System"; US 2010/0165660 (Weber et al.), "Backlight and Display System Using Same"; US 2010/0238686 (Weber et al.), "Recycling Backlights With Semi-Specular Components"; US 2011/0222295 (Weber et al.), "Multilayer Optical Film with Output Confinement in Both Polar and Azimuthal Directions and Related Constructions"; US 2011/0279997 (Weber et al.), "Reflective Film Combinations with Output Confinement in Both Polar and Azimuthal Directions and Related Constructions"; WO 2008/144644 (Weber et al.), "Semi-Specular Components in Hollow Cavity Light Recycling Backlights"; and WO 2008/144656 (Weber et al.), "Light Recycling Hollow Cavity Type Display Backlight".

The light guide 112 may be physically thick or thin, but it is preferably thick enough to support a large number of guided modes and furthermore thick enough to efficiently couple to the emitting area of the discrete light sources. The light guide may, for example, have a physical thickness in a range from 0.2 to 20 mm, or from 2 to 10 mm. The thickness may be constant and uniform, or it may change as a function of position, as with a tapered or wedged light guide. If tapered, the light guide may be tapered in only one in-plane direction, e.g. either the x- or the y-axis, or it may be tapered in both principal in-plane directions.

The light guide may be substantially flat or planar, ignoring small amplitude surface variability associated with, e.g., diffractive surface structures. In some cases, however, the light guide may be non-flat, including simply curved, i.e., curved along only one principal in-plane direction, or complex curved, i.e., curved along both principal in-plane directions. The light guide may be entirely flat, entirely non-flat, or flat in some areas and non-flat in other areas. For light guides that are non-flat along a particular in-plane direction, the cross-sectional profile along such a direction may be, for example, a simple arc, or more complex non-straight contours. In some cases the light guide may deviate greatly from a flat structure, e.g., the light guide may be in the form of a solid or a hollow truncated hollow cone, wherein light injection can occur at the large end or the small end of the truncated cone, as desired.

Whether or not the light guide 112 is flat, the light guide may have an outer boundary or edge whose shape, when the light guide is seen in plan view, is curved, or piecewise flat (polygonal), or a combination of piecewise flat and curved. Examples of curved shapes are shapes with continuous arcs, such as circles, ovals, and ellipses, and shapes with discontinuous or undulating arcs, such as a sinusoid or sinusoid-like contour. Examples of piecewise flat shapes are triangles, quadrilaterals (e.g., squares, rectangles, rhombuses, parallelograms, trapezoids), pentagons, hexagons, octagons, and so forth. The piecewise flat shapes can provide a straight or flat side surface or edge for light injection from the discrete light sources, while curved shapes provide curved side surfaces for light injection.

The light guide is typically relatively rigid and self-supporting so that it does not substantially bend or deform under its own weight, but flexible light guides can also be used and may, if desired, be held in place using a support structure or frame, for example. The light guide may have a unitary construction, or it may be made from a plurality of components attached to each other with no significant intervening air gaps, e.g., a thin structured surface film attached to a flat, smooth major surface of a thicker plate using a clear optical adhesive.

The light guide may be made of any suitable low loss light-transmissive material(s), such as glasses, plastics, or combinations thereof. Materials that are low loss, e.g., low absorption and low scattering over visible wavelengths, are desirable so that guided-mode light can propagate from one side surface completely across the light guide with absorption/scattering losses that are small compared to losses due to out-coupling of such light by the diffractive surface features. Exemplary materials include suitable: glasses; acrylics; polycarbonates; polyurethanes; cyclo-olefin polymer/copolymers, including Zeonex™ and Zeonor™ materials sold by Zeon Chemicals L.P, Louisville, Ky.; silicones and elastomers; and pressure sensitive adhesives (PSAs) and other adhesives, including silicone adhesives, 3M™ VHB™ conformable acrylic foam tapes, and 3M™ OCA™ optically clear adhesives.

The device 110 also includes one or more discrete light sources 114a, 114b, which are preferably mounted at an edge or side surface of the light guide 112. The sources are discrete and small in size relative to the in-plane dimension (length or width) of the light guide. However, light sources that are discrete or limited in size need not be used, and may be replaced if desired with non-discrete light sources, including light sources whose emitting area is long and/or wide with respect to corresponding dimensions of the side surface of the light guide. The sources 114a, 114b are preferably solid state light sources such as light emitting diodes (LEDs), but other suitable light sources can also be used.

In this regard, "light emitting diode" or "LED" refers to a diode that emits light, whether visible, ultraviolet, or infrared, although in most practical embodiments the emitted light will have a peak wavelength in the visible spectrum, e.g. from about 400 to 700 nm. The term LED includes incoherent encased or encapsulated semiconductor devices marketed as "LEDs", whether of the conventional or super radiant variety, as well as coherent semiconductor devices such as laser diodes, including but not limited to vertical cavity surface emitting lasers (VCSELs). An "LED die" is an LED in its most basic form, i.e., in the form of an individual component or chip made by semiconductor processing procedures. For example, the LED die may be formed from a combination of one or more Group III elements and of one or more Group V elements (III-V semiconductor). The component or chip can include electrical contacts suitable for application of power to energize the device. Examples include wire bonding, tape automated bonding (TAB), or flip-chip bonding. The individual layers and other functional elements of the component or chip are typically formed on the wafer scale, and the finished wafer can then be diced into individual piece parts to yield a multiplicity of LED dies. The LED die may be configured for surface mount, chip-on-board, or other known mounting configurations. Some packaged LEDs are made by forming a polymer encapsulant over an LED die and an associated reflector cup. Some packaged LEDs also include one or more phosphor materials that are excited by an ultraviolet or short wavelength visible LED die, and fluoresce at one or more wavelengths in the visible spectrum. An "LED" for purposes of this application should also be considered to include organic light emitting diodes, commonly referred to as OLEDs.

Light emitted by the sources such as sources 114a, 114b is injected into the light guide to provide guided-mode light, i.e., light that is predominantly trapped in the light guide by total internal reflection (TIR), ignoring the effect of any diffractive surface features. The light emitted by each individual source is visible, and may be broad band (e.g. white) or narrow band (e.g. colored such as red, yellow, green, blue). If colored narrow band sources are used, different colors can be combined to provide an overall white light illumination on the surface 122, or the colors can be uniform, or different from each other but combined in such a way as to provide a decorative colored (non-white) illumination on the surface 122.

Diffractive surface features 113 are provided on at least one major surface of the light guide. These surface features or structures may be exposed to air, or planarized with a tangible material such as a low refractive index material, or both (some exposed to air, some planarized) in a patterned arrangement. As discussed elsewhere herein, the diffractive surface features are sized and otherwise configured to couple guided-mode light out of the light guide by diffraction, such that different wavelengths are coupled out differently, e.g. in different amounts, different directions, and different angular distributions. The diffractive surface features may be tailored so that light from the edge-mounted light sources is emitted substantially equally from both major surfaces 112a, 112b of the light guide, or instead so that the light is preferentially emitted from one of the major surfaces, such as surface 112a, which may then be designated the output surface of the light guide. In the latter case, the device may be mounted in a specific orientation so as to efficiently illuminate a room, workspace, or other surface of interest.

Although the diffractive surface features couple guided-mode light out of the light guide, the light guide and the diffractive surface features are preferably tailored so that non-guided-mode light, e.g., light originating from a source or object behind the light guide and incident on one of the major surfaces of the light guide, is minimally deviated (whether by diffraction or refraction) such that objects can be viewed through the light guide with low distortion. The low distortion may provide both aesthetic and utilitarian benefits. In FIG. 1, the distortion is low enough so that the user 120 can view and recognize the object 124 through the light guide 112. The object 124 may be the ceiling or another neighboring structure which neither generates light nor is part of the lighting device 110. Alternatively, the object 124 may generate light and may be a part of the lighting device 110, for example, it may be another edge-lit light guide with its own diffractive surface features, or it may be a more conventional light source such as a spotlight or light bulb with no diffractive surface features but connected to the light guide 112 and mounted such that most or at least some of the light it emits is directed through the light guide 112. The illumination provided by the additional light source may be direct or indirect, as shown below in connection with FIGS. 20 and 20a. Furthermore, the object 124 may be or include a graphic film disposed near or attached to the device 110.

The diffractive surface features 113 may be present over substantially all of the major surface 112a, or only a portion of the surface. If the diffractive surface features cover only certain portions of the surface, light from the edge-mounted light sources may be emitted from the light guide only in those portions.

Additional aspects of the diffractive surface features are discussed further below. In some cases, the diffractive surface features and the light sources may be tailored to yield a lighting device wherein an ordinary user of the device observes substantially different colors in different regions of the light guide, for a colorful aesthetic appearance, while at the same time providing illumination of a substantially uniform color (e.g. a uniform white color) at a reference surface of interest disposed perpendicular to an optical axis of the light guide and at an intermediate distance D from the light guide. The distance D may be expressed in terms of a characteristic in-plane dimension L of the light guide. For example, D may be at least 2*L but no more than 50*L, and L may be a maximum, minimum, or average in-plane dimension of the light guide. The distance D may additionally or alternatively be at least 0.2 meters but no more than 15 meters.

The substantially uniform color may be substantially white, or it may be another desired color. Light that is "substantially white" may refer to an area on the CIE x,y chromaticity diagram whose boundary is defined by twelve color points: (0.305, 0.265), (0.29, 0.340), (0.330, 0.382), (0.375, 0.415), (0.425, 0.440), (0.470, 0.450), (0.530, 0.450), (0.530, 0.380), (0.470, 0.375), (0.425, 0.360), (0.375, 0.335), (0.340, 0.305). The substantially different colors in different regions of the light guide may include at least two colors separated from each other on a CIE x,y chromaticity diagram by more than a first color difference. The first color difference may be 0.12, or 0.15, or 0.2. The illumination on the reference surface may have a maximum value Imax, and the substantially uniform color may be characterized over a measurement portion of the reference surface at which the illumination provides an illuminance of at least Imax/e, where e is the mathematical constant equal to the base of the natural logarithm function. For substantially uniform color, no two points within the measurement portion are separated from each other on the CIE x,y chromaticity diagram by more than a second color difference, where the second color difference is 0.08, or 0.07, or 0.06. The colorful appearance may be provided even in cases where every light source disposed to inject light into the light guide emits substantially white light. Further details of lighting devices tailored to provide uniform color illumination with a light guide having as colorful appearance are described in commonly assigned patent application publication US 2014/0043847 (Yang et al.).

In some cases, at least some of the diffractive surface features may optionally be non-straight in plan view, and light propagating within the light guide may interact with the diffractive surface features to produce at least one band that intersects the non-straight diffractive surface features. The band may be a bright band, or, in some cases, a dark band. The band changes in appearance (e.g. shape) as a function of the viewing position of an observer 120 relative to the lighting device 110. The non-straight diffractive features may be, for example, curved or segmented in shape, or may have an undulating or disjointed shape comprising curves and/or segments. However, in some cases, some or all of the diffractive surface features on one or both of the major surfaces of the light guide may be straight in plan view. Bright and/or dark bands can also be generated with the straight diffractive surface features when discrete light sources and/or discrete absorbers are used, but the shapes of such bands may not change curvature as a function of viewing position.

The lighting device 110, and the other lighting devices disclosed herein, can be used as a luminaire or similar lighting device for general illumination purposes or the like. The luminaire may be mounted in any desired position and orientation, e.g., on, within, or near a ceiling of a room, or on, within, or near a wall of a room, or mounted on a post, stand, or other support structure. The luminaire may be oriented parallel to the ceiling, or parallel to the wall, or at an oblique or intermediate angle with respect to the ceiling or wall.

Figure 2:
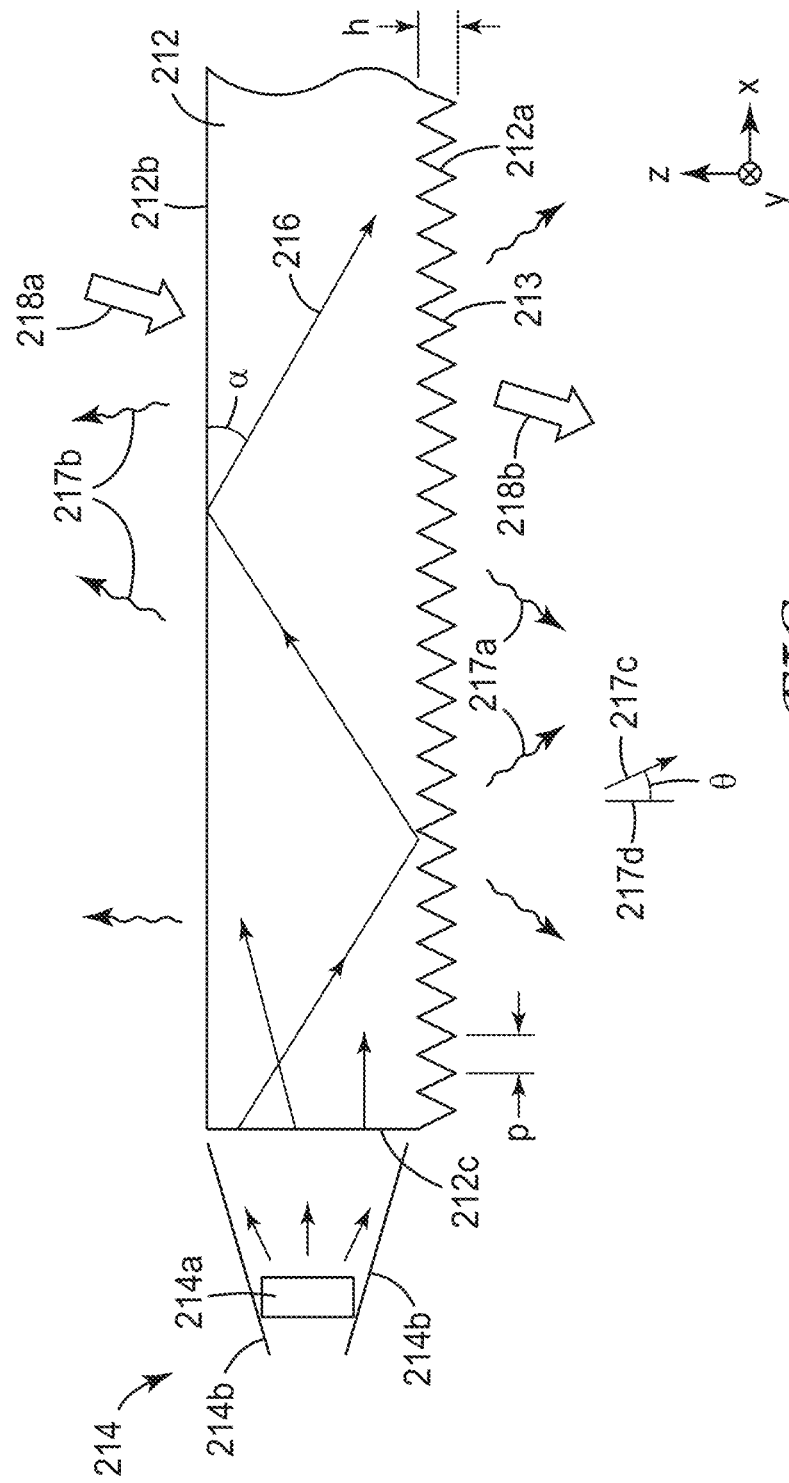
FIG. 2 is a schematic side or sectional view of a light guide with a discrete light source injecting light into the light guide and diffractive surface features coupling guided-mode light out of the light guide.

In FIG. 2, we see a schematic view of a light guide 212 with a light source such as a discrete light source 214 injecting light into the light guide, and diffractive surface features 213 coupling guided-mode light 216 out of the light guide to provide out-coupled light 217a, 217b. The light guide 212, which may be the same as or similar to the light guide 112 discussed above, has a first major surface 212a on which the diffractive surface features 213 are provided, a second major surface 212b opposite the first major surface, and a side surface 212c through which light from the light source 214 can enter the light guide. The light source 214 may include an active element 214a such as one or more LED dies which convert electricity into visible light, and one or more reflective members 214b which help direct some of the misdirected light from the element 214a into the side surface 212c of the light guide 212. Guided-mode light 216 from the light source 214 propagates via total internal reflection (TIR) along and within the light guide 212 over a range of angles α which may be measured relative to the local plane of the light guide, in this case, the x-y plane. Out-coupled light 217a, 217b may be measured or characterized, at least in part, by the polar angle θ between the direction of propagation of a given light ray 217c and an axis 217d normal to the local plane of the light guide, in this case, the z-axis. FIG. 2 also shows an incident light beam 218a impinging upon and entering the light guide 212 through the major surface 212b, propagating through the light guide 212 as non-guided-mode light, and exiting the light guide through the major surface 212a as transmitted light beam 218b. The transmitted beam 218b is preferably minimally deviated by the diffractive surface features 213 such that objects can be viewed through the light guide 212 with low distortion.

We will now elaborate on relevant design characteristics of the diffractive surface features 213 that allow them to provide some of the functional properties discussed above. Typically, the diffractive surface features 213 are grooves or ridges/prisms with well-defined faces that follow predetermined paths in plan view. For purposes of FIG. 2, we will assume for simplicity that the diffractive features 213 follow straight, linear paths that are parallel to each other and to the y-axis. This assumption is not as restrictive as it seems, because the straight, linear features can approximate a very small portion or section of diffractive surface features that follow curved paths in plan view, such as concentric circles or spiral arcs. We also assume for simplicity that the diffractive features 213 have a uniform center-to-center spacing known as "pitch", which is labeled "p" in FIG. 2. This assumption is also not as restrictive as it seems, because the uniformly spaced diffractive features 213 can approximate a very small portion or section of diffractive surface features whose pitch p changes as a function of position. The diffractive surface features 213 are also assumed to have a depth (grooves) or height (prisms) "h" as shown in FIG. 2.

The diffractive surface features 213 with the assumed linear configuration and constant pitch can be referred to as a single-pitch (or periodic) one-dimensional (1D) diffraction grating. The single-pitch 1D grating is directly coupled to, and forms the major surface 212a of, the light guide 212, which we assume has a refractive index of n and is immersed in air or vacuum. Light from the light source 214 of optical wavelength λ is injected or launched into the light guide 212 through the side surface 212c, and propagates primarily by TIR within and along the light guide as guided-mode light 216. When such light impinges upon and interacts with the diffractive surface features 213, a fraction (η) of the guided-mode light 216 is extracted as out-coupled light 217a, 217b. The out-coupled or extracted light 217a, 217b propagates along a direction that is orthogonal to the light guide surface (e.g. having a polar angle θ=0 in FIG. 2) when the following condition is met:

$$m \times (\lambda/n) = d \times \cos(\alpha). \quad (1)$$

In this equation: α refers to the angle at which the guided-mode light impinges on the grating surface, measured relative to the plane of the surface substantially as shown in FIG. 2; m is the diffraction order; n is the refractive index of the light guide 212; λ is the wavelength of light; and d is the grating pitch, which is labeled "p" in FIG. 2. For example, for green light with λ=530 nm launched on-axis (α=0 degrees) into an acrylic light guide having a refractive index n=1.5, the grating pitch d (or p) should equal 353 nm, and only the first diffraction order (m=1) is possible. For other values of α and λ, the extraction direction will in general no longer be orthogonal to the light guide surface.

A computer simulation can be used here to illustrate the angular distribution characteristics of extracted or out-coupled light as a function of the light source wavelength, for the single-pitch 1D diffraction grating. In order to fully characterize the angular distribution, both polar angle (angle θ in FIG. 2) and azimuthal angle (the angle measured in the x-y plane relative to a fixed direction or axis in the x-y plane) should be considered. For purposes of the simulation, for simplicity, we assume: that the light source 214 and the light guide 212 (including the diffractive surface features 213) extend infinitely along axes parallel to the y-axis; that the pitch d (or p) is 353 nm; and that the light source 214 has a Lambertian distribution in the x-z plane, i.e., an intensity proportional to the cosine of α, for light emitted by the light source 214 in air before impinging on the side surface 212c. After running the simulation with these assumptions, we calculate the total integrated optical power density as a function of the polar angle θ for 3 different optical wavelengths λ, and plot the results in FIG. 3. In that figure, curves 310, 312, 314 show the integrated optical power density for the optical wavelengths λ of 450 nm (blue light), 530 nm (green light), and 620 nm (red light), respectively.

Figure 3:
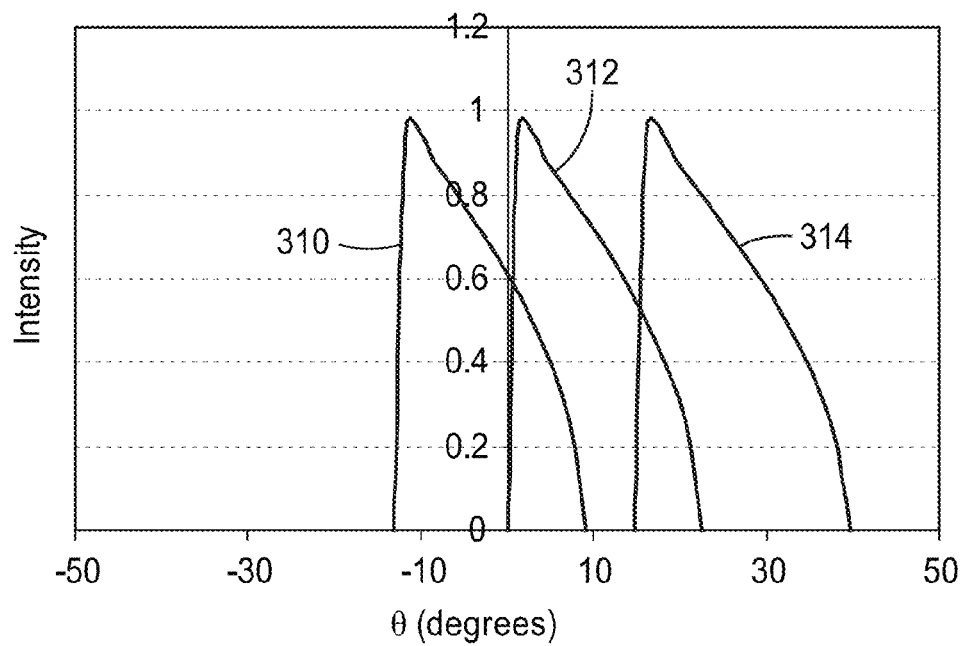
FIG. 3 is a graph of intensity versus polar angle of integrated optical power density for light extracted from a light guide using linear diffractive surface features.

The simulated results of FIG. 3 demonstrate, among other things, the wavelength-dependent nature of light extraction using diffractive surface features. Although the curves 310, 312, 314 overlap to some extent, their peak intensities occur at polar angles that differ from each other by more than 10 degrees, with the red and blue peaks being separated by almost 30 degrees. In this particular example, the peak for green light occurs close to θ=0, i.e., along a direction nearly coincident with the optical axis of the light guide. We can cause the peak for red light to coincide with the optical axis by increasing the pitch p, and we can cause the peak for blue light to coincide with the optical axis by decreasing the pitch p.

In addition to the simulation, we also fabricated a single-pitch 1D diffraction grating to demonstrate its utility as a light extractor for a light guide. First, a diamond tip for a diamond turning machine (DTM) was shaped using a focused ion beam (FIB) to form a V-shaped diamond tip with an included angle of 45 degrees. This diamond tip was then used to cut symmetric, equally spaced V-shaped grooves around the circumference of a copper roll to make a diffraction grating master tool. A cast-and-cure replication process was then used to transfer the grating pattern from the master tool to a film substrate. A triacetate cellulose (TAC) film having a thickness of 3 mils (about 76 micrometers) was used as a base film or substrate due to its low birefringence and its refractive index value (n=1.5), which matches well to the refractive index of typical light guide materials. This base film was applied to the master tool with a thin acrylate resin coating therebetween. The acrylate resin composition comprised acrylate monomers (75% by weight PHOTOMER 6210 available from Cognis and 25% by weight 1,6-hexanedioldiacrylate available from Aldrich Chemical Co.) and a photoinitiator (1% by weight Darocur 1173, Ciba Specialty Chemicals). Ultraviolet light from a mercury vapor lamp ("D" bulb) was used for both casting and post-curing the microreplicated resin on the base film. The casting roll temperature was set at 130 degrees F. (54 degrees C.), and the nip pressure was set at 20 to 25 psi (about 138,000 to 172,000 pascals).

Figure 4:
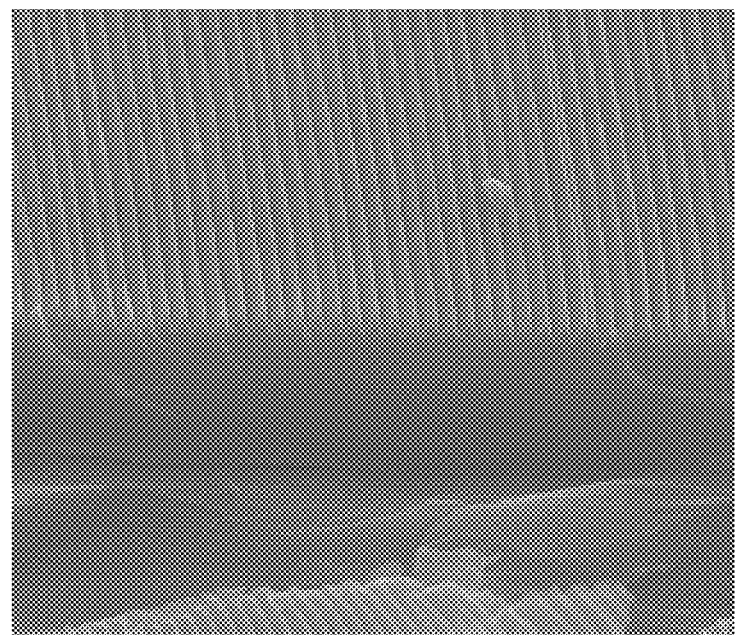
FIG. 4 is a micrograph of a replicated diffractive surface useful for light extraction from a light guide.

A microphotograph of the structured or grooved surface of the resulting diffraction grating film is shown in FIG. 4. The pitch of the diffractive surface features in this figure is about 400 nanometers, and the depth of the grooves (or height of the prisms) is about 500 nanometers.

This film was then laminated to a 2 mm thick acrylic plate, which was clear, flat, and rectangular, using a layer of optically clear adhesive (3M™ Optically Clear Adhesive 8172 from 3M Company, St. Paul, Minn.) such that the diffraction grating faced away from the acrylic plate and was exposed to air, and such that no significant air gaps were present between the base film of the diffraction grating film and the flat major surface of the acrylic plate to which the film was adhered. The laminated construction thus formed a light guide having the single-pitch 1D diffraction grating serving as diffractive surface features on one major surface of the light guide. The light guide included a flat, straight side surface extending parallel to the groove direction of the diffractive surface features, similar to the configuration of FIG. 2. A light source was constructed using a linear array of orange-emitting LEDs (obtained from OSRAM Opto Semiconductors GmbH), each LED having a center wavelength of about 590 nm and a full-width-at-half-maximum (FWHM) bandwidth of about 20 nm. The discrete character of the individual LEDs was masked by placing a diffuser plate (type DR-50 from Astra Products Inc., Baldwin, N.Y.) in front of the LEDs, i.e., between the LEDs and the side surface of the light guide, to provide illumination that was more spatially uniform. The light source thus approximated a linear light source emitting light that was approximately monochromatic at a wavelength of 590 nm.

Figure 5:
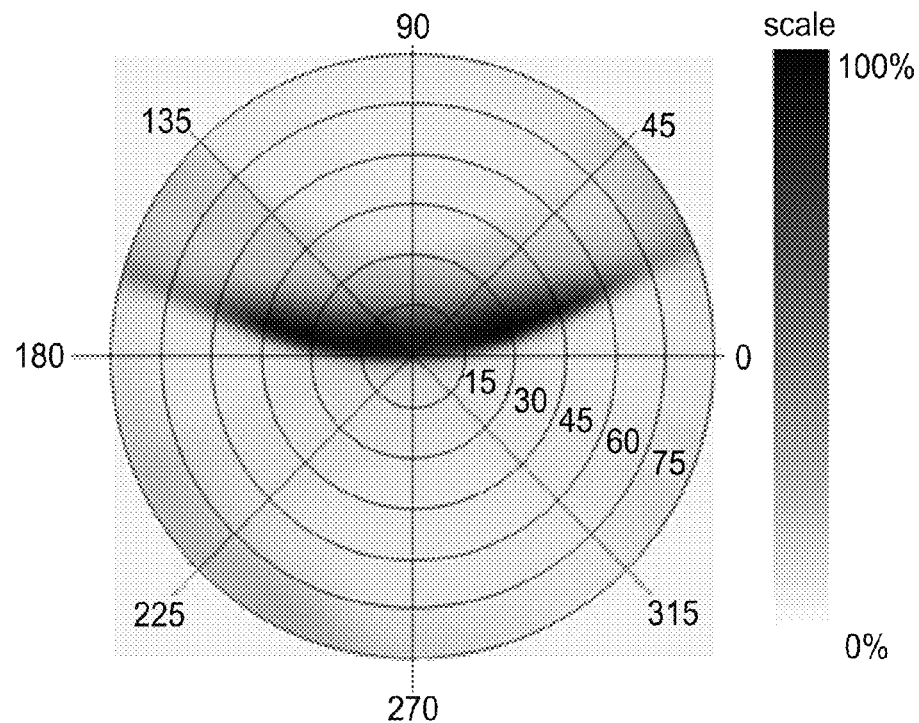
FIG. 5 is a conoscopic plot of measured intensity as a function of polar and azimuthal angle for a lighting device that used diffractive surface structures as shown in FIG. 4.

The light source was energized, and the intensity of the out-coupled light emitted through the diffractive surface features was measured as a function of polar angle and azimuthal angle using a conoscopic camera system. The measured conoscopic intensity distribution is shown in FIG. 5. In this figure, the direction of elongation of the light source, and the groove direction, corresponds to azimuthal values of 0 and 180 degrees. The measured intensity or luminance in an orthogonal reference plane, i.e., in a plane corresponding to azimuthal values of 90 and 270 degrees in FIG. 5, is plotted as a function of polar angle θ in FIG. 5a. The reader may note the similarity of the curve in FIG. 5a relative to the shape of the curves 310, 312, 314 in FIG. 3. The reader may also note in reference to FIG. 5 that light is extracted by the 1D diffraction grating in a narrow crescent-shaped distribution that does not lie in a plane, but that shifts in azimuthal angle as a function of polar angle.

Other aspects of the extended area lighting device discussed in connection with FIGS. 4, 5, and 5a include: light is extracted or out-coupled equally from both major surfaces of the light guide (see e.g. surfaces 212a, 212b of FIG. 2), which is a result of the symmetric design of the diffractive surface features (i.e., the symmetric V-shaped grooves that form the linear diffraction grating); if the monochromatic source is replaced with a white light source and/or multi-colored light sources, angular color separation will occur as a result of the diffraction phenomenon (see e.g. FIG. 3); no diffuser component is needed in the device (although in the embodiment of FIGS. 5 and 5a one is included in the light source to mask the discrete nature of the LED light sources) due to the fact that TIR is relied upon to allow the guided-mode light to propagate along the waveguide, and diffraction is relied upon to extract or out-couple the light from the light guide; and the crescent-shaped distribution of out-coupled light is characterized by a relatively narrow light extraction angle.

Figure 6:
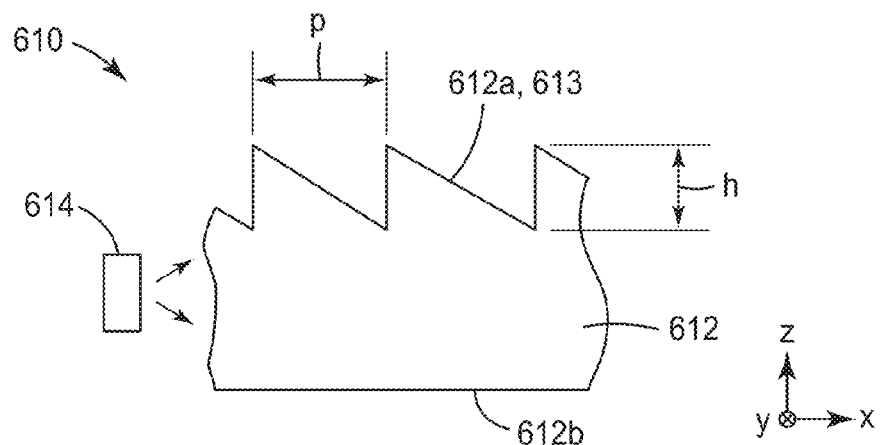
FIG. 6 is a schematic side or sectional view of a light guide having asymmetric or blazed diffractive surface structures.

Guided-mode light may be extracted or out-coupled preferentially through one major surface of the light guide rather than the other major surface by changing the shape of the diffractive surface features, in particular, making the shape of the individual features (e.g. prisms) asymmetrical. We demonstrate this in connection with FIGS. 6 and 7. In FIG. 6, a lighting device 610 includes a light guide 612 having a first major surface 612a and an opposed second major surface 612b. The first major surface 612a comprises diffractive surface features 613 in the form of facets which form right-angle prism structures of height "h" and pitch "p". The device 610 also includes a light source 614 disposed proximate a side surface of the light guide 612 to inject light into the light guide as guided-mode light, such light propagating generally from left to right from the perspective of FIG. 6. A computer simulation of the device 610 was performed. In the simulation, for simplicity, the prism structures of the diffractive surface features 613 were assumed to be equally spaced, and extending linearly along axes parallel to the y-axis. The light source was also assumed to extend linearly parallel to the y-axis, and was assumed to emit polarized light of wavelength λ into air in a Lambertian distribution in a first reference plane parallel to the plane of the light guide (see the x-y plane in FIG. 2), this light then being refracted at the side surface of the light guide. The simulation assumed only one propagation angle of light, α=5 degrees as referenced in FIG. 2, in a second reference plane (see the x-z plane in FIG. 2) perpendicular to the first reference plane. The refractive index of the light guide was assumed to be 1.5. The optical wavelength λ and the grating pitch p were initially selected such that the out-coupled light was extracted orthogonal to the light guide surface for first order diffraction (m=1), which yielded λ≈520 nm and p≈350 nm. The grating height h was then varied over a range from 50 to 500 nm, while the pitch p was held constant at 350 nm. For each embodiment associated with a specific value for the grating height, the following quantities were calculated by the computer simulation software:

extraction efficiency for transverse magnetic (TM) polarized light extracted from the first major surface 612a, referred to here as TM-top extraction efficiency;
   extraction efficiency for transverse electric (TE) polarized light extracted from the first major surface 612a, referred to here as TE-top extraction efficiency;
   extraction efficiency for transverse magnetic (TM) polarized light extracted from the second major surface 612b, referred to here as TM-bottom extraction efficiency; and
   extraction efficiency for transverse electric (TE) polarized light extracted from the second major surface 612b, referred to here as TE-bottom extraction efficiency.

In this regard, "extraction efficiency" refers to the amount (expressed as a percentage) of specified light (TM or TE) extracted from the specified major surface (612a or 612b) for a single interaction, divided by the amount of such specified light propagating within the light guide immediately before the interaction of the light beam with the extraction surface.

Figure 7:
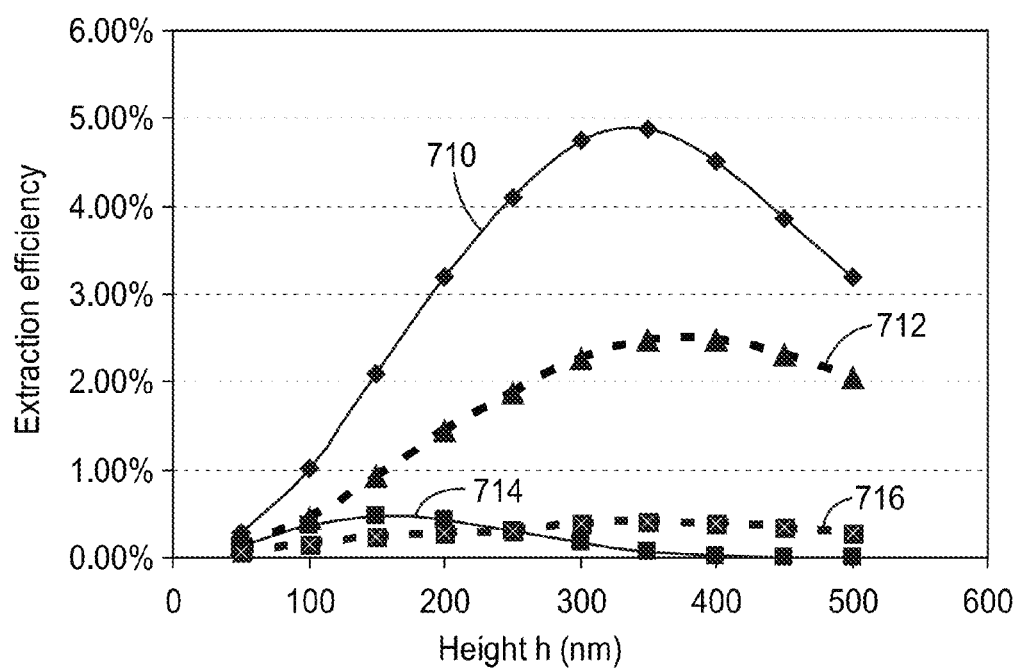
FIG. 7 is a graph of calculated extraction efficiency for the surface structures of FIG. 6.

The calculated quantities are plotted in FIG. 7, where curve 710 is the TM-bottom extraction efficiency, curve 712 is the TE-bottom extraction efficiency, curve 714 is the TM-top extraction efficiency, and curve 716 is the TE-top extraction efficiency. These results demonstrate that guided-mode light can be extracted preferentially through one major surface of the light guide by making the shape of the individual diffractive features (e.g. prisms) asymmetrical. The results also demonstrate that the degree to which light is preferentially extracted from one major surface depends on details of the particular shape of the diffractive features. In the case of right-angle prism features, preferential extraction can be maximized by selecting a height h approximately equal to the pitch p.

The diffractive surface features may be tailored so that light emitted from one major surface of the light guide (e.g. out-coupled light 217a in FIG. 2) is the same as, or similar to, the light emitted from the opposed major surface of the light guide (e.g. out-coupled light 217b in FIG. 2). The light emitted from the opposed surfaces may be the same with respect to color, intensity, and/or the angular distribution of color and/or intensity of the out-coupled light. In one approach, diffractive surface features may be provided on both opposed major surfaces, and these diffractive surface features may be mirror images of each other with respect to a reference plane disposed between and equidistant from the opposed major surfaces, such that the lighting device possesses mirror image symmetry with respect to such a reference plane. In alternative embodiments, the diffractive surface features may be tailored so that light emitted from one major surface of the light guide is substantially different from the light emitted from the opposed major surface of the light guide. The light emitted from the opposed surfaces may be different with respect to color, intensity, and/or the angular distribution of color and/or intensity of the out-coupled light. For example, an observer may perceive that light of one color is emitted from one major surface, and light of a substantially different color is emitted from the opposed major surface. In a horizontally-mounted lighting device, white light sources may be used with suitably tailored diffractive surface features such that white light of a relatively cool color temperature (bluish tint) is directed upwards towards the ceiling, and white light of a relatively warmer color temperature (reddish tint) is directed downwards towards the floor, or vice versa.

In applications where the angular separation of different colors of light due to diffraction is undesirable, several design approaches can be used to overcome the color separation issue. In one approach, shown in FIG. 8, two or more light guides can be stacked together. In another approach, shown in FIG. 9, different diffractive surface features are disposed on opposite major surfaces of a given light guide, and tailored for different colored light sources. In still another approach, shown in FIGS. 10 and 11, the diffractive surface features on a given major surface of a light guide may include groups of surface features of different pitches. Note that although these approaches are presented in connection with dealing with the color separation issue, they may also be used for other purposes including utilitarian and/or aesthetic purposes in which color separation still occurs, or in single-color embodiments that employ only light sources of a given desired (non-white) color. Note also that although the various approaches are described individually, any two or more of the approaches can be combined together and used in a single embodiment.

Figure 8:
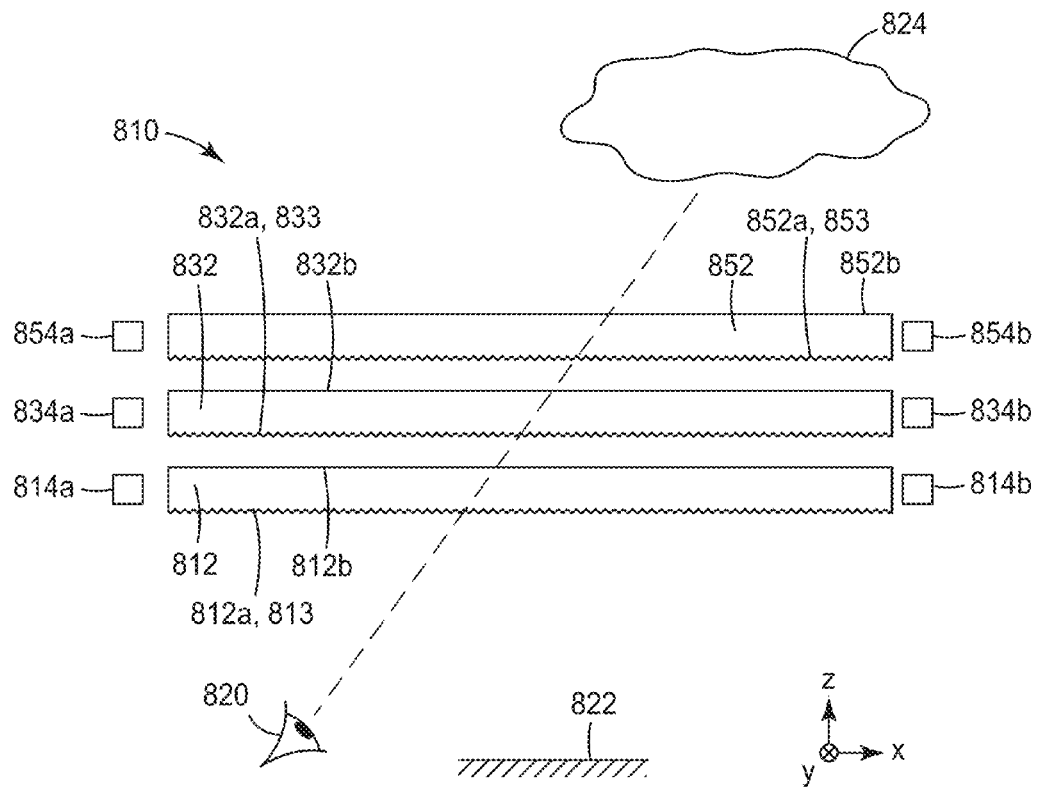
FIG. 8 is a schematic side or sectional view of a lighting device that includes a plurality of light guides in a stacked or layered arrangement.

Turning then to FIG. 8, we see there a schematic view of a lighting device 810 that includes a plurality of light guides 812, 832, 852 in a stacked or layered arrangement. Each light guide has a pair of opposed major surfaces, i.e., light guide 812 has major surfaces 812a, 812b, light guide 832 has major surfaces 832a, 832b, and light guide 852 has major surfaces 852a, 852b. At least one major surface of each light guide preferably includes diffractive surface features, for example, major surface 812a may include diffractive surface features 813, major surface 832a may include diffractive surface features 833, and major surface 852a may include diffractive surface features 853. The device 810 also includes light sources 814a, 814b, 834a, 834b, 854a, 854b arranged as shown to inject light into the respective light guides e.g. through their respective side surfaces, so as to provide guided-mode light in the light guides. Preferably, each of the light guides (including their diffractive surface features) has a low optical distortion such that non-guided-mode light can pass through the light guide relatively undisturbed. In this way, light extracted from the light guide 832 by the diffractive surface features 833 can pass through the light guide 812 to reach a user 820 and/or surface 822, and light extracted from the light guide 852 by the diffractive surface features 853 can pass through both light guide 812 and light guide 832 to reach the user 820 and/or surface 822. The surface 822 may be disposed to intersect the optical axis of the light guides, and may be perpendicular to such optical axis and disposed at a distance D from the light guides of at least 10 times a characteristic transverse dimension L (e.g. a diameter or length) of the light guides. The characteristic transverse dimension L may be a maximum in-plane dimension (caliper measurement) of the light guide. Alternatively, the minimum in-plane dimension (caliper measurement), or the average of the minimum and the maximum, may be used for the characteristic dimension L. Preferably, D is at least 2*L but no more than 50*L. Alternatively or in addition, D may be expressed in absolute units. Preferably, D is at least 0.2 meters but no more than 15 meters. The user 820 may also observe objects such as object 824, which may be the same as or similar to object 124 discussed above, through the stack of light guides 812, 832, 852 with little or no optical distortion.

If it is desirable to overcome the color separation issue, the various light guides, light sources, and diffractive surface features in the device 810 may be tailored to provide different colors of out-coupled light to the user 820 and/or surface 822 so that the sum of all such light provides substantially white light illumination. For example, the light sources 854a, 854b may emit red light and the diffractive surface features 853 may optimally extract such light along an optical axis (e.g. an axis parallel to the z-axis) of the device, and the light sources 834a, 834b may emit green light and the diffractive surface features 833 may optimally extract the green light along the same optical axis, and the light sources 814a, 814b may emit blue light and the diffractive surface features 813 may optimally extract the blue light along the same optical axis. Of course, red, green, and blue in the order described are merely examples, and the reader will understand that a multitude of alternative combinations are contemplated. Furthermore, although three light guides are shown in the stack of FIG. 8, other numbers of light guides, including two, four, or more, can also be used. The constituent components of each layer within the stack may all have the same or similar design, e.g., the same light guide dimensions and characteristics, the same dimensions and characteristics of the diffractive surface structures, and the same numbers, colors, and arrangements of LEDs. Alternatively, the constituent components of each layer may differ from corresponding components in other layers in any of these respects. Similar to lighting device 110, the device 810 may provide illumination of a substantially uniform color (which uniform color may be substantially white or a different, e.g. non-white, color) on the surface 822, while providing a colored appearance when the user 820 looks directly at the device 810. Also, the user may observe spatial pattern(s) such as indicia in the emitting area of the device 810, which pattern(s) or indicia may originate with any one, or some, or all of the layers within the stack, and/or one or more bands having a 3-dimensional appearance in the emitting area of the device 810, which bands may originate with any one, or some, or all of the layers within the stack.

The light guides 812, 832, 852 of FIG. 8 may be mechanically connected to each other by attachment of the light guides to a framework of interconnected support members, e.g., rings or similar structures that completely or partially encircle each of the light guides. Frameworks of interconnected support members are discussed further below.

Figure 9:
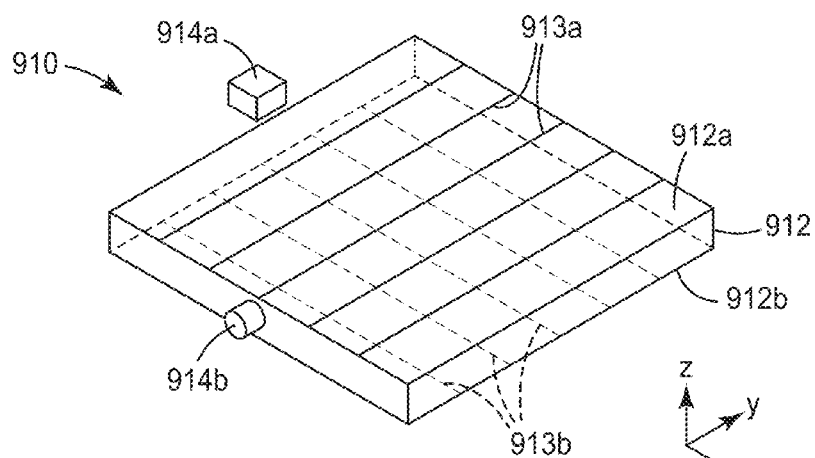
FIG. 9 is a schematic perspective view of a lighting device that includes different diffractive surface features disposed on opposite major surfaces of the light guide and tailored for different colored light sources.

Turning to FIG. 9, we see there a schematic view of a lighting device 910 that includes a light guide 912, and light sources 914a, 914b disposed to inject light into different (e.g. orthogonal) side surfaces of the light guide. The light guide 912 has a pair of opposed major surfaces 912a, 912b. In device 910, each major surface has its own diffractive surface features: surface 912a has diffractive surface features 913a, and surface 912b has diffractive surface features 913b. The diffractive surface features are represented only schematically in the figure, but indicate that features 913a extend generally parallel to one in-plane axis (e.g. the y-axis), and the features 913b extend generally parallel to an orthogonal in-plane axis (e.g. the x-axis). The light sources are likewise positioned and configured to inject light generally along orthogonal in-plane directions, with source 914a disposed to inject light generally along the x-axis and source 914b disposed to inject light generally along the y-axis. The term "generally" is used here because the light sources need not be (and in many cases are not) collimated, but emit light in a distribution of angles in the x-y plane. Also, although the sources 914a, 914b are each shown as a discrete point source such as a single LED emitter, they may alternatively each be a linear array of such discrete sources extending along the respective side surface of the light guide, or a linear or bar-shaped extended source. Nevertheless, light from the source 914a propagates predominantly along the in-plane x-axis, such that it interacts strongly with the diffractive surface features 913a and weakly with the diffractive surface features 913b, and light from the source 914b propagates predominantly along the in-plane y-axis, such that it interacts weakly with the features 913a and strongly with the features 913b.

This selective coupling of the light sources to different respective diffractive surface features on the light guide using geometry or directionality can, if desired, be used to address the color separation issue. For example, the light sources may be substantially complementary in their emission spectra, e.g., source 914a may emit blue light and source 914b may emit yellow light, in which case the diffractive surface features 913a may be configured to extract blue light along a given direction such as an optical axis (e.g. the positive z-axis) of the lighting device 910, while the diffractive surface features 913b may be configured to extract yellow light along the same direction, so as to provide substantially white light illumination along the optical axis. There is little interaction between the blue or yellow light with the diffractive surface features (light extraction grating) of the opposite color because, as explained above, the grooves for blue light extraction extend generally along the light path of the yellow light, the grooves for yellow light extraction extend generally along the light path of the blue light. The different colored light beams are thus guided and extracted independently in the same light guide. The combined visual effect of the out-coupled blue and yellow light gives rise to a sensation of white light to an observer or user. The color rendering index (CRI) of the white light in this example may however be relatively low, because the light guide 912 combines only two colors.

The approach shown in FIG. 9 can be extended to numerous other embodiments, including embodiments that use light sources of other colors, including combinations of different complementary colors, and colors that are not complementary, including also colors that may be the same (e.g. green-emitting light for both sources 914a and 914b, or red-emitting light for both sources). Also, a lighting device such as device 910 can be combined with other lighting devices of similar or different design, e.g. in a stacked arrangement as described in connection with FIG. 8. In such a case, each light guide may be configured to emit a combination of two distinct colors, and the colors collectively emitted from the stack may be selected to produce white light with a higher CRI, if desired.

Another approach that may be used to address the color separation issue is the approach shown generally in FIGS. 10 and 11. In these figures, light guides 1012, 1112 are shown in which the diffractive surface features on a given major surface include groups or packets of surface features of different pitches. The multiple different pitches can be used generally to provide a desired distribution of various wavelengths of extracted light from the light guide, assuming light of such wavelengths is injected into the light guide by one or more light sources (not shown).

As mentioned elsewhere, the light guides disclosed herein may have a variety of different constructions, including a unitary construction, or a layered construction in which two or more components are attached to each other with no significant intervening air gaps. In this regard, the light guides 1012, 1112 are shown to have layered constructions, but they may be readily modified to have a unitary construction if desired. Conversely, light guides shown as being unitary in other figures may be readily modified to have layered constructions. In reference to FIG. 10, the light guide 1012 includes a relatively thick plate or other substrate 1011a, to which is attached a film made up of a carrier film 1011b on which a prism layer 1011c has been cast and cured. The substrate 1011a, carrier film 1011b, and prism layer 1011c preferably have the same or similar index of refraction, and are preferably all highly transmissive to visible light, with little or no scattering or absorption, although in some cases a controlled amount of absorption and/or scattering may be acceptable or even desirable. In reference to FIG. 11, the light guide 1112 may have a similar construction to light guide 1012, and thus may include a relatively thick plate or other substrate 1111a, to which is attached a film made up of a carrier film 1111b on which a prism layer 1111c has been cast and cured.

Attachment of a prismatic or structured surface film to a plate or other substrate to provide a layered light guide can be done by any suitable technique. For example, attachment can be achieved using a suitable adhesive, such as a light-transmissive pressure sensitive adhesive. Attachment may also be achieved using injection molding processes, including insert injection molding processes. Chemical bonds can also be used for attachment, e.g., when a curable resin is cast and cured on a suitable substrate such as a carrier film. Alternatively, in the case of unitary constructions, the diffractive surface features can be formed on at least one surface of a unitary substrate such as a film or plate, e.g. by embossing or molding, including for example injection molding processes. Compression molding, extrusion replication, and direct cutting are additional techniques that may be used to form the diffractive surface features. Regardless of whether the diffractive structures are formed on the surface of a film, plate, or other substrate, the diffractive surface features may be fabricated using any suitable technique now known or later developed. Additional methods that can be used to make suitable diffractive surface features are discussed in one or more of: WO 2011/088161 (Wolk et al.); US 2012/0098421 (Thompson); and US 2012/0099323 (Thompson).

The light guides 1012, 1112 have respective first major surfaces 1012a, 1112a, and respective second major surfaces 1012b, 1112b opposite the first surfaces, as well as side surfaces (not shown). Similar to other light guides described herein, the first major surfaces 1012a, 1112a are configured to have diffractive surface features 1013, 1113, respectively. The surface features may be referred to as grooves or prisms. The grooves/prisms are shown as having an asymmetric 90 degree sawtooth profile in cross section, but other profiles can also be used as desired including other asymmetric profiles and symmetric (e.g. V-shaped) profiles. In plan view the grooves/prisms may follow paths that are straight, curved, or both (e.g. straight in some places and curved in other places). Significantly, the diffractive surface features 1013, 1113 are arranged into groups or packets, the prisms or grooves in any given packet having a uniform pitch but adjacent packets having different pitches. In some cases, the packets can be arranged in patterns that repeat across the surface of the light guide, the smallest repeating group of packets being referred to here as a "set" of packets. For example, light guide 1012 (FIG. 10) has diffractive surface features 1013 which are divided into groove or prism packets 1030, 1031, and 1032, these packets being arranged in a repeating sequence which defines sets 1040. The prisms or grooves in each of packets 1030, 1031, 1032 have a uniform pitch, but the pitch in packet 1030 is less than that in packet 1031, which in turn is less than that in packet 1032. Light guide 1112 (FIG. 11) has diffractive surface features 1113 which is divided into groove or prism packets 1130, 1131, 1132, 1133, 1134, and 1135. These packets may also be arranged in a repeating sequence to define set 1140. The prisms or grooves in each of packets 1130, 1131, 1132, 1133, 1134, and 1135 have a uniform pitch, but the pitch gets progressively larger as one moves from packet 1130 to packet 1135. Note that although different pitches are used in the various packets shown in FIGS. 10 and 11, preferably every one of the pitches is in a range suitable for coupling some visible guided-mode light out of the light guide by principles of diffraction.

The width (in-plane transverse dimension) of the packets and the width of the sets of packets, when the light guide is seen in plan view, may be small enough so that they are visually imperceptible to the ordinary observer. Alternatively, the width of the packets and/or the widths of the sets of packets may be large enough so that they are perceptible as indicia or as an aesthetic pattern to the ordinary observer.

Multiple pitch extraction designs such as those depicted in FIGS. 10 and 11 can be used for color mixing. Generally speaking, at least two different packets, characterized by two different pitches, can be used, but in many cases at least three different packets, characterized by three different pitches p1, p2, p3, are desirable. The choice of the pitch dimension is a function of the refractive index (n) of the light guide, as well as a function of the wavelength of light ($\lambda$) we wish to extract from the light guide with the given packet. In an exemplary case we may select p1=$\lambda$1/n, where $\lambda$1 is in a range from 400 to 600 nm, and p2=$\lambda$2/n, where $\lambda$2 is in a range from 500 to 700 nm, and p3=$\lambda$3/n, where $\lambda$3 is in a range from 600 to 900 nm. In the case of light guides made of acrylic (n$\approx$1.49) or similar materials, these conditions correspond to a pitch p1 in a range from about 268 to 403 nm, p2 in a range from about 336 to 370 nm, and p3 in a range from 403 to 604 nm. Polychromatic light such as white light propagating within the light guide interacts with the multiple pitch packets so that light of different colors is diffracted (out-coupled or extracted from the waveguide) at different angles for each given packet, the extraction angle for any given color also being different for the different packets. As a result, light of the various colors can be mixed or combined to provide illumination with substantial color uniformity, e.g. substantially white light, for users or objects disposed at a suitable distance from the light guide.

In exemplary embodiments, the lighting device may utilize a plurality of light sources having different spectral outputs, and a controller can be used to independently control the different light sources to actively or dynamically control the perceived color of the light emitted by the lighting device. This active control can be used to adjust or otherwise change the color temperature, correlated color temperature, and/or the color rendering index (CRI) of the output light. Assemblies or combinations of red, green, and blue-emitting LEDs (RGB), or red, green, blue, and white-emitting LEDs (RGBW), are of particular benefit for this purpose. Also, light guides that incorporate a multiple pitch extraction design are also of particular benefit. Preferably, the multiple pitch design incorporates at least one packet of diffractive features of a given pitch for each narrow-band emitting light source, e.g., one or more packets whose pitch is tailored for red light, one or more packets whose pitch is tailored for green light, one or more packets whose pitch is tailored for blue light, and so forth. Note that individual narrow band colors are not limited to red, green, and blue, and light sources that emit other non-white colors such as yellow or amber may also be used to expand the color gamut of the disclosed lighting devices.

A design parameter of interest for the multi-pitch grating design, as well as for other disclosed diffractive surface feature designs, is the effective extraction efficiency. Extraction efficiency was discussed above and will not be repeated here. The "effective" extraction efficiency refers to the percentage of specified light extracted from the specified major surface (612a or 612b) upon a single interaction, divided by the amount of such specified light propagating within the light guide immediately before the interaction with the extraction surface. The effective extraction efficiency for diffractive surface features (grooves or prisms) of a given pitch can be evaluated and compared to the effective extraction efficiencies of other pitches. In general with given system parameters, the effective extraction efficiency of a given pitch: is a linear function of (i.e., directly proportional to) the plan-view area coverage of diffractive features having that pitch (e.g., for the smallest pitch in FIG. 10, the sum of the plan-view areas of the three packets 1030 on the surface); and also depends on other factors including the pitch of the diffractive features and the cross-sectional profile shape of the diffractive features (grooves/prisms). If substantial color uniformity is desired, the effective extraction efficiencies for the different pitches may be made comparable to each other, e.g., the ratio of effective extraction efficiencies for any two distinct pitches may lie within the range from about 0.3 to 3.

Figure 5A:
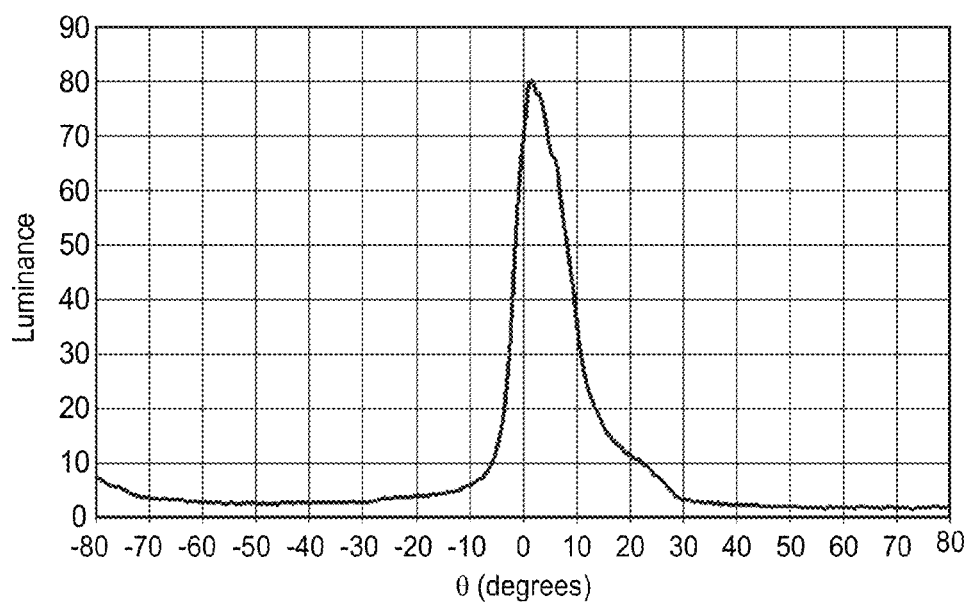
FIG. 5a is a graph of measured luminance versus polar angle along a particular observation plane for the conoscopic plot of FIG. 5.

As we saw in connection with FIGS. 4, 5, and 5a, a monochromatic Lambertian light source used to inject light into a light guide having a single pitch linear diffraction grating gives rise to a crescent-shaped distribution of out-coupled light characterized by a relatively narrow light extraction angle. If even further angular narrowing of the out-coupled light is desired, the light source can be reconfigured with suitable lenses, mirrors, or other components to emit light that is collimated or nearly collimated rather than Lambertian. Conversely, if angular widening of the out-coupled light is desired, the light source can be reconfigured to emit light over a broader angular range than a Lambertian distribution. Microstructured optical films can be combined with light sources such as LEDs or lasers to tailor the angular spread of light injected into the light guide, thereby also affecting the angular spread of the out-coupled light. Suitable microstructured optical films are described in PCT Patent Publications WO 2012/075352 (Thompson et al.) and WO 2012/075384 (Thompson et al.). These optical films, which may be referred to as uniformity tapes, can be applied directly to the edge or side surface of a light guide and comprise refractive structures facing outward toward the light source to enhance coupling of light into the light guide. The refractive structures may alternatively be incorporated directly into the side surface or injection edge of the light guide, e.g. by injection molding, embossing, or direct machining. Such optical films or refractive structures, when disposed between an LED source and the side surface of a light guide, can broaden the angular spread of light injected into the light guide, and can be used with one, some, or all of the light sources in any of the embodiments disclosed herein. Optical films with custom designed replicated structures can also be used with coherent lasers to provide a well-defined rectangular-shaped angular distribution of light (i.e., a light distribution of approximately constant intensity over a specified cone of angles, and zero or near zero intensity outside the specified cone) for injection into the light guide.

The angular spread of the out-coupled light can also be tailored by appropriate selection of the physical width (in-plane transverse dimension) of the packets of diffractive features, where the physical width is measured orthogonally to the direction of elongation of the prisms/grooves. The physical width of each packet affects all colors of light interacting with the packet, and the overall extracted light is an average effect of all the packets. Physical widths that are small tend to broaden the angular width of the out-coupled light, while physical widths that are large tend to narrow the out-coupled light angular width. However, the amount of angular broadening or narrowing that can be achieved by physical width adjustment is somewhat limited because physical widths that are too small can lead to excessive light spreading such that the diffractive surface features produce a high degree of distortion or scattering, and such that the light guide appears to be diffusive rather than diffractive.

Another technique for producing illumination that is more angularly dispersed (e.g. for better spatial uniformity at remote surfaces) is to use a pattern of diffractive surface features oriented along different in-plane directions, e.g., corresponding to different azimuthal angles in the conoscopic plot of FIG. 5. The differently oriented diffractive features can then be combined with corresponding light sources that emit light generally along different in-plane directions tailored for maximum extraction efficiency with the corresponding diffractive features. The combination of the variously oriented diffractive features and the variously oriented light sources can produce out-coupled light emitted at a variety of azimuthal directions, resulting in illumination that is more angularly dispersed and more spatially uniform. In an exemplary embodiment, at least three distinct diffractive feature orientations can be used, corresponding to in-plane axes separated from each other by azimuthal angles of 120 degrees.

Differently oriented diffractive features can also be achieved through the use of continuously curved grooves or prisms, e.g., grooves or prisms that are circular, oval, or elliptical in shape (in plan view), or portions of such shapes, e.g., arcs, including series of interconnected arcs such as in sinusoidal or otherwise undulating shapes. In that regard, embodiments disclosed herein that are described as having linear diffractive surface features can alternatively employ diffractive features that are curved. Linear or curved diffractive surface features, when combined with discrete light sources and/or non-uniform reflective structures, can be used to produce visual features in the form of bright or dark bands. Bands such as these are highly undesirable in most extended source applications, but in some cases can be exploited to provide the lighting device with an aesthetic 3-dimensional appearance.

Figure 12:
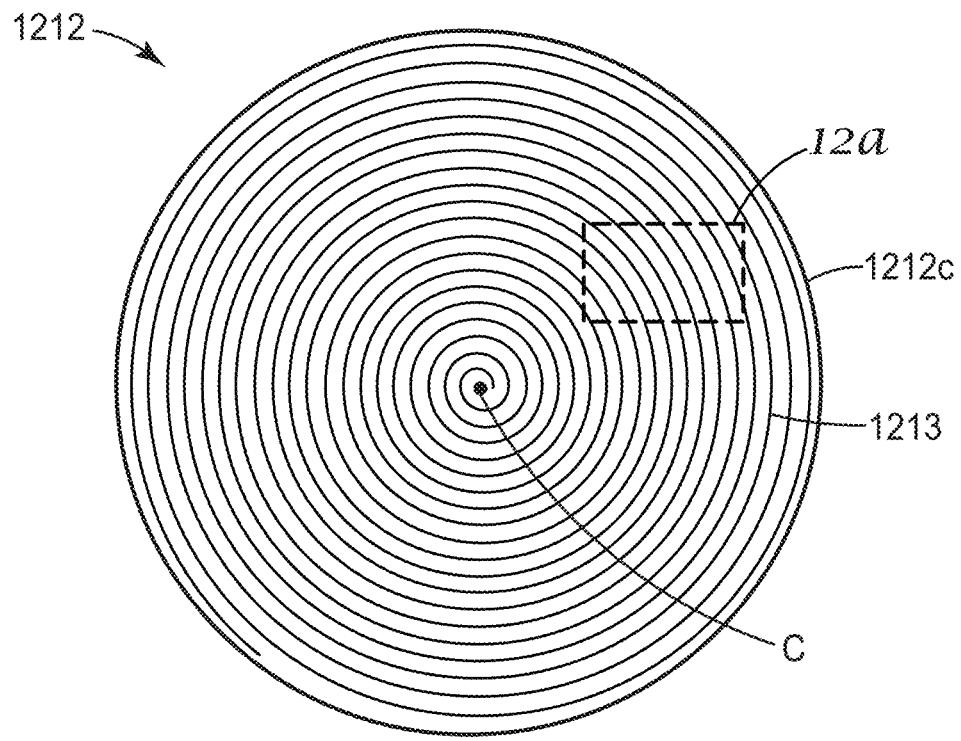
FIG. 12 is a schematic front or plan view of a light guide having diffractive surface structures formed into a spiral.
Figure 12A:
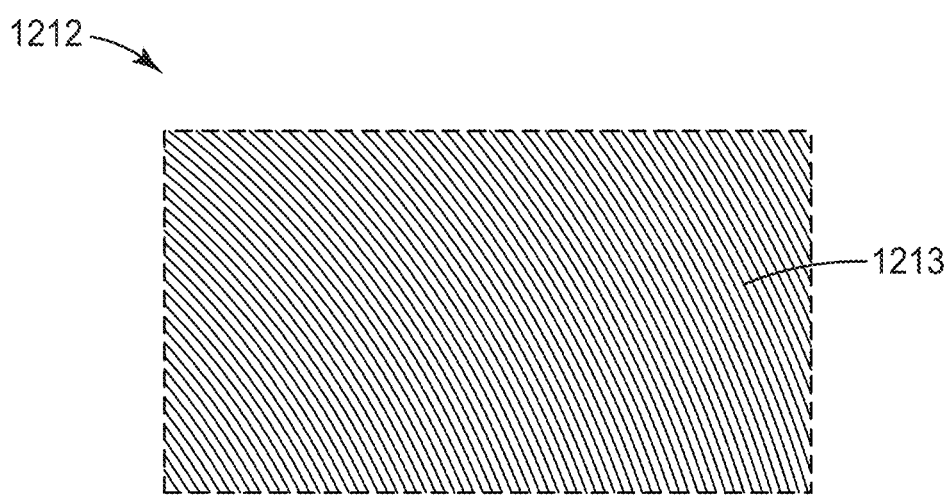
FIG. 12a is a detail of the light guide of FIG. 12.

FIG. 12 shows an exemplary light guide 1212 that can be used as a component in the lighting devices disclosed herein. The light guide 1212 has opposed major surfaces and a side surface 1212c extending continuously around the periphery of the light guide in the form of a narrow circular ring. Diffractive surface features 1213 are provided on one of the major surfaces. In this embodiment, the diffractive features 1213 form a tightly wound spiral, substantially filling one major surface of the light guide. The diffractive features 1213 are thus all curved in plan view over substantially their entire lengths, and the curvature changes monotonically as a function of radial distance from the geometrical center of the light guide 1212 and of the diffractive features 1213, which center is labeled "C" in FIG. 12. A portion of the light guide 1212 and of the diffractive surface features 1213 is shown in a schematic magnified view in FIG. 12a. The pitch of the diffractive features (radial distance between adjacent grooves or prisms) can be uniform or non-uniform, as discussed elsewhere herein. In alternative embodiments, the tightly wound spiral can be replaced with concentric circles or other similar shapes. In other alternative embodiments, the circular shape of the light guide 1212 and the substantially circular shape of the diffractive surface features 1213 can be changed to other curved shapes, such as ellipses or ovals. Furthermore, diffractive surface features may alternatively be provided on both major surfaces of the light guide 1212, or on only a portion of one, or both, major surfaces.

Figure 13:
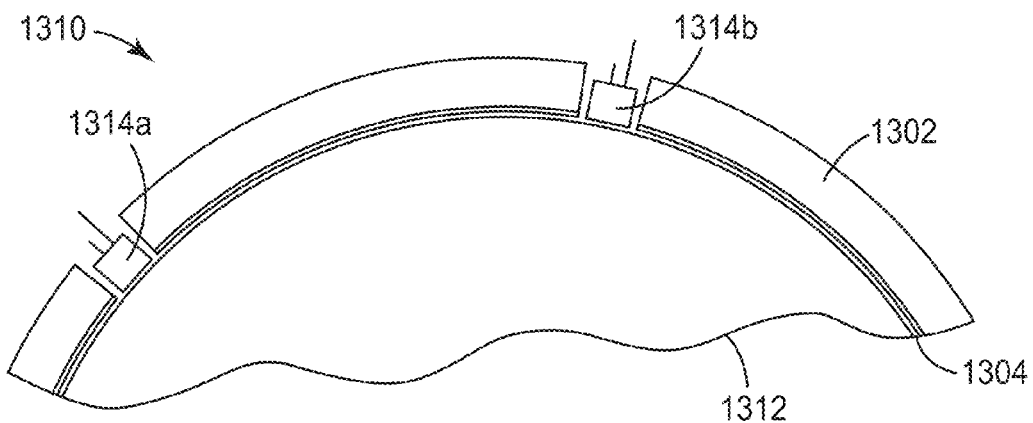
FIG. 13 is a schematic front, plan, or sectional view of a portion of a lighting device including a light guide, discrete light sources disposed to inject light into the light guide, and support structure.

Turning now to FIG. 13, shown there is an exemplary arrangement of how discrete light sources can be mounted along a curved side surface of a light guide. A lighting device 1310 includes a light guide 1312, discrete light sources 1314a, 1314b disposed to inject light into a curved side surface of the light guide 1312, and support structure 1302 such as a mounting ring. Diffractive surface features, not shown here but described elsewhere herein, are provided on a major surface of the light guide 1312 to extract guided-mode light out of the light guide. The light sources 1314a, 1314b may be or comprise LEDs or similar small area light sources. The light sources are mounted in apertures or slots of the support structure 1302. If desired, the support structure 1302 can be made of a metal or other reflective material to provide an extended reflector along the side surface of the light guide 1312. Alternatively, a thin reflective film 1304 may be interposed between the support structure and the side surface. In other embodiments, the support structure 1302 can be made of an absorbing (or other low reflectivity) material, and/or the film 1304 can be made to be absorbing or of low reflectivity. The light sources need not be mounted at the side surface of the light guide in order to provide guided-mode light. For example, the light sources may inject light through an outer (e.g. annular) portion of the major surface of the light guide rather than through the side surface, and the side surface may in that case be beveled or angled (e.g. at 45 degrees) so that light from the light source that enters through the major surface is reflected sideways to provide guided-mode light.

The support structure 1302 may be part of a framework of interconnected support members which collectively attach to the light guide 1312 and one or more other light guides as disclosed herein to provide a lighting device having multiple light guides.

Figure 14:
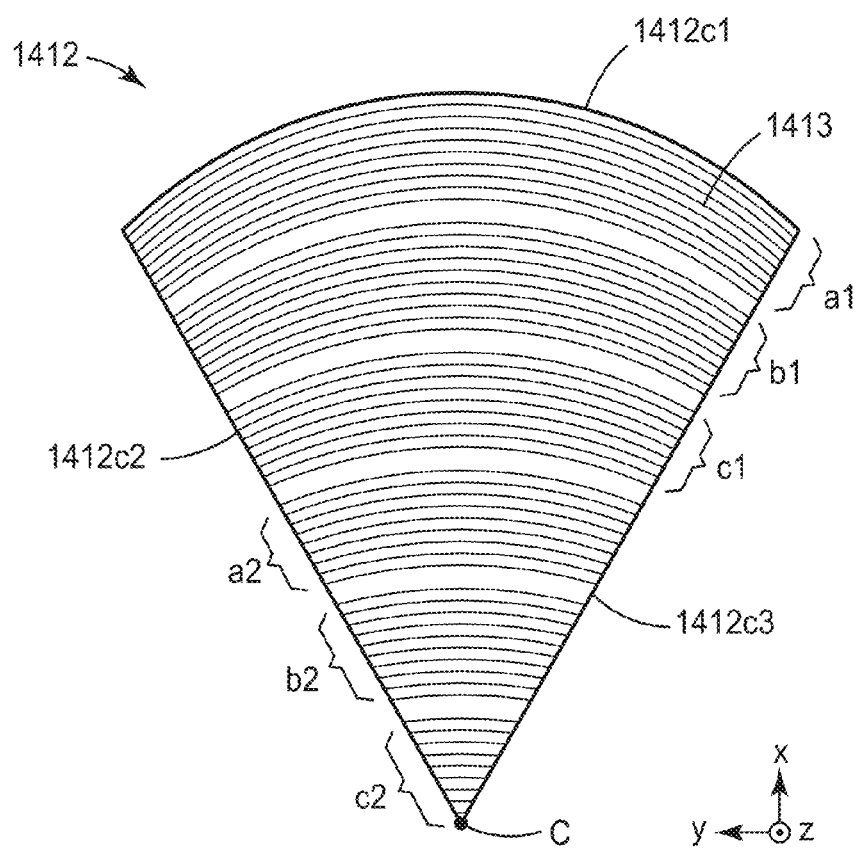
FIG. 14 is a schematic front or plan view of a flat pie-shaped light guide having diffractive surface structures of equal curvature.

FIG. 14 depicts another light guide 1412 that may be used in the disclosed light sources. The light guide 1412 is assumed to be flat, lying in an x-y plane, with opposed major surfaces that are sector-shaped or pie-piece-shaped. Bounding the major surfaces are side surfaces 1412c1, 1412c2, 1412c3. The side surface 1412c1 is curved, e.g. like an arc of a circle, and the side surfaces 1412c2 and 1412c3 are flat. The side surfaces 1412c2, 1412c3 intersect at a center point C, which may be a center of curvature of the curved side surface 1412c1. Diffractive surface features 1413 are provided on one or both major surfaces of the light guide 1412. Rather than being concentric, the diffractive features 1413 are assumed to all have the same curvature, which may be equal to the curvature of the curved side surface 1412c1. Furthermore, the diffractive surface features 1413 are arranged into packets of different pitches. These include: packets a1 and a2, having a pitch configured to extract red guided-mode light at a predetermined angle (e.g. orthogonal to the surface of the light guide); packets b1 and b2, having a pitch configured to extract green guided-mode light at the same or different predetermined angle; and packets c1 and c2, having a pitch configured to extract blue guided-mode light at the same or different predetermined angle. The packets are thus arranged into two sets of packets.

In an exemplary embodiment, the packets a1, a2 occupy a first total area of the light guide, the packets b1, b2 occupy a second total area of the light guide, and the packets c1, c2 occupy a third total area of the light guide, and the first, second, and third total areas have relative proportions are related to a spectral intensity distribution of the one or more light sources. For example, the first total area may be greater than the second total area, which may in turn be greater than the third total area, such that the combination of all red, green, and blue light extracted from the light guide 1412 in a particular direction, e.g. along an optical axis (see the z-axis in FIG. 14) provides substantially white light illumination at a reference surface of interest that is remote from the light guide 1412. The maximum transverse dimension of the light guide 1412 is the radial distance from the center point C to the side surface 1412c1. The reference surface of interest may be perpendicular to the optical axis, and separated from the light guide 1412 by a distance D of intermediate length along the optical axis. The distance D may be expressed in terms of a characteristic transverse dimension L of the first major surface of the light guide, such as the radial distance from the point C to the surface 1412C1. Alternatively, the minimum in-plane dimension (caliper measurement) or the average of the minimum and the maximum may be used for the characteristic dimension L. Preferably, D is at least 2*L but no more than 50*L. Alternatively or in addition, D may be expressed in absolute units. Preferably, D is at least 0.2 meters but no more than 15 meters.

The reader will appreciate that numerous modifications can be made to the light guide 1412 in accordance with the other teachings herein. For example, other pitch configurations can be used for the diffractive surface features, including constant pitch over the entire light guide, and other numbers of packet types and/or other numbers of packet sets. Also, the diffractive surface features 1413 may all be made to be concentric, e.g. with a center of curvature at the center point C, rather than a constant curvature.

Figure 15A:
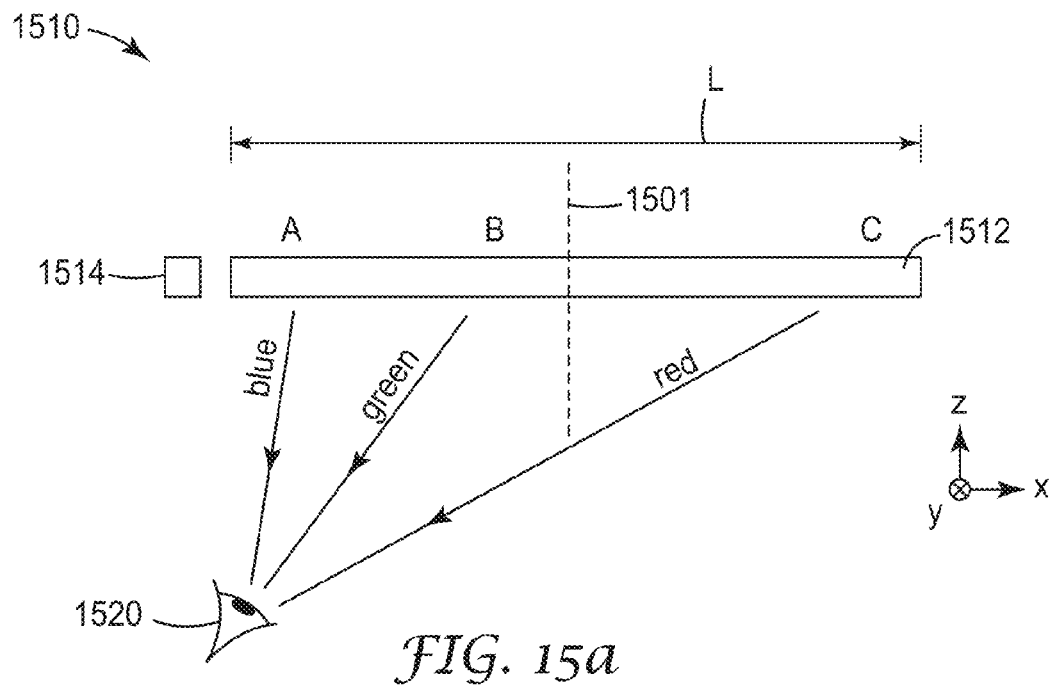
FIGS. 15a and 15b are schematic side or sectional views of a lighting device that has a colorful appearance when observed by an ordinary user, but that provides substantially white light illumination at a remote reference surface of interest.
Figure 15B:
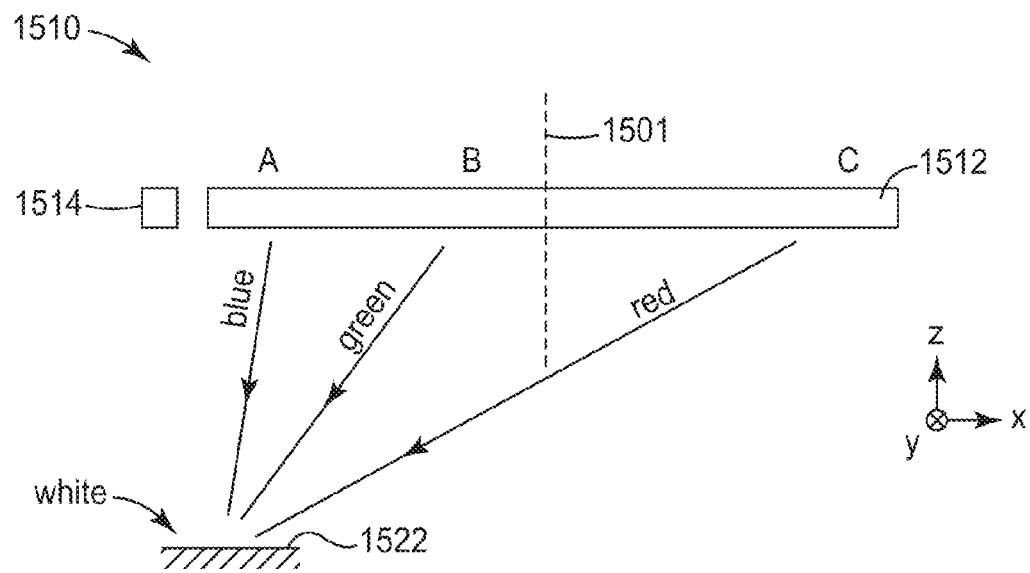

FIGS. 15a and 15b are schematic views of a lighting device 1510 that has a substantially colorful appearance when observed by an ordinary user 1520, but that provides illumination of a substantially uniform color, and which may be substantially white, at a remote reference surface of interest 1522. The device 1510 includes a light guide 1512 having a symmetry or optical axis 1501, which in this case is parallel to the z-axis because the light guide 1512 extends parallel to the x-y plane. The light guide has a characteristic transverse (in-plane) dimension L. The light guide 1512 may be the same as or similar to other light guides discussed herein. One or more light sources, represented by light source 1514, are disposed to inject light into the light guide 1512. The light source 1514 preferably emits light throughout the visible wavelength spectrum, at least, for example, in the red, green, and blue regions of the spectrum. This light enters the light guide and propagates within and along the light guide as guided-mode light.

A plurality of diffractive surface features, which are not shown in FIG. 15a but are as described elsewhere herein, are provided on at least one major surface of the light guide 1512. The diffractive surface features couple the guided-mode light out of the light guide 1512 by the mechanism of diffraction, such that light of different wavelengths is extracted or outcoupled from the light guide at different angles at any given point on the major surface of the light guide. Due to the diffractive effect, an ordinary user 1520 of the device, such as an occupant of a room illuminated by the device 1510, observes substantially different colors in different regions of the light guide. For example, as shown in the figure, the user 1520 may perceive light of a blue color at a position or region A of the light guide, light of at green color at a position or region B of the light guide, and light of a red color at a position or region C of the light guide. In general, the perceived colors and their spatial distribution across the output of the light guide change as a function of viewing direction and viewing position. The user may observe such colors over a wide range of viewing directions and at a variety of observation positions, including both positions that are relatively close to and positions that are remote from the light guide 1512. The observation positions may, for example, be separated from the light guide 1512 by up to about 50 times the dimension L, or as little as 2 times L. The observation positions may also or alternatively be separated from the light guide by up to 15 meters or as little as 0.2 meters. However, at at least one viewing geometry, the user observes substantially different colors in different regions of the light guide. Colors that are "substantially different" may be quantified in terms of the CIE chromaticity diagram, as discussed in patent application publication US 2014/0043847 (Yang et al.).

The diffractive surface features may be tailored, in combination with other elements of the lighting device 1510 such as the output spectrum of the light source 1514, so that the light guide 1512 illuminates a reference surface of interest disposed remotely from the light guide with light that is substantially spatially uniform in color, and that in exemplary embodiments is also substantially white. In FIG. 15*b*, such a reference surface of interest 1522 is shown to replace the user 1520 at the same remote observation or illumination position. This position is shown to be offset from the optical axis 1501, but it may alternatively be in alignment with (lie on) the optical axis. The substantially uniform color illumination may defined over a measurement portion of the surface 1522, the measurement portion defined by the illuminance of the light on the surface 1522 being above a given threshold value, e.g., equal to or greater than the maximum illuminance ("Imax") on the surface 1522 divided by the mathematical constant "e". Within this measurement portion, colors may be said to be "substantially uniform" by reference to the CIE chromaticity diagram. Such uniform color illumination may be maintained over the entire measurement portion of the reference surface 1522.

To achieve results such as these, the diffractive surface features include diffractive surface features of different pitches. For example, one or more first packets of first diffractive surface features having a first pitch, one or more second packets of second diffractive surface features having a second pitch different from the first pitch, and one or more third packets of third diffractive surface features having a third pitch different from the first and second pitches, may be included. The first, second, and third pitches may be tailored to extract blue light, green light, and red light respectively along a desired observation direction, e.g., parallel to the optical axis 1501. The first, second, and third packets may be arranged in repeating groups or sets on the major surface of the light guide 1512. The first packets may occupy a first total area of the light guide, the second packets may occupy a second total area of the light guide, and the third packets may occupy a third total area of the light guide, and relative proportions of the first, second, and third total areas may be related to a spectral intensity distribution of the light source 1514 used for light injection. The first, second, and third diffractive surface features may include surface features that, in plan view, extend along a plurality of in-plane directions. For example, such surface features may be substantially circular or at least curved in shape, in plan view.

Figure 16:
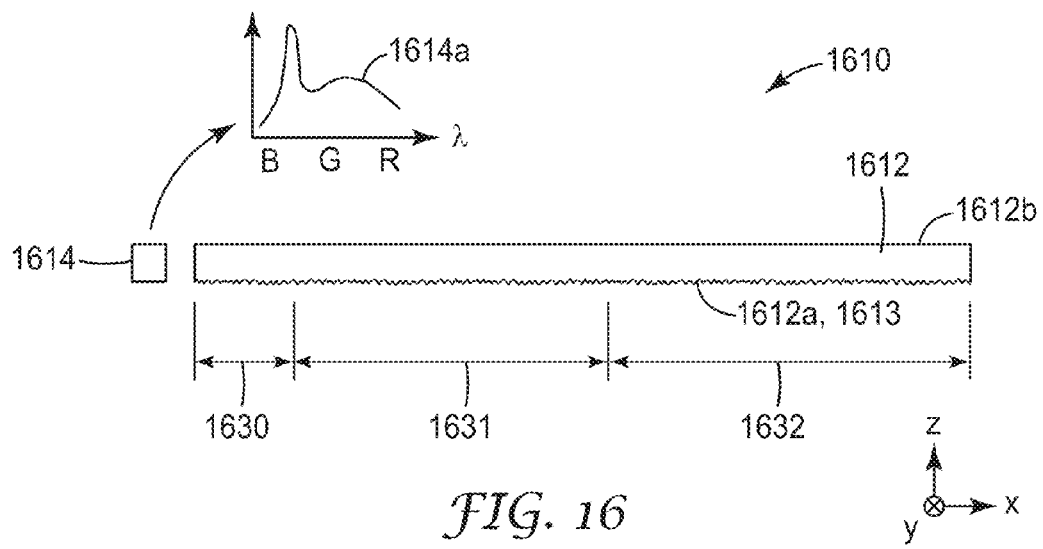
FIG. 16 is a schematic side or sectional view of a lighting device in which relative widths or areas of three different types of diffractive surface features are selected in accordance with a light source whose spectral intensity distribution has a high blue content.
Figure 17:
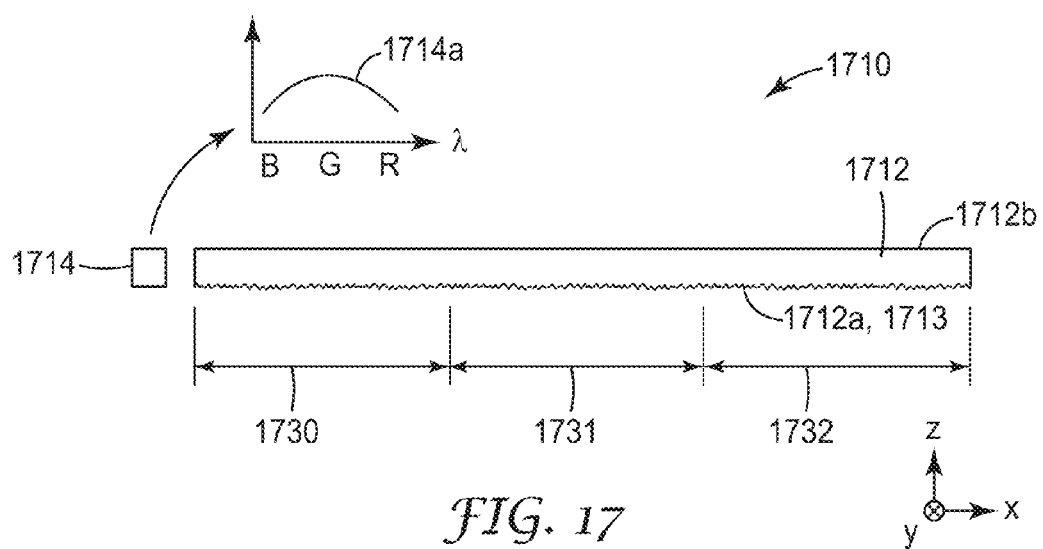
FIG. 17 is a schematic side or sectional view of a lighting device similar to that of FIG. 16, but where a light source is used whose spectral intensity distribution does not have the unusually high blue content, and the relative widths or areas of the three different types of diffractive surface features are adjusted accordingly.

FIGS. 16 and 17 schematically illustrate the concept of tailoring the total areas of different types of diffractive surface features such that their relative values are related to the spectral intensity distribution of the light source(s) that injects light into the light guide. In FIG. 16, a lighting device 1610 includes a light guide 1612 and one or more light sources disposed to inject light into the light guide, all of these light sources represented schematically by a single light source 1614. The light guide 1612 has a first major surface 1612*a* and an opposed second major surface 1612*b*, and at least one of the major surfaces is provided with diffractive surface features 1613. The diffractive surface features 1613 are made up of three different types of diffractive surface features, the three types differing in groove or prism pitch. First diffractive surface features lie in a region 1630, and are assumed to have a first pitch and other design characteristics tailored to extract blue light from the light guide 1612 along a particular direction, e.g. parallel to an optical axis of the light guide. In FIG. 16, the optical axis of the light guide 1612 is parallel to the z-axis. Second and third diffractive surface features lie in regions 1631 and 1632, respectively, and are assumed to have respective second and third pitches tailored to extract green and red light from the light guide 1612 along the same particular direction. The regions 1630, 1631, 1632 are assumed to occupy first, second, and third total areas respectively of the surface 1612*a* in plan view, the total areas being in proportion to the lengths (or widths) of the regions shown in the figure. For simplicity, FIG. 16 shows each of the first, second, and third diffractive surface features grouped into a single packet of diffractive surface features, the different packets bordering each other but not overlapping. In alternative embodiments, each of the various types of diffractive surface features can be divided into numerous packets of uniform or non-uniform width as desired while preserving the total areas occupied by the respective types of diffractive features, and the packets for the different types of diffractive features can be interspersed on the major surface e.g. in a cyclic, repeating, non-overlapping fashion.

The light source 1614 is assumed to emit light over enough of the visible spectrum so that its overall output is substantially white (although in some cases the overall output may not be substantially white but nevertheless broadband in character, so that the user can observe substantially different colors at different regions of the light guide), but the spectral content need not be uniform or smoothly varying as a function of wavelength. In fact, we assume that source 1614 emits light in a substantially non-uniform fashion over the visible spectrum, as indicated schematically by the spectral intensity distribution 1614*a*. The distribution 1614*a* is assumed to have a spike or excess of light output in the blue region of the spectrum relative to the green and red regions. Such a spike may occur with some LED products that use a blue LED die to excite a yellow phosphor. Whatever the cause, the regions 1630, 1631, 1632 are tailored to compensate for the blue spike by having the first total area substantially less than the second or third total areas. The smaller total area for region 1630 results in less blue light being extracted along the particular direction (such as the optical axis) compared to green or red light. In this way, the extracted light emitted along the particular direction does not exhibit the same blue spike that is present in the light emitted by the light source 1614 and in the guided-mode light. This allows the lighting device 1610 to illuminate the reference surface of interest disposed remotely from the light guide with light that is substantially uniform in color. The substantially uniform color may be maintained over a measurement portion of the reference surface defined by the illuminance of the light being above a given threshold value, e.g., Imax/e.

FIG. 17 is provided as a contrast to FIG. 16. In FIG. 17, a lighting device 1710 includes a light guide 1712 with major surfaces 1712*a*, 1712*b*, diffractive surface features 1713, and light source 1714 disposed to inject light into the light guide. The diffractive surface features 1713 are made up of three different types of diffractive surface features of differing pitches: first diffractive surface features in a region 1730, second diffractive surface features in a region 1731, and third diffractive surface features in a region 1732. These various components of lighting device 1710 may be substantially the same as corresponding components of lighting device 1610 (e.g., the first, second, and third diffractive surface features have different first, second, and third pitches designed to extract blue, green, and red light respectively along the same particular direction such as the optical axis), except that the spectral intensity distribution 1714a of the light source 1714 is more evenly distributed with regard to the red, green, and blue regions of the visible spectrum than the distribution 1614a. This difference in spectral output of the light source is compensated for by readjustment of the first, second, and third total areas. As a result, the first total area is no longer substantially less than the second or third total areas. In lighting device 1710, the first, second, and third total areas are more nearly equal to each other. In this way, the lighting device 1710 is able to illuminate a reference surface of interest disposed remotely from the light guide with substantially white and uniform light, similar to the illumination provided by lighting device 1610.

Figure 17A:
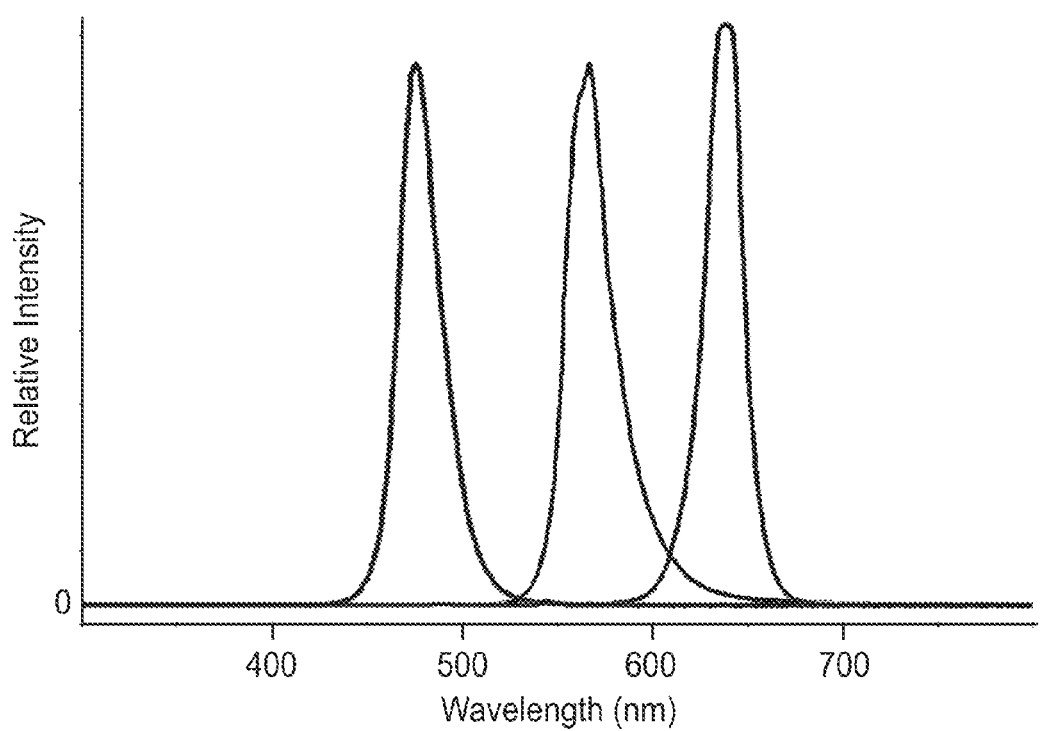
FIG. 17a is a schematic representation of the output spectrum of a collection of red, green, and blue LEDs.

In another variation of FIGS. 16 and 17, the light sources used in the lighting device may be selected from the group of discrete red, green, and blue emitting LEDs. By selecting an appropriate number of each of these three LED types, a desired proportion of these three colors can be injected into the light guide, and the first, second, and third total areas of the different diffractive surface features can then be tailored accordingly so as to provide substantially white light illumination. FIG. 17a is a schematic representation of the output spectrum of a collection of red, green, and blue LEDs in which the intensity in each of these three color bands is about equal. In such case, the first, second, and third total areas may be tailored to be approximately equal.

The disclosed lighting devices, which generally include an extended light guide and diffractive surface features disposed on at least one major surface of the light guide to extract guided-mode light, may also be made to include other design elements that work synergistically with the diffractive surface features. One such design element is a patterned low index subsurface layer within the light guide. The patterned subsurface layer may be patterned in a way that is the same as, similar to, or different from the patterning of the other patterned layers or films that are incorporated into the lighting device. But unlike such other patterned layers or films, the subsurface layer is disposed beneath (although typically close to) the major surface of the light guide containing the diffractive surface features. The subsurface layer is thus disposed in an interior of the light guide between the opposed major surfaces thereof, and the light guide has a non-unitary construction. The subsurface layer functions to selectively block some guided mode light from reaching the diffractive surface features. This is accomplished by tailoring the subsurface layer to have first layer portions characterized by a lower refractive index than the bulk of the light guide, such that some of the guided mode light propagating in the bulk of the light guide is reflected by total internal reflection (TIR) at the first portions and prevented from reaching the diffractive surface features. The first layer portions reside in first regions of the light guide but not second regions thereof, the first and second regions being coplanar and in some cases complementary. The first and second regions may define a pattern that is regular, irregular, random, semi-random, or of any desired design.

In some cases, the subsurface layer is partially continuous with respect to the first and second regions. For example, a nanovoided polymeric material may be present in the first layer portions (in the first regions), and the subsurface layer may also include second layer portions in which the same nanovoided polymeric material is also present, the second layer portions residing in the second regions. The nanovoided polymeric material may then extend continuously from any given first layer portion to any and all second layer portions that are adjacent to such first layer portion. The nanovoided polymeric material may provide the first portions of the subsurface layer with a refractive index that is substantially lower than the bulk of the light guide. For example, the refractive index of the first portions at visible wavelengths may be less than 1.4, or less than 1.3, or less than 1.2. The nanovoided polymeric material may have a void volume in a range from about 10 to about 60%, or from about 20 to about 60%, or from about 30 to about 60%, or from about 40 to about 60%. The second layer portions of the subsurface layer may be composed of the nanovoided polymeric material and an additional material.

The additional material may occupy at least a portion of the void volume (and in some cases may substantially completely fill the interconnected nanovoids such that little or no void volume remains), and preferably has the effect of changing the refractive index of the second layer portions by at least about 0.03, e.g., from about 0.03 to about 0.5, from about 0.05 to about 0.5, or from about 0.05 to about 0.25, relative to the first layer portions in which the additional material is not substantially present. In some cases the additional material may be the same material as a binder used to form the nanovoided polymeric material. Further information regarding suitable subsurface layers having the continuous nanovoided polymeric material construction can be found in the following commonly assigned PCT publications, in which the subsurface layer is referred to as a variable index light extraction layer: WO 2012/116129 (Schaffer et al.), "Front-Lit Reflective Display"; WO 2012/116199 (Thompson et al.), "Variable Index Light Extraction Layer and Method of Illuminating With Same"; WO 2012/116215 (Schaffer et al.), "Illumination Article and Device for Front-Lighting Reflective Scattering Element"; and WO 2012/158414 (Thompson et al.), "Back-Lit Transmissive Display Having Variable Index Light Extraction Layer".

In some cases, the subsurface layer is discontinuous with respect to the first and second regions. For example, the first layer portions (in the first regions) may be printed with a first material of relatively low refractive index, and the second regions may be filled with a second material of relatively high refractive index, e.g., having a refractive index substantially matching, or exceeding, that of the bulk of the light guide. Here, unlike the partially continuous subsurface layer described above, the second material in the second regions may have no common structure or composition relative to the first material in the first regions, and the subsurface layer may consist essentially of the first layer portions.

Figure 19:
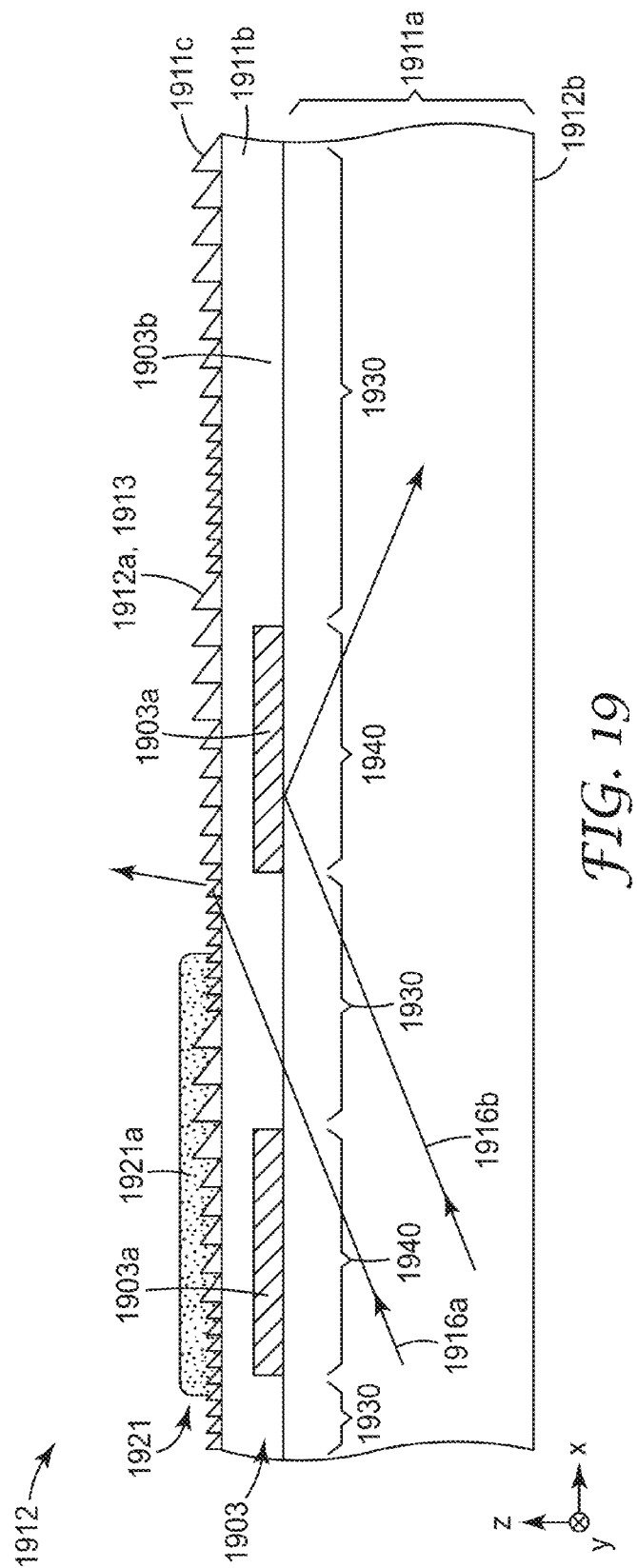

Exemplary embodiments that incorporate such subsurface layers are shown schematically in FIGS. 18 and 19. In FIG. 18, a light guide 1812 includes opposed first and second major surfaces 1812a, 1812b, and diffractive surface features 1813 are formed on the first major surface 1812. An optional patterned light transmissive layer 1821, comprising at least portion 1821a, is provided atop the major surface 1812a. The light guide 1812, diffractive surface features 1813, and patterned layer 1821 may be the same as or similar to corresponding elements described elsewhere herein. The diffractive surface features 1813 may be provided by a microreplicated optical film 1811c having a prism layer cast and cured on a carrier film. A major portion or bulk of the light guide 1812 may be provided by a plate or other relatively thick substrate 1811a, to which the microreplicated optical film 1811c is attached indirectly through a subsurface film 1811b. In the embodiment of FIG. 18, the subsurface film

1811*b* includes a carrier film on which is disposed a patterned low index subsurface layer 1803. The subsurface layer 1803 comprises first layer portions 1803*a* in first regions 1840, and second layer portions 1803*b* in second regions 1830. Adhesive layers (not shown) may also be provided between the microreplicated optical film 1811*c* and the subsurface film 1811*b*, and between the subsurface film 1811*b* and the substrate 1811*a*, for reliable and robust attachment with no significant air gaps. Such adhesive layers, and the second layer portions 1803*b*, and the carrier films, and the prism layer all preferably have relatively high refractive indices that match, substantially match, or exceed the refractive index of the substrate 1811*a*, such that these components support the propagation of guided-mode light along the light guide 1812 between the surfaces 1812*a*, 1812*b*.

The first layer portions 1803*a* of the subsurface layer 1803 comprise a suitable nanovoided polymeric material having a first refractive index that is substantially lower than that of the other components of the light guide 1812. The nanovoided polymeric material may be or comprise any of the ultra low index (ULI) materials discussed elsewhere herein. Preferably, substantially all of each first layer portion 1803*a* includes the nanovoided polymeric material. Further, the index of refraction is preferably relatively spatially uniform within each first layer portion 1803*a*, e.g., the refractive index may change by no more than ±0.02 across a continuous transverse plane for each layer portion. The refractive index of the first portions 1803*a* may be less than 1.4, or less than 1.3, or less than 1.2. The nanovoided polymeric material may have a void volume in a range from about 10 to about 60%, or from about 20 to about 60%, or from about 30 to about 60%, or from about 40 to about 60%.

The second layer portions 1803*b* in the second regions 1830 comprise the same nanovoided polymeric material used in the first layer portions 1803*a*, but the second portions 1803*b* also include an additional material. The additional material, which may permeate some or substantially all of the void volume of the nanovoided material, causes the second portions 1803*b* to have a second refractive index that is different from the first refractive index by at least about 0.03, e.g., from about 0.03 to about 0.5, from about 0.05 to about 0.5, or from about 0.05 to about 0.25. The index of refraction is preferably relatively spatially uniform within each second layer portion 1803*b*, e.g., the refractive index may change by no more than ±0.02 across a continuous transverse plane for each layer portion.

As a result of the lower refractive index in the first regions 1840, guided-mode light (sometimes also referred to as supercritical light) that encounters the first layer portions 1803*a* is reflected by TIR back towards the major surface 1812*b* before it reaches the major surface 1812*a* with the diffractive surface features 1813. That is, the first layer portions 1803*a* deflect or block some of the guided-mode light from reaching and interacting with the diffractive surface features in the first regions 1840. This is depicted in FIG. 18 by guided-mode light ray 1816*b*. On the other hand, the substantial matching (or exceeding) of the refractive index of the second layer portions 1803*b* with those of the polymers, carrier films, and substrate 1811*a*, causes guided-mode light that encounters the second layer portions 1803*b* to continue propagating substantially undisturbed to the first major surface 1812*a*, where at least some of the light is extracted or out-coupled into the surrounding medium, as described in detail above, by the diffractive surface features 1813. This is depicted in FIG. 18 by guided-mode light ray 1816*a*. The subsurface layer 1803 thus selectively, in a pattern-wise fashion, deflects some of the guided-mode light within the light guide 1812 so that it does not interact with the diffractive surface features 1813.

FIG. 18*a* shows a schematic cross section of an exemplary embodiment of the patterned low index subsurface layer 1803. The layer 1803 includes first layer portions in first regions 1840, the layer portions in both such regions comprising a nanovoided polymeric material. In some embodiments, the nanovoided polymeric material comprises a plurality of interconnected nanovoids as described for example in WO 2010/120422 (Kolb et al.) and WO 2010/120468 (Kolb et al.). The plurality of interconnected nanovoids is a network of nanovoids dispersed in a binder wherein at least some of the nanovoids are connected to one another via hollow tunnels or hollow tunnel-like passages. The nanovoids or pores in such nanovoided polymeric material can extend to one or more surfaces of the material.

The subsurface layer 1803 also includes a second layer portion in a second region 1830 disposed between first regions 1840. The second region comprises the nanovoided polymeric material and an additional material. This additional material may occupy at least a portion of the void volume of the nanovoided polymeric material. The dashed lines in FIG. 18*a* are used to indicate general location of the first and second regions, however, these dashed lines are not meant to describe any sort of boundary between the regions.

In some embodiments, a seal layer is disposed on the patterned low index subsurface layer in order to minimize penetration of contaminants into the latter. For example, a seal layer may be disposed on the patterned low index subsurface layer such that it is in between the patterned low index subsurface layer and an adhesive layer. For another example, a seal layer may be disposed on the patterned low index subsurface layer such that it is in between the patterned low index subsurface layer and the substrate or other constituent layer of the lightguide, and the seal layer may have a refractive index that is approximately equal to or greater than that of the substrate or other layer. Suitable seal layers are discussed in the commonly assigned U.S. patent applications cited above.

In FIG. 19, a light guide 1912 includes opposed first and second major surfaces 1912*a*, 1912*b*, and diffractive surface features 1913 are formed on the first major surface 1912. An optional patterned light transmissive layer 1921, comprising at least portion 1921*a*, is provided atop the major surface 1912*a*. The light guide 1912, diffractive surface features 1913, and patterned layer 1921 may be the same as or similar to corresponding elements described elsewhere herein. The diffractive surface features 1913 may be provided by a prism layer 1911*c* which is cast-and-cured, microreplicated, embossed, etched, or otherwise formed on a high index resin layer 1911*b*. The resin layer 1911*b* may in turn be applied to a plate or other relatively thick substrate 1911*a*, which may comprise a major portion or bulk of the light guide 1912. However, before the resin layer 1911*b* is applied to the substrate 1911*a* and cured, a patterned low index subsurface layer 1903 is pattern-wise applied to the substrate 1911*a*. The subsurface layer 1903 comprises first layer portions 1903*a* in first regions 1940, but the subsurface layer 1903 is either not applied to, or is applied to and later removed from, the substrate 1911*a* in second regions 1930. Thus, at the time of application of the resin layer 1911*b*, the resin layer fills in the spaces in the second regions 1930. If desired, adhesive layers (not shown) and carrier films (not shown) may also be included in the construction, depending on the details of manufacture. Any such adhesive layers and carrier films, as well as the resin layer 1911*b* and the prism layer 1911*c*, all preferably have relatively high refractive indices that match, substantially match, or exceed the refractive index of the substrate 1911a, such that these components support the propagation of guided-mode light along the light guide 1912 between the surfaces 1912a, 1912b.

The first layer portions 1903a of the subsurface layer 1903 are composed of a low index material having a first refractive index that is substantially lower than that of the other components of the light guide 1912. In some cases, the low index material may be or comprise a nanovoided material such as those discussed in connection with FIGS. 18 and 18a, e.g., a ULI material. In other cases, the low index material may be an optical material that is not nanovoided, e.g., a UV curable resin comprising at least one fluorinated monomer, at least one fluorinated oligomer, at least one fluorinated polymer, or any combination of such fluorinated materials. Preferably, the refractive index of the first portions 1903a is less than 1.47, or less than 1.43, or less than 1.4, or less than 1.3, or less than 1.2.

The high index resin layer 1911b may be composed of any suitable polymer or other light-transmissive material having a suitably high refractive index so that a substantial amount of guided-mode light can propagate from the substrate 1911a to the prism layer 1911c.

As a result of the lower refractive index in the first regions 1940, guided-mode or supercritical light that encounters the first layer portions 1903a is reflected by TIR back towards the major surface 1912b before it reaches the major surface 1912a with the diffractive surface features 1913. That is, the first layer portions 1903a block some of the guided-mode light from reaching and interacting with the diffractive surface features in the first regions 1940. This is depicted in FIG. 19 by guided-mode light ray 1916b. On the other hand, the substantial matching (or exceeding) of the refractive index of the resin layer 1911b with those of the polymers, carrier films, and substrate 1911a, causes guided-mode light that encounters the second regions 1930 to continue propagating substantially undisturbed to the first major surface 1912a, where at least some of the light is extracted or out-coupled into the surrounding medium, as described in detail above, by the diffractive surface features 1713. This is depicted in FIG. 19 by guided-mode light ray 1916a.

The pattern provided by the patterned low index subsurface layer (e.g., layers 1803, 1903) may be closely related, loosely related, or not related at all to the pattern provided by the patterned light transmissive layer (e.g., layers 1821 and 1921). In some cases, the subsurface pattern may be a gradient pattern designed to deliver uniform light or luminance to the diffractive surface features on the major surface of the light guide. In such cases, the printed pattern (if present) on the diffractive surface features can be any desired shape or image, and no registration of any kind between the two patterns is needed. Typically, the two patterns would at least partially overlap in such cases. In other cases, the subsurface pattern may be in the form of a specific image (e.g. indicia), whether a solid image print or dithered print in the shape of an image. In these cases, the printed pattern (if present) on the diffractive surface features may be registered with the subsurface pattern, but such registration is not required. For example, in some cases, for aesthetic or artistic purposes, distinctly different images with no particular alignment or registration can be provided by the two patterns. Such patterns, which would typically be at least partially overlapping, can be used to create interesting levels of contrast in the illumination scheme to provide a unique appearance for the lighting device. However, in some cases, alignment or registration of the two patterns can be used to amplify the visual effect or contrast of foreground and background areas of the patterns, e.g., by selectively delivering more light to printed areas of the diffractive surface features and blocking light from reaching non-printed areas of the diffractive surface features, or vice versa. In that regard, the patterns can be made to be spatially complementary, and registered to each other such that the subsurface pattern delivers light substantially only to non-printed regions of the diffractive surface features, which may also result in a contrast enhancement of the image. In still other cases, the two patterns may be the same or similar to each other, but offset in registration by a controlled amount to provide a shadowing effect, such as the shadowing effect used for displayed text commonly used in computer presentation software.

In addition to being useful as luminaires for illuminating work spaces, living areas, and the like, lighting devices such as those shown and described in FIGS. 18 and 19, as well as other lighting devices disclosed herein (particularly ones that incorporate only one light guide), may alternatively be useful as illuminated security features, wherein the pattern(s) provided by the printed layer(s) provide indicia that may be covert and/or overt in nature as desired. In some security applications, the device may be incorporated into or applied to a product, package, or document, e.g. as an indicator of authenticity since the visual features are difficult to copy or counterfeit. Such security applications may include: cards of various types including identification cards, social security cards, health cards, insurance cards, business cards, membership cards, voter registration cards, phone cards, stored value cards, gift cards, border crossing cards, immigration cards, and financial transaction cards (including credit cards and debit cards); badges; passports; drivers licenses; vehicle license plates; gun permits and other permits; event passes; advertising promotions; product tags including hang-tags; product packaging; labels; charts; maps; and other security articles and documents.

In some cases, such as in a card, one or more miniature light sources such as LEDs may be included in the construction at or near an edge of the card to provide the guided-mode light. In other cases, such as in the case of a passport or other security document, but also in the case of cards, light sources may not be included in the article itself, but the article may be configured for use with a reader or similar testing device that contains one or more suitable light sources adapted to couple to an edge (or other surface) of the card or document to inject light into the light-transmissive layer or layers that make up the light guide, or the article may be configured for use with natural light sources. The light guide may be relatively thick and rigid, as in the case of a clear light-transmissive financial transaction card, or relatively thinner and flexible, as in the case of a polymer sheet for use in a passport, for example.

Figure 20:
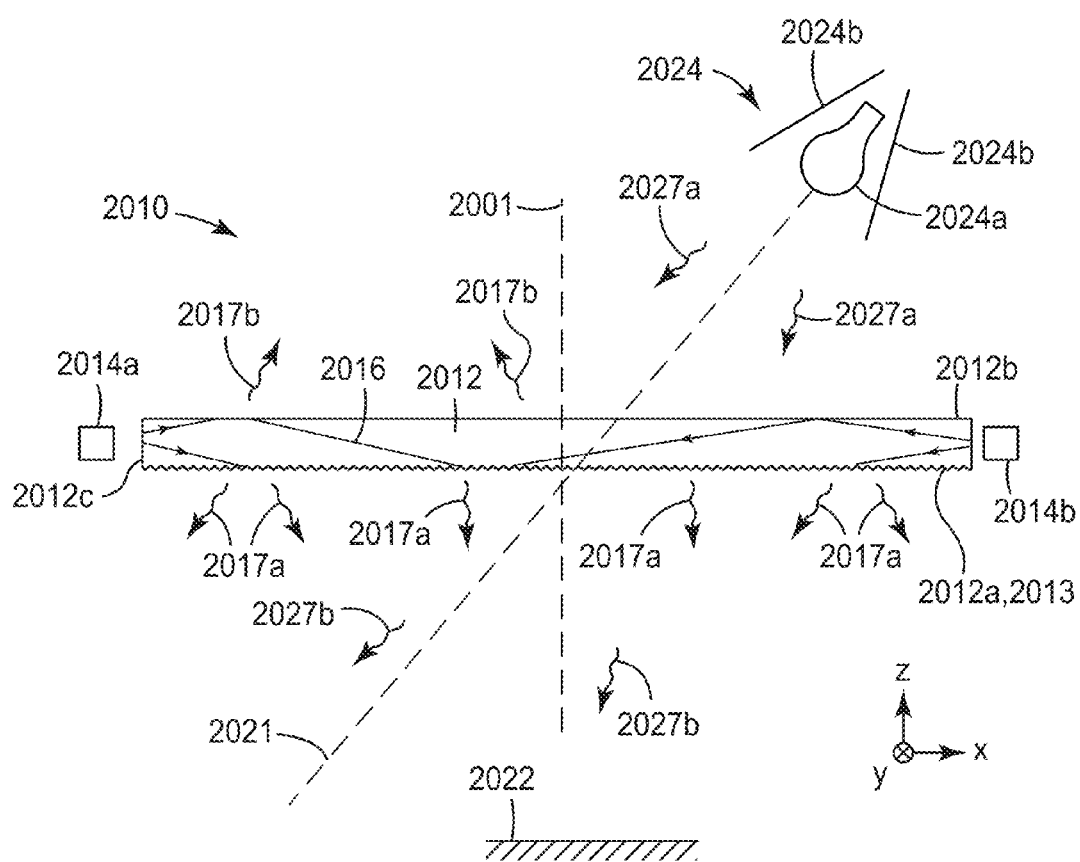
FIG. 20 is a schematic side or sectional view of a lighting device that combines light extracted from the light guide by diffractive surface features with light projected through the light guide as non-guided-mode light.

An embodiment that may be useful as a luminaire to provide general purpose or decorative illumination In the discussion near the beginning of this detailed description, we say we have found that unique lighting devices can be made by combining an extended area light guide with other components or features. One such other component or feature is one or more light sources configured to project light through the light guide as non-guided-mode light. A lighting device that makes use of this combination is shown in FIG. 20. In this figure, lighting device 2010 may be the same as or similar to lighting device 110 of FIG. 1, where the object 124 is a spotlight, light bulb, LED, or other light source that (in some cases) may have no diffractive surface features, but that is mounted such that most or at least some of the light it emits is directed through the light guide as non-guided-mode light. Lighting device 2010 thus includes discrete light sources 2014a, 2014b, and an extended area light guide 2012 which includes opposed major surfaces 2012a, 2012b, side surfaces, and diffractive surface features 2013 provided on major surface 2012a, which couple guided-mode light 2016 out of the light guide as emitted light 2017a, propagating generally towards a reference surface of interest 2022, and as emitted light 2017b, propagating generally away from the reference surface 2022. The light sources 2014a, 2014b, light guide 2012, and diffractive surface features 2013 may be the same as or similar to corresponding elements of lighting device 110.

The light guide 2012 and its diffractive surface features 2013 are designed such that the light guide 2012 provides little or no optical distortion for non-guided-mode light. In the lighting device 2010, the non-guided-mode light 2027a is provided by the light source 2024, which may be or comprise a spotlight, light bulb, LED, or other suitable light source. The light 2027a passes through the light guide 2012 to provide transmitted light 2027b, which may not be substantially deviated by the light guide 2012 due to the low distortion. The light source 2024 is shown in the figure to include an active element 2024a such as one or more LED dies which convert electricity into visible light, and one or more reflective members 2024b which help direct some of the light from the element 2024a generally closer to an optical axis 2021 of the light source 2024. The light source 2024 may be mounted such that the optical axis 2021 is misaligned a desired amount relative to an optical axis 2001 of the light guide 2012 as shown in the figure, or the light source 2024 may instead be mounted such that the optical axes 2021, 2001 are substantially coincident, or substantially parallel but spaced apart from each other.

Relative aspects and features of (1) the light sources 2014a, 2014b, the light guide 2012, and the diffractive surface features 2013, and (2) the light source 2024, can be selected so that the light provided from these two subsystems combines to provide the desired overall functionality, e.g., a desired appearance to the ordinary user and/or a desired illumination at the reference surface 2022. In some cases, it may be desirable to configure the diffractive surface features 2013 so that guided-mode light that is out-coupled by the features 2013 is directed predominantly in the same or similar direction as light emitted by the light source 2024. For example, in the case of FIG. 20, the projected light from the light source 2024 enters the major surface 2012b and exits the major surface 2012a; hence, the diffractive surface features may be configured to couple more guided-mode light out of the major surface 2012a (see light 2017a) than out of the major surface 2012b (see light 2017b). In this way, for example, the lighting device 2012 can be made to deliver light more efficiently to the reference surface 2022.

Wavelength- or color-related aspects of the two subsystems can also be considered. In some cases, it may be advantageous to configure the subsystems such that the light 2027b delivered by the light source 2024 has substantially the same or similar color (whether substantially white, or non-white) as the light 2017a delivered by the light sources, light guide, and diffractive surface features. In other cases, it may be advantageous for the light 2027b to have a substantially different color than the light 2017a. Furthermore, it may be desirable for the overall illumination at the reference surface 2022 to have certain characteristics such as, in some cases, having a substantially uniform color, and/or having a specified color such as substantially white, or non-white.

Note that although only one light source 2024 that projects non-guided-mode light through the light guide is shown in FIG. 20, alternative embodiments are contemplated in which a plurality of light sources, e.g., 2, 3, 4, or more, are provided to project such light through the light guide, e.g. in different directions. Note also that in some cases the additional light sources may be of the same or similar design as the subsystem encompassed by the light sources 2014a, 2014b, the light guide 2012, and the diffractive surface features 2013, in which case the overall lighting device may be the same as or similar to that of FIG. 8.

The lighting device 2010 may also incorporate other features disclosed herein, e.g., it may exhibit a band or pattern of bands having a 3-dimensional appearance or shape that changes with viewing position, and it may include a patterned light transmissive layer that optically contacts some but not other diffractive surface features to define indicia, and it may incorporate a patterned low index subsurface layer within the light guide, and the diffractive surface features may include diffractive features of different pitches in non-overlapping regions of the major surface tailored to extract guided-mode light of different colors from the light guide in different directions to provide a colorful appearance to an ordinary user.

Figure 20A:
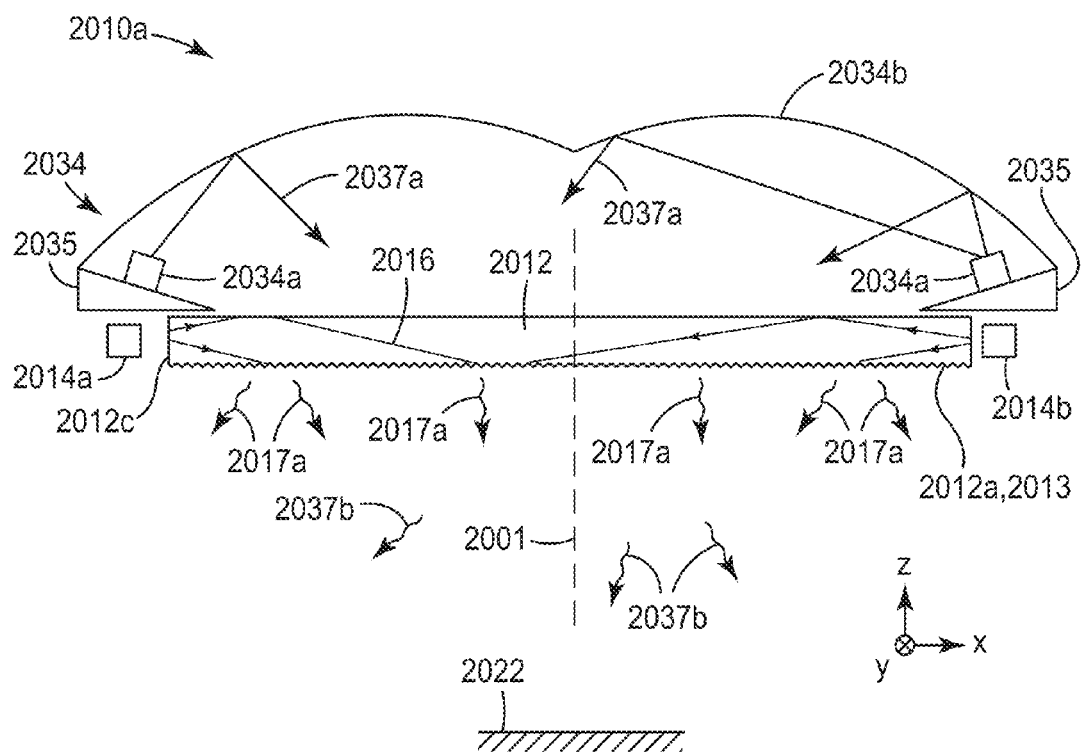
FIG. 20a is a schematic side or sectional view of a lighting device similar to that of FIG. 20, but where the non-guided-mode light projected through the light guide is indirect illumination provided by reflected light.

FIG. 20a shows a lighting device 2010a that may be the same as or similar to lighting device 2010 of FIG. 20, except that the light source 2024 is replaced by an alternative light source 2034 which projects non-guided-mode light through the light guide 2012 using reflected light or indirect illumination. Elements in FIG. 20a that are the same as or similar to elements in FIG. 20 have the same reference number, and require no further explanation. The light source 2024 is removed and replaced by light source 2034. Light source 2034 includes light sources 2034a, which may be LEDs or other suitable light sources, and which are mounted on support members 2035. The sources 2034a may have the same or similar emission characteristics, or instead they may have substantially different emission characteristics. The support members 2035 may function as heat sinks for the light sources 2034a, and for light sources 2014a, 2014b. The light source 2034 also includes a custom-formed reflector 2034b. The reflector 2034b may be or comprise a molded or thermoformed optical body which may be or include a thermoformed multilayer optical film, or other suitable reflective layer. If a multilayer optical film is used, the film may be tailored to reflect light broadly over substantially the entire visible spectrum, or it may selectively reflect some visible wavelengths and selectively transmit other visible wavelengths, which reflection and transmission may change as a function of incidence angle of the light from the sources 2034a. In any case, the reflector 2034b substantially reflects light that is incident from the sources 2034a as reflected light 2037a, and this light 2037a then passes as non-guided-mode light through the light guide 2012 to provide transmitted light 2037b. The transmitted light 2037b may not be substantially deviated by the light guide 2012 due to the low distortion. The light sources 2034a and reflector 2034b are shown to be symmetrically disposed relative to the optical axis 2001 of the light guide 2012, but alternative arrangements in which the light sources 2034a and/or reflector 2034b are not symmetrically disposed are also contemplated.

Another component or feature discussed near the beginning of this detailed description is incorporating into the lighting device other light guides having diffractive surface features formed thereon, as well as a framework of interconnected support members, which may be attached to multiple such light guides and may contain light sources to inject light into the light guides. Lighting devices that make use of such combinations are shown in FIGS. 21 through 38.

Figure 21:
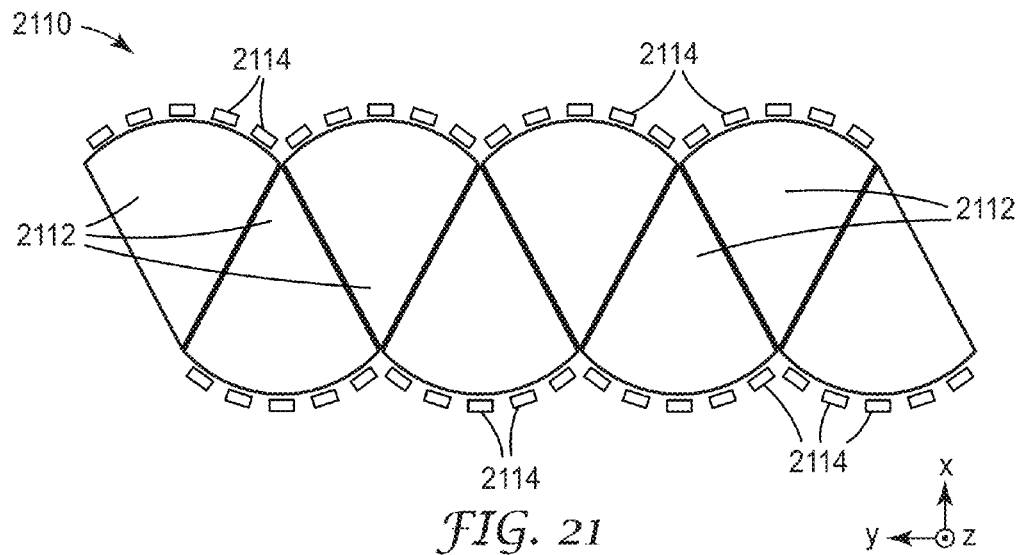
FIG. 21 is a schematic front or plan view of a lighting device that includes a group of flat pie-shaped light guides and discrete light sources.

In FIG. 21, a lighting device 2110 includes a group of flat sector- or pie-shaped light guides 2112 and discrete light sources 2114, the light guides 2112 being suitable for being combined together with light guides of the same or similar design to provide a lighting device with an even larger extended emitting area. Each of the light guides 2112 includes diffractive surface features (not shown in FIG. 21) formed on at least one major surface thereof to couple guided-mode light out of the light guide, as is discussed at length elsewhere herein. The light guides 2112 may be affixed to each other in an alternating tiling arrangement as shown so the resulting group of light guides extends along the y-direction. In this arrangement, straight side surfaces of adjacent light guides 2112 are affixed to each other. The various light guides 2112 may all have the same nominal design features, e.g. the same pitch configuration of diffractive surface features, or light guides of differing design may instead be used. One, some, or all of the light guides 2112 may be the same as or similar to light guide 1412 of FIG. 14.

The device 2110 also includes a plurality of discrete light sources 2114 distributed along the curved side surfaces of the light guides 2112 to inject light therein. In alternative embodiments the light sources may be long and extended rather than discrete. The light sources 2114 may all be of the nominally same design, e.g., nominally the same output spectrum (color), output power, and physical dimensions. For example, the light sources 2114 may all emit substantially white light. Alternatively, two or more of multiple light sources may substantially differ in design, e.g., they may have different output spectra (e.g. one may emit red light, another may emit green light, another may emit blue light, another may emit white light, and so forth), or different output powers. If three distinct packet types of diffractive surface features are used for each light guide 2112, e.g. a red, green, and blue packet type as shown in FIG. 14, then the light sources 2114 for each light guide 2112 may comprise or consist essentially of one or more red light source, one or more green light source, and one or more blue light source.

In some cases, the light guides 2112 may be affixed to each other directly, such as by a suitable adhesive film or layer. In other cases, they may be connected to each other by a framework of interconnected support members. Such frameworks are discussed in greater detail in connection with FIGS. 24 and 25 below. The light sources 2114 may be incorporated into the framework. In some cases, one or more support members may be disposed between adjacent light guides, e.g., at the junctions of flat side surface pairs of the light guides 2112. In such cases, some or all of the light sources 2114 may be repositioned such that they are disposed on or in the support members between adjacent pairs of light guides, similar to the arrangement shown in FIG. 24 below.

The light guides 2112 may be substantially coplanar, e.g., oriented parallel to the x-y plane to within manufacturing tolerances, or they may be non-coplanar. If non-coplanar, they may be arranged into a concave shape as discussed below in connection with FIGS. 32 and 33, or into other shapes. Whether planar or non-coplanar, the diffractive surface features for each light guide 2112 may be configured to couple guided-mode light preferentially out of one of the opposed major surfaces, designated an output major surface of the light guide, and the output major surfaces for some or all of the light guides 2112 may face generally in a same direction. For example, if the light guides are coplanar, the output major surfaces may have surface normal vectors that are all parallel to the z-axis and all pointing in the same direction (either the +z direction or the −z direction), such that the scalar product of the surface normal vectors, for some or all possible combinations of two light guides within the group of light guides, is positive. If the light guides are not coplanar, the surface normal vectors for the output major surfaces may be pointing in directions that are not parallel, but which may all have vector components along a particular direction (such as the +z direction or the −z direction) such that again the scalar product of the surface normal vectors, for some or all possible combinations of two light guides within the group of light guides, is positive.

Figure 22:
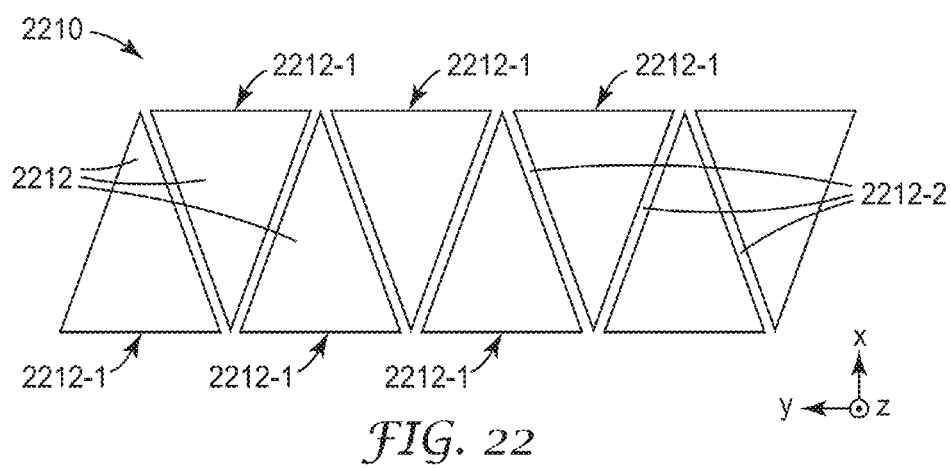
FIGS. 22 and 23 are schematic front or plan views of lighting devices that include groups of triangle-shaped light guides.

FIG. 22 shows a lighting device 2210 that may have the same or similar features as discussed above in connection with lighting device 2110. However, rather than sector- or pie-shaped light guides, the device 2210 uses triangle-shaped light guides 2212. Again, each of the light guides 2212 includes diffractive surface features (not shown in FIG. 22) formed on at least one major surface thereof to couple guided-mode light out of the light guide. The light guides 2212 may be affixed to each other in an alternating tiling arrangement as shown so the resulting group of light guides extends along the y-direction. In this arrangement, long side surfaces of adjacent light guides 2212 are affixed to each other. The various light guides 2212 may all have the same nominal design features, e.g. the same pitch configuration of diffractive surface features, or light guides of differing design may instead be used. The diffractive surface features may be curved or straight in plan view, and may have any desired orientation relative to the side surfaces of a given light guide.

The device 2210 also includes a plurality of light sources (not shown), which may be disposed along side surfaces (shown generally at 2212-1) that are exterior to the shape formed by the collection of light guides 2212, and/or along side surfaces (shown generally at 2212-2) that are interior to the overall shape. The light sources may be as described above in connection with lighting device 2110.

The light guides 2212 may be affixed to each other directly, or by a framework of interconnected support members as discussed above in connection with lighting device 2110. Such support members may incorporate the light sources and may be disposed at the exterior side surfaces (shown generally at 2212-1) and/or at interior side surfaces (shown generally at 2212-2).

The light guides 2212 may be substantially coplanar, or non-coplanar, and if the latter, then they may be arranged into a concave shape, or into other shapes. Whether planar or non-coplanar, the diffractive surface features for each light guide 2212 may be configured to couple guided-mode light preferentially out of one of the opposed major surfaces, designated an output major surface of the light guide, and the output major surfaces for some or all of the light guides 2212 may face generally in a same direction as discussed in connection with lighting device 2110.

Figure 23:
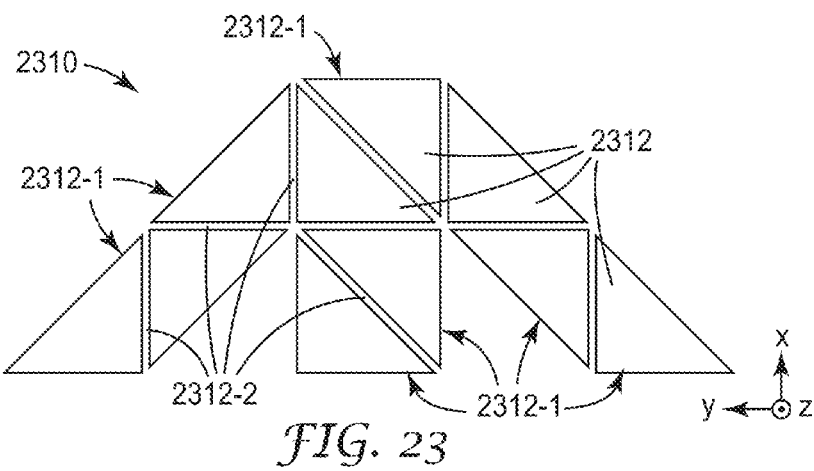

FIG. 23 shows a lighting device 2310 that may have the same or similar features as discussed above in connection with lighting device 2210. Similar to device 2210, device 2310 uses triangle-shaped light guides 2312. Again, each of the light guides 2312 includes diffractive surface features (not shown in FIG. 22) formed on at least one major surface thereof to couple guided-mode light out of the light guide. The light guides 2312 may be affixed to each other in a complex tiling arrangement as shown so the resulting group of light guides produces a desired overall shape. The various light guides 2312 may all have the same nominal design features, e.g. the same pitch configuration of diffractive surface features, or light guides of differing design may instead be used. The diffractive surface features may be curved or straight in plan view, and may have any desired orientation relative to the side surfaces of a given light guide.

The device 2310 also includes a plurality of light sources (not shown), which may be disposed along side surfaces (shown generally at 2312-1) that are exterior to the shape formed by the collection of light guides 2312, and/or along side surfaces (shown generally at 2312-2) that are interior to the overall shape. The light sources may be as described above in connection with lighting device 2210.

The light guides 2312 may be affixed to each other directly, or by a framework of interconnected support members as discussed above in connection with lighting device 2210. Such support members may incorporate the light sources and may be disposed at the exterior side surfaces (shown generally at 2312-1) and/or at interior side surfaces (shown generally at 2312-2).

The light guides 2312 may be substantially coplanar, or non-coplanar, and if the latter, then they may be arranged into a concave shape, or into other shapes. Whether planar or non-coplanar, the diffractive surface features for each light guide 2312 may be configured to couple guided-mode light preferentially out of one of the opposed major surfaces, designated an output major surface of the light guide, and the output major surfaces for some or all of the light guides 2312 may face generally in a same direction as discussed in connection with lighting device 2210.

Figure 24:
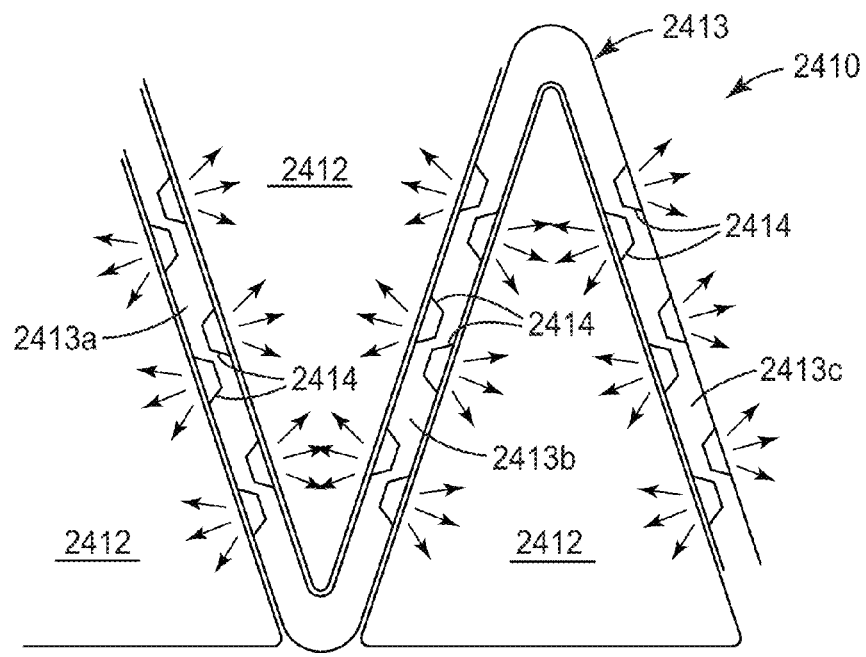
FIGS. 24 and 25 show details of lighting devices in which a plurality of light guides are attached to a framework of interconnected support members, the support members containing a plurality of light sources to inject light into the light guides.
Figure 25:
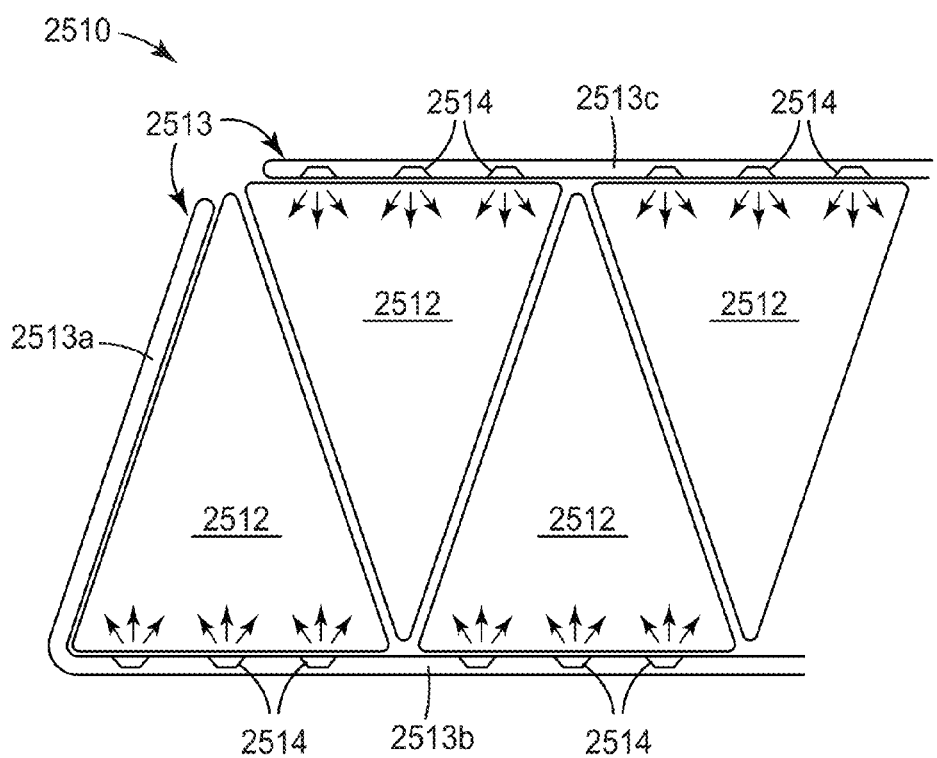

In FIGS. 24 and 25, details of lighting devices are shown in which a plurality of light guides are attached to a framework of interconnected support members, the support members containing a plurality of light sources to inject light into the light guides. The light guides include diffractive surface features on one or both major surfaces thereof to couple guided-mode light out of the light guide, as disclosed herein. The individual light guides shown in these figures are triangular in shape, but the reader will understand that the framework can be readily reconfigured to accommodate light guides of virtually any shape or configuration.

FIG. 24 shows a portion of a lighting device 2410 comprising light guides 2412, diffractive surface features (not shown) as discussed herein on at least one major surface of the light guides, and light sources 2414 disposed to inject light into the light guides. The lighting device 2410 may be substantially similar to the lighting devices of FIGS. 22 and 23, for example. The light sources 2414 are disposed in or on support members 2413a, 2413b, 2413c, which are interconnected with each other to form a framework 2413. The light guides attach to the framework 2413, and the framework supports the light guides 2412 and holds them in place in their desired relative positions.

In the configuration of FIG. 24, the support members are provided along side surfaces that are interior to the shape formed by the collection of light guides, e.g. as shown generally at 2212-2 in FIG. 22 and at 2312-2 in FIG. 23. This can be contrasted with support members 2513a, 2513b, 2513c in FIG. 25, which are provided along side surfaces that are exterior to the shape formed by the light guides. Thus, in FIG. 25, a portion of a lighting device 2510 includes light guides 2512, diffractive surface features (not shown) as discussed herein on at least one major surface of the light guides, and light sources 2514 disposed to inject light into the light guides. The lighting device 2510 may be substantially similar to the lighting devices of FIGS. 22 and 23, for example. The light sources 2514 are disposed in or on support members 2513a, 2513b, 2513c, which are interconnected with each other to form a framework 2513. The light guides attach to the framework 2513, and the framework supports the light guides 2512 and holds them in place in their desired relative positions.

In some cases, a lighting device as disclosed herein may use a framework that has support members disposed only at interior side surfaces of the group of light guides, as shown in FIG. 24. In other cases, a lighting device as disclosed herein may use a framework that has support members disposed only at exterior side surfaces of the light guides, as shown in FIG. 25. In still other cases, a lighting device as disclosed herein may use a framework that has one or more support members disposed at interior side surfaces of the light guides, in combination with one or more support members disposed at exterior side surfaces of the light guides. A support member that is disposed at an interior side surface connects to more than one light guide at at least some points along the length of the support member; for example, support member 2413a connects to two light guides 2412 disposed on opposite sides of the support member 2413a. In contrast, a support member that is disposed at an exterior side surface connects to only one of the light guides at any given point along the length of the support member; for example, at any given point along the support member 2513b, the support member connects to only one light guide.

Attachment of a given light guide to a given support member may be accomplished by any known technique, including through the use of a suitable adhesive layer or material, and/or mechanical connections such as a press-fit joint or a tongue-in-groove joint.

The support members of FIGS. 24 and 25 may be made of any suitable material, and have any suitable construction configuration. For example, the support members may be made of suitable metals, plastics, or other suitable materials. The support members may be hollow or solid, and may have any suitable cross-sectional shape including rectangular, square, circular, elliptical, or of another desired shape, which may be constant or variable along the length of a given support member. Since light sources are provided in or on at least some of the support members, it is advantageous for the support members to be shaped to accommodate the light sources, as well as electrical wires or other electrical connections that can connect the light sources to one or more power supplies capable of energizing the light sources. To prevent overheating of the light sources and allow for increased drive currents, it is desirable for the support members to have a relatively high thermal conductivity so that heat can be drawn away from the light sources to prevent overheating.

Additional lighting devices that incorporate multiple light guides are shown in FIGS. 26-30. In these figures, for simplicity, only the light guides with their respective plan view sizes, shapes, and relative configurations are shown, but it will be understood that light sources and diffractive surface features as disclosed herein, as well as an optional supporting framework, are also assumed to be present. The light sources may be provided on interior side surfaces and/or exterior side surfaces of the collection of light guides, as exemplified in FIGS. 24 and 25. The light guides may be substantially coplanar, or they may be non-coplanar as discussed further below. Whether planar or non-coplanar, the diffractive surface features for each light guide may be configured to couple guided-mode light preferentially out of one major surface, designated the output major surface, of the light guide, and the output major surfaces for some or all of the light guides may face generally in a same direction, as discussed above.

Figure 26:
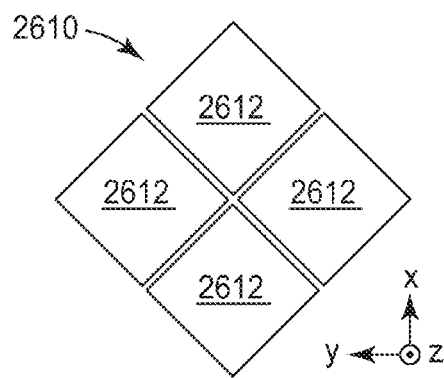
FIGS. 26 through 30 are schematic front or plan views of more lighting devices each of which includes multiple light guides connected together.
Figure 27:
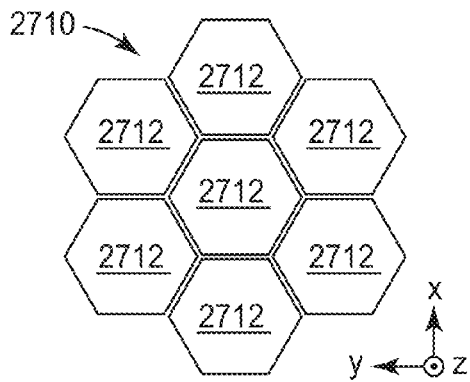
Figure 28:
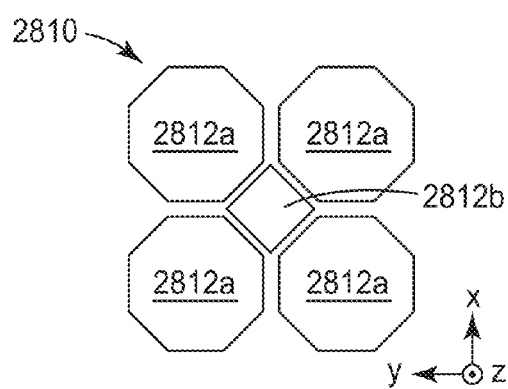
Figure 29:
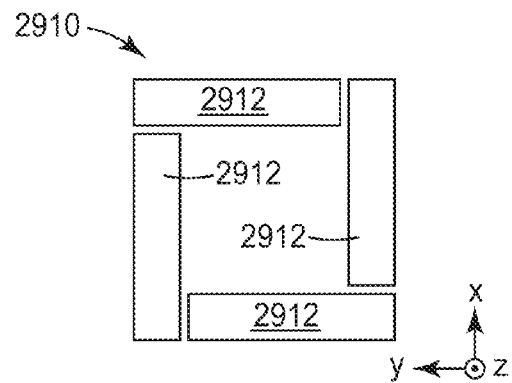
Figure 30:
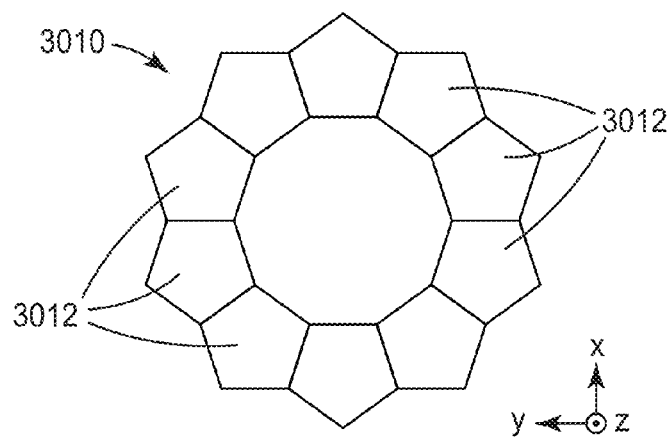

In FIG. 26, a lighting device 2610 is composed of four light guides 2612 having the same or similar square or diamond shape. The light guides 2612 are grouped together, and may be attached to each other e.g. using a suitable framework, to form an overall shape that is also a square or diamond shape. In FIG. 27, a lighting device 2710 is composed of seven light guides 2712 having the same or similar hexagonal shape. The light guides 2710 are grouped together, and may be attached to each other e.g. using a suitable framework, to form an overall honeycomb-like shape. In FIG. 28, a lighting device 2810 is composed of four light guides 2812a having the same or similar octagonal shape, and one square- or diamond-shaped central light guide 2812b. The light guide 2812b fills a gap formed by the other light guides. In an alternative embodiment, the light guide 2812b may be omitted and the gap may be left open and unoccupied. In FIG. 29, a lighting device 2910 is composed of four light guides 2912 having the same or similar elongated rectangular shape. The light guides 2912 are arranged to form a substantial gap in the central portion of the lighting device 2910. In an alternative embodiment, one or more light guides may be added to partially or fully fill the central gap. In FIG. 30, a lighting device 3010 is composed of ten light guides 3012 having the same or similar pentagonal shape. The light guides 3012 are arranged to form a substantial gap in the central portion of the lighting device 3010. In an alternative embodiment, one or more light guides may be added to partially or fully fill the central gap.

The lighting devices shown and described in connection with FIGS. 21 through 30 may also incorporate other features disclosed herein. For example, each of the light guides in any of these lighting devices may include: a band or pattern of bands having a 3-dimensional appearance or shape that changes with viewing position; a patterned light transmissive layer that optically contacts some but not other diffractive surface features to define indicia; a patterned low index sub-surface layer within the light guide; and the diffractive surface features may include diffractive features of different pitches in non-overlapping regions of the major surface tailored to extract guided-mode light of different colors from the light guide in different directions to provide a colorful appearance to an ordinary user.

Figure 32:
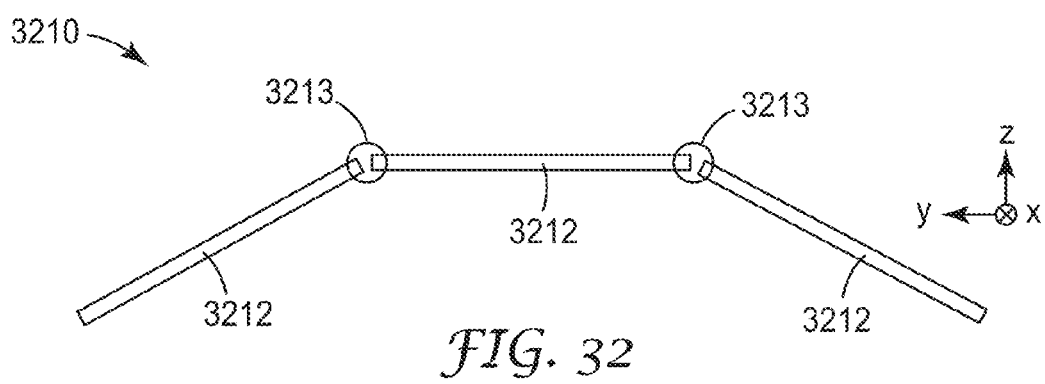
FIGS. 32 and 33 are schematic side or sectional views of lighting devices in which the plurality of light guides are not arranged to be co-planar, but rather are arranged to collectively form a concave shape.
Figure 33:
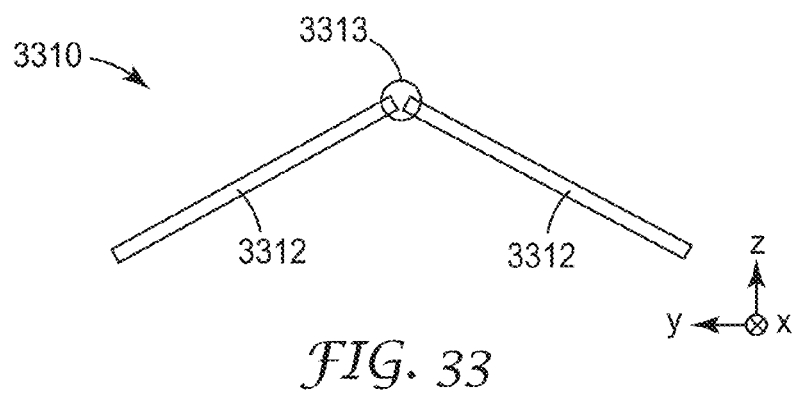

Furthermore, as already mentioned above, any of the lighting devices that employ multiple light guides may have the light guides arranged to be substantially coplanar, or they may be arranged to be non-coplanar. Furthermore, some light guides may be substantially coplanar while other light guides within the same lighting device may be non-coplanar. Substantially coplanar light guides are depicted schematically in FIG. 31, and non-coplanar light guides are depicted schematically in FIGS. 32 through 38. In FIGS. 32 and 33, the light guides are arranged to collectively form an open concave shape. In FIGS. 35-38, the light guides are arranged to collectively form a 3-dimensional concave structure that is closed and hollow. Light sources, diffractive surface features, etc. are not shown in these figures for simplicity, but are assumed to be present in accordance with the teachings herein.

Figure 31:
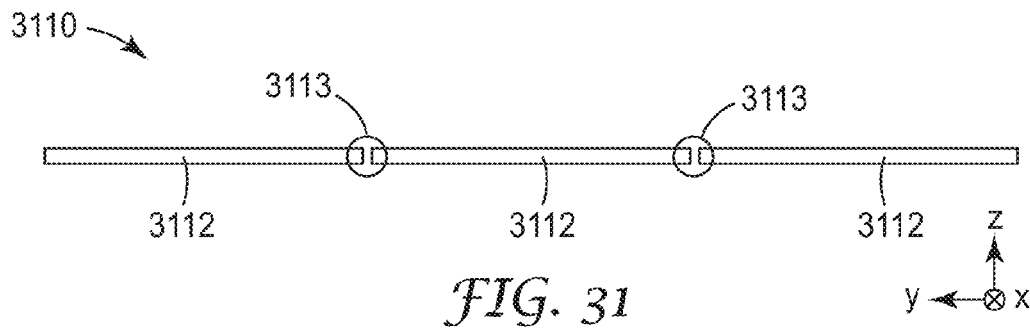
FIG. 31 is a schematic side or sectional view of a lighting device in which the plurality of light guides are arranged to be substantially co-planar.

In FIG. 31, a lighting device 3110 includes three light guides 3112 that are arranged to be substantially coplanar, parallel to an x-y plane. Although three light guides are shown, other numbers of light guides may be used, including only two light guides as well as four, five, or more light guides. The light guides may be connected to each other e.g. to form a rigid or stable overall structure, and if so, such connections may be made using a framework of interconnected support members as discussed above, such as support members 3113. The diffractive surface features of the light guides may be configured to couple guided-mode light preferentially out of major surfaces which are designated output major surfaces, and the output major surfaces for some or all of the light guides may face generally in a same direction, e.g., in the +z direction or in the −z direction, as desired. In such a configuration, the device can direct light more effectively onto a reference surface of interest such as a desk or other surface of interest when the device is used as a luminaire to provide illumination at such surface.

In FIG. 32, a lighting device 3210 includes three light guides 3212 that are arranged to be non-coplanar. The light guides 3212 collectively form an open concave shape. Although three light guides are shown, other numbers of light guides may be used, including only two light guides as well as four, five, or more light guides. (The case of two light guides is shown in FIG. 33, where lighting device 3310 includes light guides 3312 connected to each other via an optional support member 3313 to form another open concave shape.) The light guides may be connected to each other e.g. to form a rigid or stable overall structure, and if so, such connections may be made using a framework of interconnected support members as discussed above, such as support members 3213. The number of light guides used, and their respective sizes and shapes, and the colors of the light sources and the design details of the diffractive surface features, can be selected and combined with a suitable framework such that the lighting device has the appearance of a decorative Tiffany lamp.

The diffractive surface features of the light guides may be configured to couple guided-mode light preferentially out of major surfaces which are designated output major surfaces, and the output major surfaces for some or all of the light guides may face generally in a same direction as discussed above, e.g., the scalar product of the surface normal vectors for some or all possible combinations of two light guides with the group of light guides may be positive. The output major surfaces may be oriented to direct light generally inwardly with respect to the concave shape (e.g. generally in the −z direction in FIGS. 32 and 33), or generally outwardly (e.g. generally in the +z direction in FIGS. 32 and 33), as desired.

In an alternative embodiment to that of FIG. 32, the light guides may be configured such that they collectively form a tubular structure. For example, the two outer light guides 3212 in FIG. 32 can be rotated such that their free ends connect with each other, forming a tubular (cylindrical) structure with a triangular cross-sectional shape. Similarly, four light guides can be connected together to collectively form a tubular structure having a square or rectangular cross-sectional shape, five light guides can be connected to provide a pentagonal-shaped tubular structure, six light guides can be connected to provide a hexagonal-shaped tubular structure, and so forth.

Figure 34:
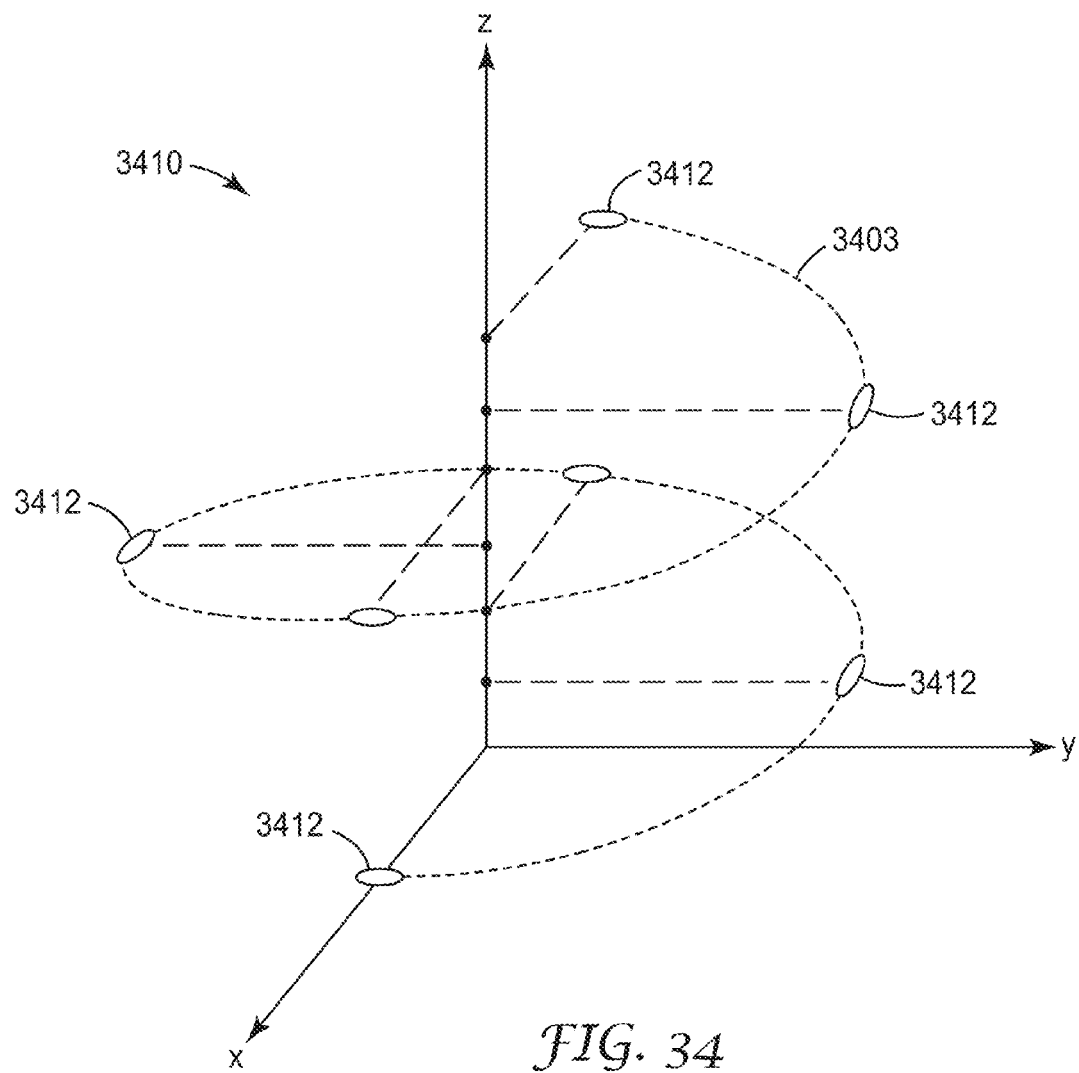
FIG. 34 is a schematic perspective view used to show that, for lighting devices that contain multiple light guides, the light guides can be arranged in a helix.

Another non-coplanar configuration of multiple light guides in a lighting device is shown schematically in FIG. 34. In this figure, a lighting device 3410 has a plurality of light guides 3412 arranged to form a 3-dimensional spiral or helix. For generality, the light guides 3412 are depicted in the figure as small elongated bodies which may represent the centroids and orientations of the respective light guides. However, the light guides 3412 represented by the elongated bodies may have a wide variety of shapes and sizes. For example, the light guides 2612 of FIG. 26, and the light guides 2712 of FIG. 27, and the light guides 2812a of FIG. 28, and the light guides 2912 of FIG. 29, and the light guides 3012 of FIG. 30, may all be arranged into helical shapes as shown generally by the light guides 3412 of FIG. 34. In some cases, the individual light guides that make up the helix may all have the same or similar shape and size (e.g., all rectangular, or all pentagonal, or all hexagonal, or all octagonal, etc.), and in other cases the individual light guides may be of different shapes and/or sizes. The light guides are preferably connected to each other, e.g. via a framework of interconnected support members as discussed in connection with FIGS. 24 and 25.

In still other cases, non-coplanar light guides in a lighting device may be arranged to form a 3-dimensional structure that is closed and hollow. Non-limiting examples of such lighting devices are shown in FIGS. 35-38. Again, for simplicity, these figures do not show light sources, diffractive surface features, and optional frameworks, but they are assumed to be present in accordance with the teachings herein. In view of the fact that these lighting devices are closed and hollow, it is desirable in at least some cases to utilize diffractive surface features that are configured to couple guided-mode light preferentially out of major surfaces which are designated output major surfaces, with the surface normal vectors of the output major surfaces pointing in directions generally away from the interior of the closed structure so that light is preferentially directed outwardly from the lighting device.

Figure 35:
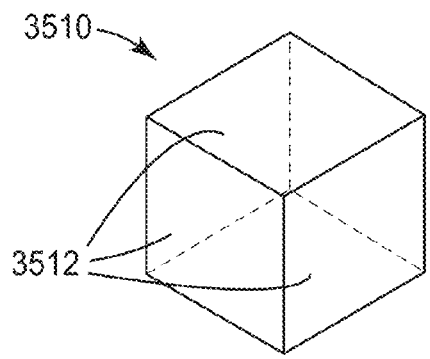
FIGS. 35 through 38 are schematic perspective views of lighting devices in which the multiple light guides are arranged to collectively form 3-dimensional structures that are closed and hollow.
Figure 36:
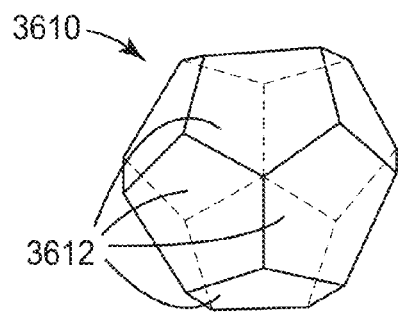
Figure 37:
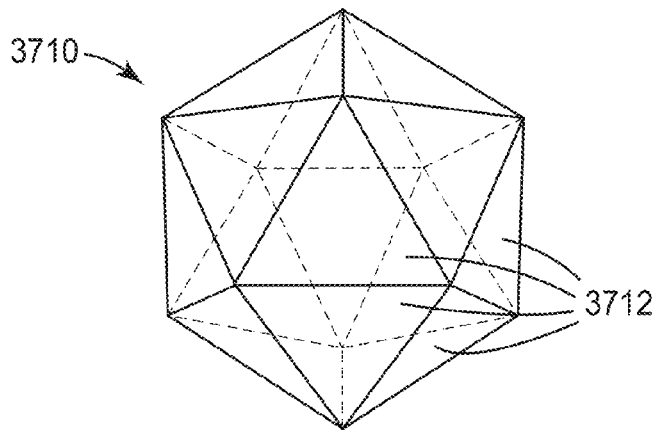
Figure 38:
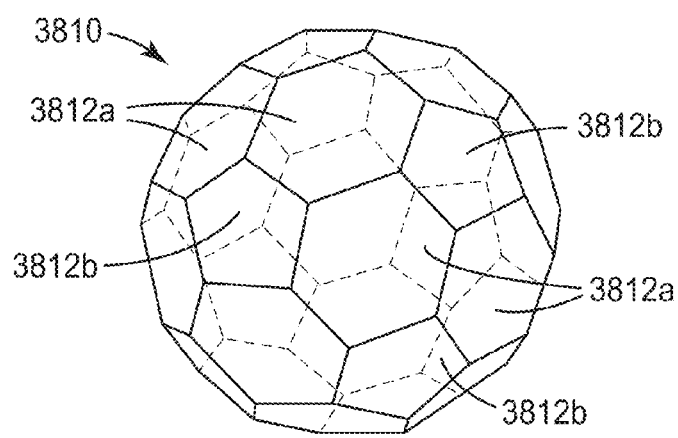

In FIG. 35, a light source 3510 is made up of six generally square-shaped light guides 3512 connected together, e.g. with a framework of interconnected support members, to form a cube. In FIG. 36, a light source 3610 is made up of twelve generally pentagonal-shaped light guides 3612 connected together to form a dodecahedron. In FIG. 37, a light source 3710 is made up of twenty generally triangular-shaped light guides 3712 connected together to form an icosahedron. In FIG. 38, a light source 3810 is made up of a combination of hexagonal-shaped light guides 3812a and pentagonal-shaped light guides 3812b which are arranged and connected together to form a soccer ball-shaped structure. The reader will understand that a wide variety of closed, hollow 3-dimensional structures can be made, and are not limited e.g. to shapes known as Platonic solids.

Figure 39A:
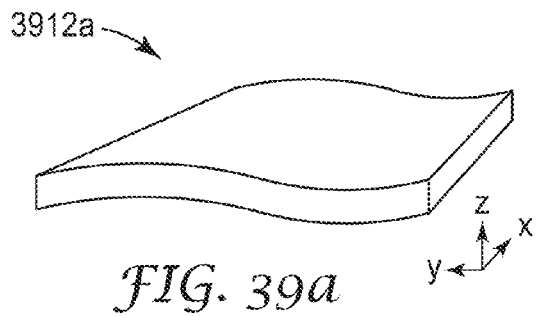
FIGS. 39a through 39c are schematic perspective views of non-flat light guides that may be used in the disclosed lighting devices.
Figure 39B:
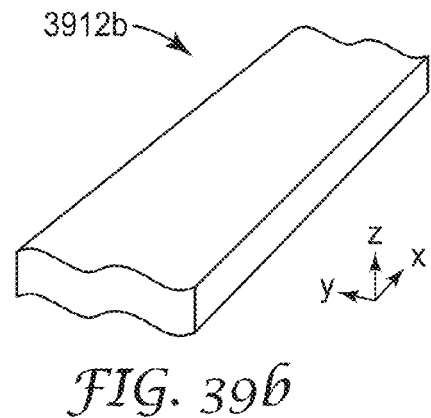
Figure 39C:
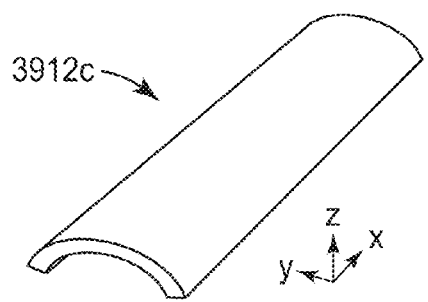

In the preceding figures, both for lighting devices having only one light guide and for lighting devices having multiple light guides, the light guides are generally shown as being flat. This is done for simplicity, but it need not be a restriction on the disclosed lighting devices. The lighting devices herein may instead use one or more light guides that are non-flat. Some examples of non-flat light guides are shown in FIGS. 39a through 39c as light guides 3912a, 3912b, and 3912c respectively. A non-flat light guide may be curved in the form of an arc as with light guide 3912c, or it may have a wavy shape as with light guides 3912a, 3912b. The light guides of FIGS. 39a-39c are shown to be curved in the y-z plane but not the x-z plane, but alternative light guides may be curved in the two orthogonal planes, e.g., the y-z plane and the x-z plane. The light guides of FIGS. 39a-39c are shown as being curved, but alternative non-flat light guides may be segmented (e.g. piecewise flat but bent in one or more places) rather than curved, or both segmented and curved. Whether a given light guide is flat, non-flat, simply curved, complex curved, segmented, and so forth, the light guide generally still has opposed major surfaces, and one or more side surfaces through which light may be injected to provide guided-mode light as discussed herein.

Figure 39D:
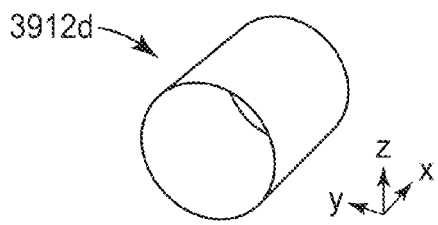
FIGS. 39d and 39e are schematic perspective views of non-flat light guides which are also tube-shaped, and which can be used in the disclosed lighting devices.
Figure 39E:
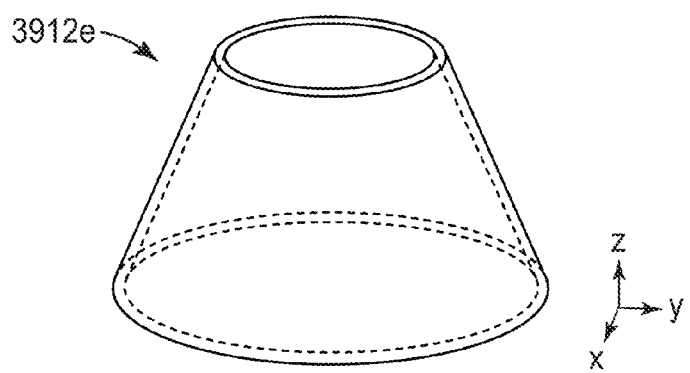

In some cases, a non-flat light guide used in the disclosed lighting devices may "wrap around itself" (figuratively speaking) to form a tube, such as a cylinder or cone. Examples of such non-flat tubular light guides are provided in FIGS. 39d and 39e. In FIG. 39d, a light guide 3912d is in the form of a right circular cylinder, having one major surface facing outwardly, an opposed major surface facing inwardly, and two open ends. At each of the open ends is an annular-shaped side surface through which light may be injected to provide guided-mode light. In alternative embodiments the cylinder may have a non-circular cross-sectional shape in the y-z plane, e.g., it may have an elliptical shape or polygonal shape in cross section. In FIG. 39e, a light guide 3912e is in the form of a truncated cone, having one major surface facing generally outwardly, an opposed major surface facing generally inwardly, and two open ends. Similar to the cylindrical light guide 3912d, an annular-shaped side surface is disposed at each of the open ends of the light guide 3912e. One or more light sources may be positioned at one or both annular side surfaces of the light guide to inject light into the tubular light guide.

Figure 40:
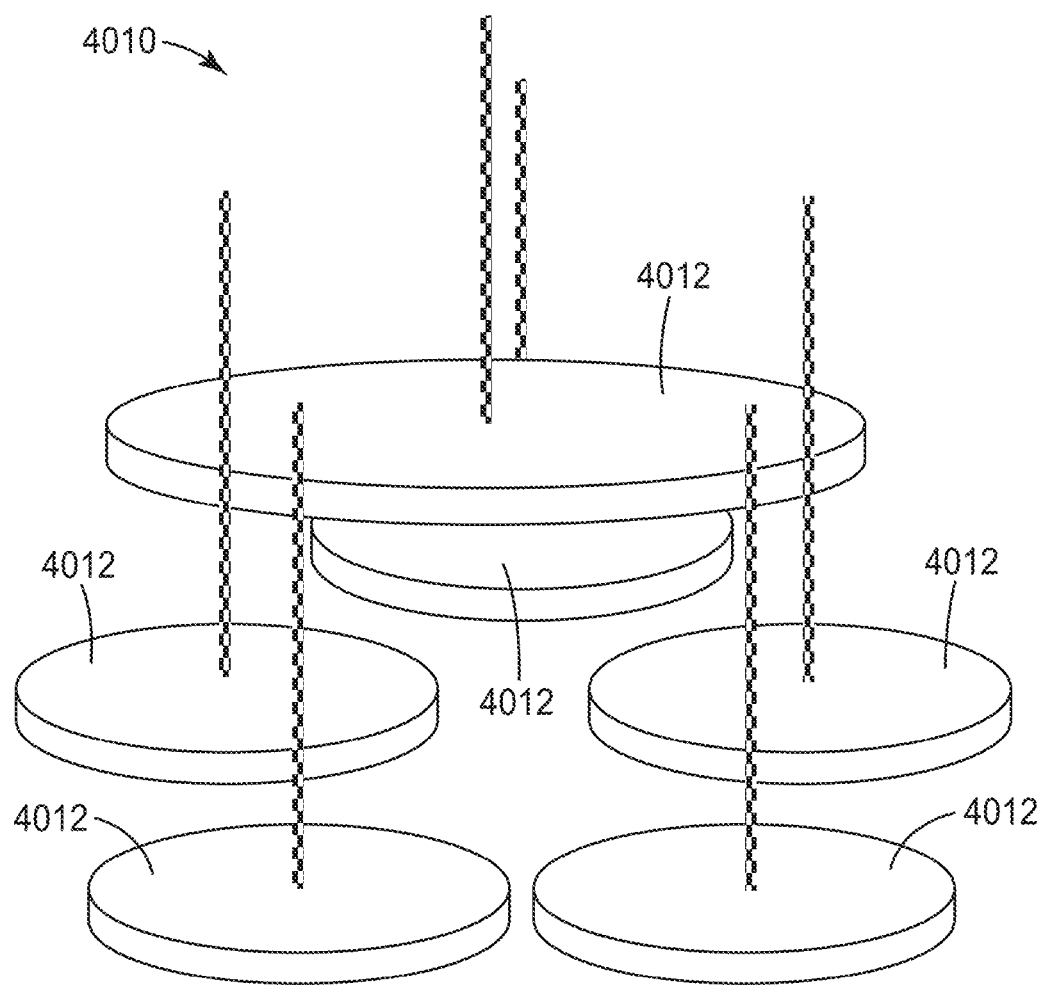
FIG. 40 is a schematic perspective view of a lighting device that includes multiple light guides that are suspended in close proximity to each other.

In some cases, the disclosed lighting devices may use multiple light guides that are not directly connected to each other. One such embodiment is shown in FIG. 40. There, a lighting device 4010 utilizes multiple light guides 4012 that are disposed in close proximity to each other. Each of the light guides is provided at least with one or more light sources to inject light into the light guide, and diffractive surface features to couple the resulting guided-mode light out of the light guide. The directionality, brightness (luminous output), and color of the various light guides 4012 may be tailored as desired to provide a desired illumination at a reference surface of interest, as well as a desired appearance to the ordinary user. Some or all of the light guides 4012 may have the same size, shape, and configuration, and some or all of the light guides 4012 may have substantially different sizes, shapes, and/or configurations. The light guides 4012 may all be suspended from or otherwise connected to a single support hub, such as a plate adapted to be affixed to a ceiling.

Numerous modifications can be made to the disclosed embodiments within the scope of the present description. For example, since the light guides can be made with low optical distortion, the disclosed devices can serve the dual function of a lighting device (such as a luminaire) and a window. When the light source(s) injecting light into the light guide are powered "on" or energized, the device may function primarily or exclusively as a lighting device. When the light source (s) are powered "off" or de-energized, the device may function primarily or exclusively as a window. If suitably mounted in a ceiling or roof of a home, building, factory, or similar structure, the device may function as a skylight to allow natural sunlight to enter the structure. The device may similarly be mounted (e.g. horizontally or at an incline) in a ceiling or roof of an automobile, truck, boat, airplane, or other mobile land-, water-, or air-vehicle for use as a sunroof or moonroof, the device also having the functionality of being able to provide illumination (e.g. at night) by energizing the light source(s). In addition to being mounted in ceilings or roofs, the disclosed devices can be suitably mounted (e.g. vertically) in walls or panels of stationary structures such as homes, buildings, etc., or of mobile vehicles such as automobiles, boats, etc., for use as a window through which objects can be perceived and/or through which natural sunlight can pass. Thus, for example, the object 124 in FIG. 1, the object 824 in FIG. 8, the light source 2024 in FIG. 20, and the light source 2034 in FIG. 20a, may be (or may be supplemented with) the sun, the moon, or other sources of natural light.

Furthermore, any and all of the disclosed lighting devices, including both those that have only one light guide and those that have multiple light guides, can be tailored to provide illumination of a desired color and a desired color uniformity at a reference surface of interest properly disposed relative to the lighting device, by appropriate selection of light sources and diffractive surface features, as discussed elsewhere herein. Thus, if desired, the light guide(s) and their respective light sources and diffractive surface features can be selected to provide illumination of a substantially uniform color, which may be a substantially white color or a non-white color, at the reference surface.

Furthermore, any and all of the disclosed lighting devices (including those defined in each of the claims below) can include or exhibit, or be readily modified or adapted to include or exhibit, one, some, or all of the various features disclosed herein, including but not limited to: a band or pattern of bands having a 3-dimensional appearance or shape that changes with viewing geometry; a patterned light transmissive layer that optically contacts some but not other diffractive surface features to define indicia; a subsurface a patterned low index subsurface layer within the light guide; diffractive features of different pitches in non-overlapping regions of the major surface; the light guide(s) may have a low optical distortion such that they can be used as windows in an "off" state; the light guide(s) may have a colorful appearance when viewed directly, but may provide illumination of a substantially uniform color on a reference surface of interest.

EXAMPLE 1

A lighting device suitable for use as a luminaire was made and evaluated. The device was similar in design to that of FIGS. 12, 12*a*, and 13. The device incorporated a circular-shaped light guide with diffractive surface features in the form of a spiral pattern, the diffractive surface features arranged into repeating patterns of six packet types with different groove or prism pitches. A mounting ring was used to position thirty-six equally spaced LEDs around the curved side surface of the light guide to inject light into the light guide. Further details of construction will now be given.

A precision diamond turning machine was used to cut a spiral-shaped groove pattern, which became the diffractive surface features in the lighting device after replication, into the copper surface of a cylindrical tool. The diamond was shaped so that the grooves had a sawtooth (asymmetric) profile in cross section similar to FIG. 6, with a height-to-pitch ratio (see FIG. 6) of about 1:1. During cutting, the groove pitch of the spiral was cycled between six specific values (315 nm, 345 nm, 375 nm, 410 nm, 445 nm, and 485 nm) to produce groove packets which formed nested annular regions that bordered each other but did not overlap with each other. Each annular region was a groove packet of constant pitch, and each set of six adjacent annular regions formed a repeating group or set of groove packets. The spiral pattern had an overall diameter of about 8 inches (about 20 centimeters). The radial dimensions or widths of the annular regions were selected so that the aggregate area for all of the six pitch values was the same. That is, the area of the entire grooved pattern was about 314 cm² ($\pi r^2$, where r≈10 cm), and the aggregate area for grooves having the 315 nm pitch was about 314/6≈52 cm², and the aggregate areas for grooves having each of the other five pitches was also about 52 cm². The annular regions were relatively narrow as measured radially, the maximum such dimension being about 150 micrometers.

The grooved surface of the resulting copper tool was then replicated in a thin flexible light-transmissive film (see e.g. layers 1111*b* and 1111*c* in FIG. 11) using a cast-and-cure technique. This was done by coating the grooved surface of the copper tool with an organic phosphonic acid release layer (commonly known to those skilled in the art), and casting an acrylate resin composition against the coated precision tool using a transparent polyethylene terephthalate (PET) support film having a thickness of about 5 mils (about 125 micrometers). The acrylate resin composition included acrylate monomers (75% by weight PHOTOMER 6210 available from Cognis and 25% by weight 1,6-hexanedioldiacrylate available from Aldrich Chemical Co.) and a photoinitiator (1% by weight Darocur 1173, Ciba Specialty Chemicals). The resin composition was then cured using ultraviolet light. This resulted in a microreplicated optical film about 125 microns thick and having diffractive surface features in the form of a negative or inverted version (negative replica) of the spiral-shaped groove pattern from the precision copper tool. The refractive index of the PET support film was about 1.49 and the refractive index of the cured acrylate resin was about 1.5. The microreplicated optical film had a transparent appearance when viewed at an angle normal to the surface of the film, with a slightly blue hue. Objects could be viewed through the film with low distortion.

Excess material around the spiral pattern was cut away so that the microreplicated film was circular in shape. The film was directly attached to one major surface of a clear, light-transmissive circular acrylic plate of thickness 3 mm, the plate also having a diameter of about 20 cm. Attachment was accomplished using a 1 mil (approximately 25 micrometer) thick optically clear pressure sensitive adhesive (Vikuiti™ OCA 8171 from 3M Company), with the microreplicated surface of the film facing away from the plate and exposed to air, and with substantially no air gaps between the film and the plate. The combination of the plate and the film resulted in a light guide with diffractive surface features on (only) one major surface thereof for light extraction, the light guide having a diameter of about 20 cm and a thickness of about 3 mm.

A string of 36 nominally identical LEDs (product code NCSL119T-H1 from Nichia), each LED emitting white light ("warm white") in a divergent distribution, was used for light injection into the light guide. The LEDs were mounted in a ring-shaped bezel so that they were equally spaced in 10 degree increments around the circular side surface of the light guide, each LED pointed towards the center of the light guide and disposed immediately adjacent the side surface to directly inject light into the light guide. For improved efficiency, strips of high reflectivity mirror film (3M™ Vikuiti™ ESR) were laminated on the inside surface of the mounting ring between every two neighboring LEDs, the mirror film strips also being immediately adjacent to the circular side surface of the light guide.

Figure 41A:
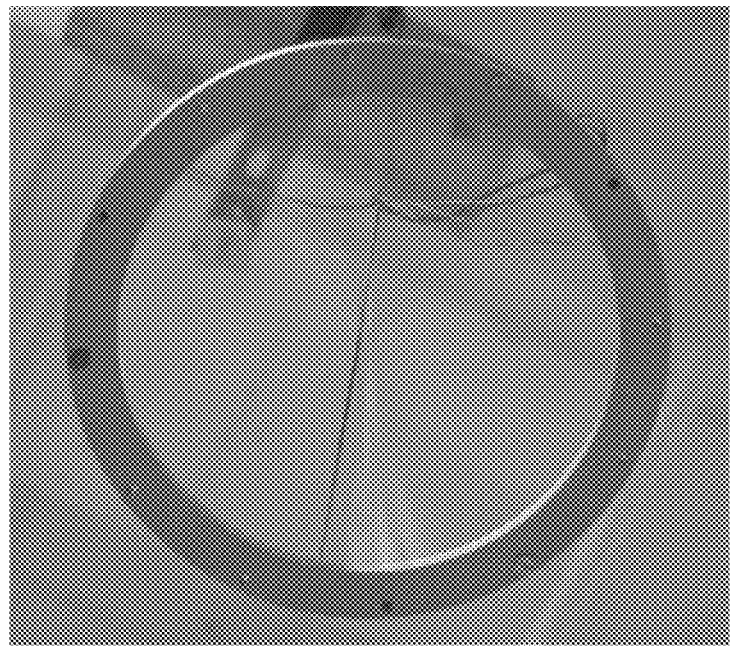
FIG. 41a is a photograph of a lighting device that was constructed using a circular light guide having curved diffractive surface structures, the lighting device photographed from an oblique viewing angle with ambient light on and the discrete light sources of the lighting device turned off.

The lighting device so constructed was connected to a power supply and suspended from the ceiling of a room. FIG. 41*a* is a photograph of the lighting device with the power supply turned off and ambient room lights turned on. The viewing direction for this photograph was slightly oblique, i.e., not directly beneath the lighting device along its symmetry or optical axis, but at a moderate angle relative to such axis. Note that details of the ceiling can be seen through the light guide with little or no significant distortion. Wires used to suspend the lighting device and connect it to the power supply can also be seen through the light guide. In this "off" state, the light guide had a slightly bluish hue similar to that of the microreplicated film by itself.

Figure 41B:
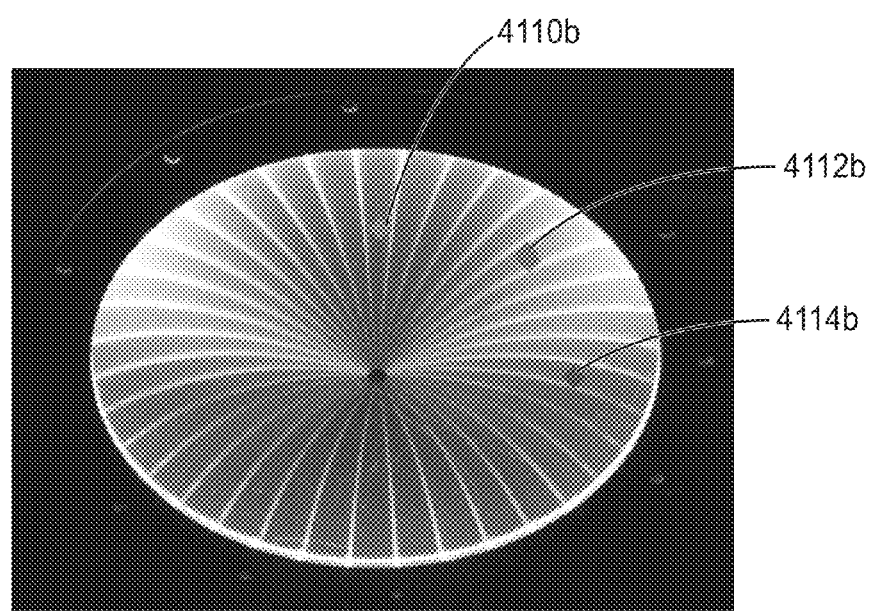
FIG. 41b is a photograph of the lighting device of FIG. 41a, but with ambient light off and the discrete light sources of the lighting device turned on, and at a slightly more oblique viewing angle, and with selected small areas or spots on the surface of the lighting device identified and labeled.
Figure 41C:
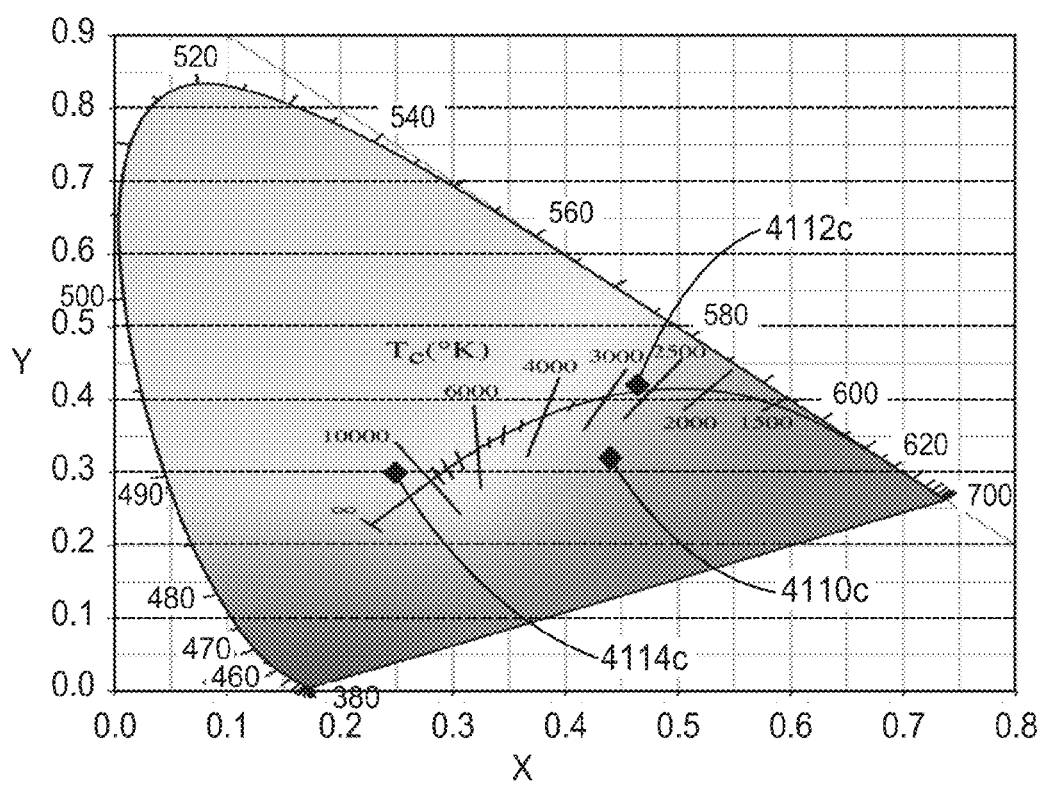
FIG. 41c is a graph of CIE chromaticity coordinates for the selected spots of FIG. 41b.

FIG. 41*b* is a photograph of the same lighting device at a somewhat more oblique viewing angle relative to that of FIG. 41*a*, but also with the power supply (and thus all 36 LEDs) turned on and the ambient room lights turned off Variable color hues could be seen at different areas of the light guide, the colors not being visible in the grayscale photograph of FIG. 41*b*. Bright bands could also be seen over the output area of the light guide, one band for each of the 36 energized light sources, and these bands are plainly visible in FIG. 41*b*. The bands can be seen to form a pattern having a 3-dimensional appearance. When observed at other viewing directions, the bright bands changed shape, and variable color hues could be seen across the light guide at virtually any viewing direction. Three small areas or points 4110*b*, 4112*b*, 4114*b* are identified in the photograph on the output area of the light guide between adjacent bright bands. The color at each of these points was measured in terms of the known CIE chromaticity (x,y) coordinates. The CIE (x,y) color coordinates, which are dimensionless, should not be confused with spatial (x,y) coordinates e.g. as in the Cartesian x-y-z coordinate systems shown in various figures herein. The measurement of color was done using a camera configured as a colorimeter, type PR-650 SpectraScan™ from Photo Research Inc., Chatsworth, Calif. Visually, the area 4110b had a dark red color, and is plotted as point 4110c on the CIE color coordinate scale of FIG. 41c. The area 4112b had an orange or brown color, and is plotted as point 4112c on the scale of FIG. 41c. The area 4114b had a blue color, and is plotted as point 4114c on scale of FIG. 41c. The CIE color difference between the points 4112c and 4114c was 0.25.

The lighting device of Example 1, with its extended area light guide and diffractive surface features, has the effect of converting the LED light sources, which when viewed directly with the eye appear as very bright point sources, into an extended area source with significantly lower luminance so that the lighting device can be directly viewed without hurting the eyes. The diffractive surface features not only serve the functional purpose of extracting guided-mode light out of the light guide, but also enhance the aesthetic appeal of the lighting device by adding attractive colors and the 3-dimensional band pattern when the lighting device is directly observed (e.g. as in FIG. 41b). We have found, however, that the aesthetic colors and bands seen by a user when looking directly at the lighting device need not detract from the ability of the lighting device to provide substantially uniform white light illumination for objects and surfaces remote from the lighting device.

Figure 42A:
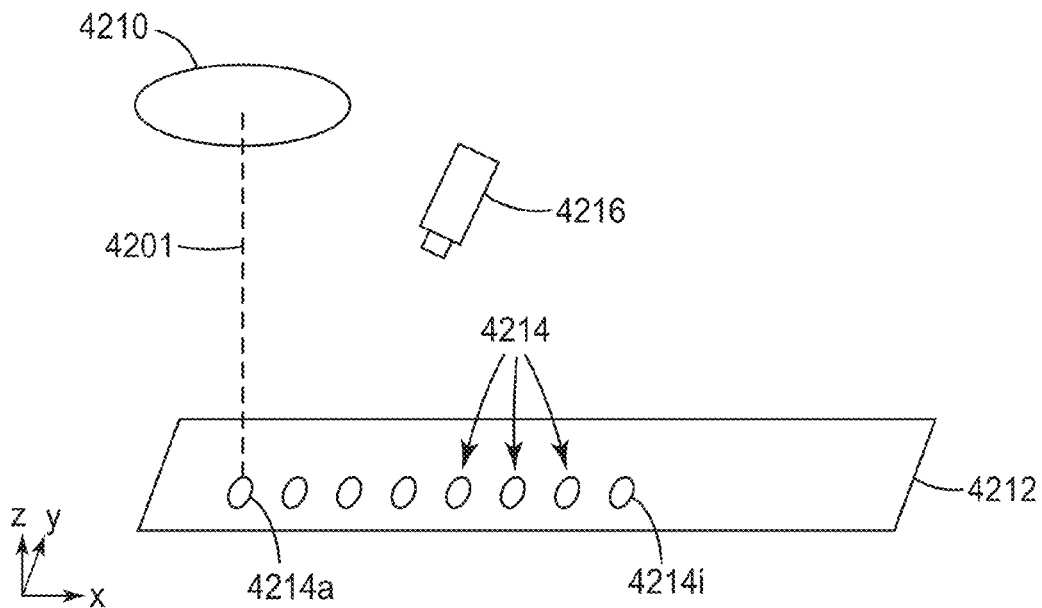
FIG. 42a is a schematic view of a setup used for measuring the optical properties of a reference surface illuminated by the lighting device of FIG. 41b.

The remote illumination produced by the Example 1 lighting device on a reference surface was tested using the setup shown in FIG. 42a. In this setup, item 4210 represents the Example 1 lighting device, suspended from the ceiling. The lighting device 4210 had an optical axis or symmetry axis 4201 which passed through the center of the disk-shaped light guide and was perpendicular to the light guide. In the figure, the optical axis 4201 is parallel to the z-axis of the Cartesian coordinate system. A flat reference surface 4212 extended parallel to the x-y plane, and was disposed at a distance D of 2.3 meters from the lighting device 4210, as measured along the optical axis 4201. The 2.3 meter distance D compares to the 20 cm characteristic transverse dimension L of the light guide (in this case, the maximum, minimum, and average transverse dimensions were equal to each other because of the circular shape of the light guide) by a factor of 10.1. The flat surface 4212 was covered with a white diffusely reflective film (product code DLR80 from E.I. du Pont de Nemours and Company) having a 98% reflectivity for visible light. A camera 4216 was then positioned as shown, oriented at an angle of about 30 degrees relative to the optical axis 4201, to obtain a color image of the white diffuse surface as illuminated solely by the Example 1 lighting device 4210. The PR-650 camera mentioned above was used as the camera 4216.

Due to the circular symmetry of the Example 1 lighting device, the illumination provided on the reference surface 4212 was also substantially circularly symmetric. This allowed us to effectively evaluate the color of the illumination over the entire (circular) measurement portion of the reference surface by measuring the color of a single row of small areas or points, which are collectively labeled 4214 in the figure. (Although 8 areas or points 4214 are shown in the figure, a total of 7 points were used for the measurements reported here.) The color at each of these small areas was measured using the PR-650 camera. The small areas were equally spaced along the x-axis, from a first area 4214a, which was aligned with the optical axis 4201, to a last area 4214i. Maximum illuminance Imax occurred at approximately the centrally located first area 4214a, and the illuminance dropped to Imax/e at a distance (radius) of about 1.85 meters from the central point or area 4214a. The distance from the first area 4214a to the last area 4214i was 183 cm, i.e., about 1.85 meters. The color measurements thus fairly represented the color variations present in a 3.7 meter diameter measurement portion corresponding to an illuminance threshold of Imax/e. Visually, the illuminated flat surface 4212 appeared nominally white with good spatial color uniformity over the measurement portion.

Figure 42B:
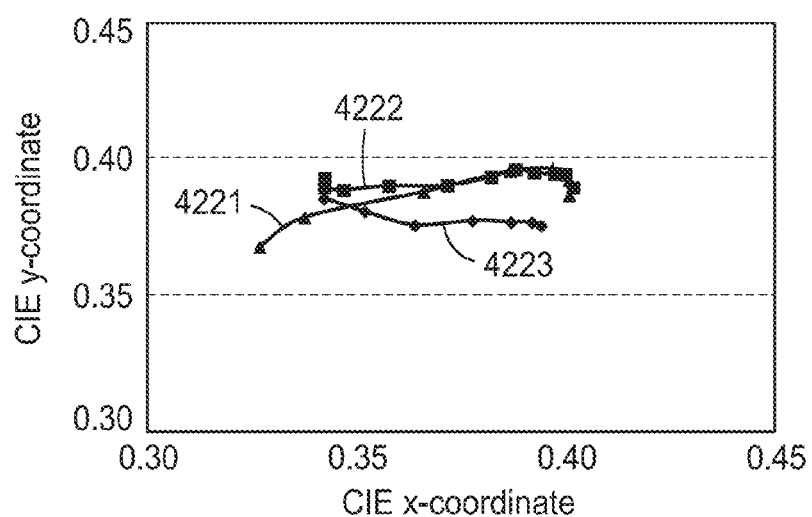
FIG. 42b is a graph of measured CIE chromaticity coordinates for selected spots representative of illuminated measurement portions for three different positions of the reference surface.

The measured CIE color coordinates for the areas 4214 are plotted on the CIE color coordinate scale of FIG. 42b. The measured colors define a curve 4223, having one endpoint corresponding to the color at area 4214a, and an opposite endpoint corresponding to the color at area 4214i. The camera 4216 thus measured a non-zero color variability within the Imax/e measurement portion for the lighting device 4210. However, the color variability was relatively small: the CIE color difference between the endpoints of the curve 4223 is 0.053. The overall color variability throughout the Imax/e measurement portion was thus less than 0.08, 0.07, and 0.06. Furthermore, all of the measured points on the curve 4223 remain close to the Planckian locus, and are within a substantially white region of the color spectrum.

Additional measurements were then taken for this Example 1 in substantially the same way as described above, except that the reference surface 4212 was positioned at a distance D of 1 meter, rather than 2.3 meters, from the lighting device 4210. This reduced the diameter of the Imax/e measurement portion from 3.7 meters to 1.83 meters. Color measurements were again taken by the camera 4216 along the single row of small equally spaced areas or points 4214, a first such area being aligned with the optical axis 4201, and having a maximum illuminance Imax, and a last such area being disposed at a distance of 91.4 cm from the first area, and having an illuminance of about Imax/e. The color measurements thus fairly represented the color variations present in a 1.83 meter diameter measurement portion corresponding to an illuminance threshold of Imax/e. Visually, the illuminated flat surface 4212 appeared nominally white, with a spatial color uniformity within the Imax/e measurement portion that was about as good as was measured at a distance D of 2.3 meters.

The measured CIE color coordinates for the areas 4214, for the case of D=1 meter, are also plotted on the CIE color coordinate scale of FIG. 42b. The measured colors define a curve 4222, having one endpoint corresponding to the color at the first area 4214a, and an opposite endpoint corresponding to the color at the last area 4214i. The camera 4216 thus measured a non-zero color variability within the Imax/e measurement portion for the lighting device 4210 for a reference surface disposed at this distance D=1 meter. However, the color variability was again relatively small: the CIE color difference between the endpoints of the curve 4222 is 0.059. The overall color variability throughout the Imax/e measurement portion was thus less than 0.08, 0.07, and 0.06. Furthermore, all of the measured points on the curve 4223 remain close to the Planckian locus, and are within a substantially white region of the color spectrum.

Still more measurements were then taken for this Example 1 in substantially the same way as described above, except that the reference surface 4212 was positioned at a distance D of 0.5 meters, rather than 1 or 2.3 meters, from the lighting device 4210. This reduced the diameter of the Imax/e measurement portion to 0.91 meters. Color measurements were again taken by the camera 4216 along the single row of small equally spaced areas or points 4214, a first such area being aligned with the optical axis 4201, and having a maximum illuminance Imax, and a last such area being disposed at a distance of 45.7 cm from the first area, and having an illuminance of about Imax/e. The color measurements thus fairly represented the color variations present in a 0.91 meter diameter measurement portion corresponding to an illuminance threshold of Imax/e. Visually, the illuminated flat surface 4212 appeared nominally white, with a spatial color uniformity within the Imax/e measurement portion that was not as small as was measured at distances D of 2.3 meters and 1 meter.

The measured CIE color coordinates for the areas 4214, for the case of D=0.5 meters, are also plotted on the CIE color coordinate scale of FIG. 42b. The measured colors define a curve 4221, having one endpoint corresponding to the color at the first area 4214a, and an opposite endpoint corresponding to the color at the last area 4214i. The camera 4216 thus measured a non-zero color variability within the Imax/e measurement portion for the lighting device 4210 for a reference surface disposed at this distance D=0.5 meter. The color variability was characterized by a CIE color difference between the endpoints of the curve 4221 equal to about 0.078. The overall color variability throughout the Imax/e measurement portion was thus less than 0.08. Furthermore, all of the measured points on the curve 4223 remain close to the Planckian locus, and are within a substantially white region of the color spectrum.

EXAMPLE 2

Another light source was combined with the lighting device of Example 1 to provide a modified lighting device. The additional light source was a conventional flashlight that could be positioned behind the light guide and pointed so as to project light from the flashlight through the light guide as non-guided-mode light, onto reference surfaces of interest. The distortion of the light guide was low, such that light from the flashlight was not substantially deviated by the light guide. The modified lighting device could be controlled such that the LED light sources injecting light into the light guide could be powered "on" while the flashlight was powered "off", or vice versa, or both the LED light sources and the flashlight could be powered "on" to provide a combined illumination onto reference surfaces of interest.

EXAMPLE 3

Another lighting device suitable for use as a luminaire was made and evaluated. The device incorporated a rectangular-shaped light guide with diffractive surface features. The diffractive surface features were a portion of the spiral-shaped groove pattern described in Example 1, the portion taken from a central rectangular region of the spiral pattern. A light source module was mounted along one of the short edges of the rectangular light guide, the light source module containing one row of eighteen equally spaced individual, discrete light sources, the light sources being nominally identical LEDs each emitting white light in a divergent distribution. The light guide also incorporated a patterned low index subsurface layer in the form of a random gradient dot pattern. Further details of construction will now be given.

The following ingredients were combined in a 1-liter wide-mouth amber bottle: 5.70 g of an aliphatic urethane oligomer (product code CN 9893 from Sartomer Company, Exton, Pa.), and 22.40 g of pentaerythritol triacrylate (product code SR 444, also from Sartomer Company). The bottle was capped and shaken for 2 hours to dissolve the CN9893 to produce a clear batch. This solution, referred to as a resin premix, was combined with 482.84 g of silane treated (product code Silquest™ A-174 from Momentive Performance Materials, Friendly, W. Va.) colloidal silica (product code NALCO 2327 from Nalco Chemical Co., Naperville, Ill.) in a 2000 mL poly bottle. These components were mixed by transferring the batch back and forth between the two bottles, ending with the batch in the 2000 mL poly bottle. To this bottle was added, 5.84 g of a first photoinitiator (product code IRGACURE™ 184 from Ciba Specialty Chemicals Corp., Tarrytown, N.Y.) and 1.12 g of a second photoinitiator (product code IRGACURE™ 819, also from Ciba Specialty Chemicals Corp.). The solution was shaken for 30 minutes to dissolve the photoinitiators. The resulting batch was a translucent, low-viscosity dispersion. The batch was then diluted to about 17.7% solids by weight with a 50/50 blend ethyl acetate and propylene glycol methyl ether (available from Dow Chemical as DOWANOL PM), to yield a coating formulation.

The coating formulation was coated onto a 50 micron thick PET film (MELINEX 617, available from DuPont) using a slot die at a line speed of 3.1 meters/minute. The wet coating thickness was approximately 8.1 microns. In an inert chamber (<50 ppm $O_2$), the wet coating was partially cured in-line at the same line speed with UV radiation at 395 nm and dose of 850 mJ/$cm^2$. The UV radiation was provided by UV-LEDs available from Cree, Inc. The partially cured coating sample was then dried at 70° C. in a 9 meter oven, and under a nitrogen-purged atmosphere, finally cured with a 236 Watt/$cm^2$ Fusion H bulb (available from Fusion UV Systems, Inc.). The resulting nanovoided polymeric layer had a thickness of 1.3 microns. The transmission was 96.4%, the haze was 1.33%, and the clarity was 99.7%, as measured using a BYK gardner Haze Gard Plus (Columbia, Md.) instrument. The refractive index of the nanovoided layer was between 1.20 and 1.22 as measured at 589 nm using a Metricon Prism Coupler (Metricon Corporation, Pennington, N.J.).

Figure 43:
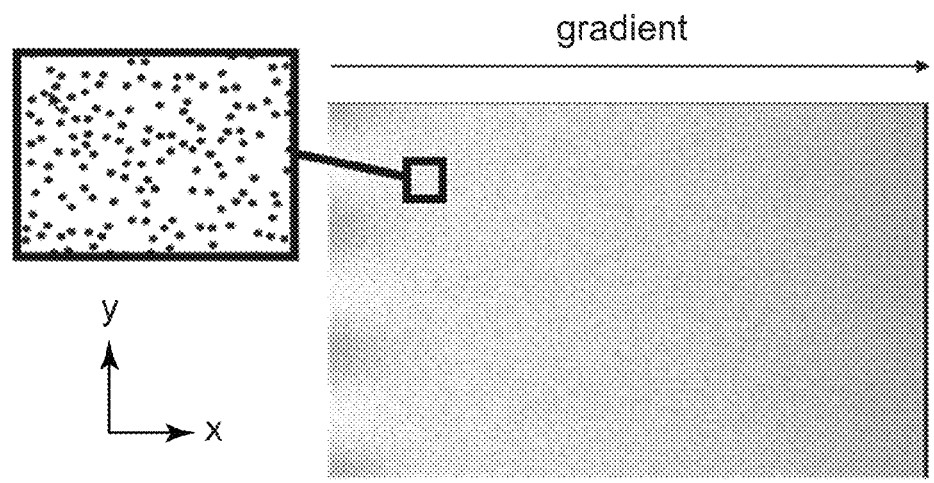
FIG. 43 is a photograph (with a magnified schematic inset) of a random gradient dot pattern similar to one used to form a patterned low index subsurface layer for a lighting device.

The nanovoided polymeric layer, still disposed on the 50 micron PET carrier film, was printed with a UV curable clear ink (UV OP1005 GP Varnish from Nazdar, Shawnee, Kans.) using an indirect gravure printing process. A flexographic tool was fabricated to have a random 100 micron gradient dot pattern, the density of the dots varying in an in-plane x-direction and being relatively constant in an orthogonal in-plane y-direction. The gradient pattern was similar to that shown in the photograph of FIG. 43. A gravure roll (pyramidal and 9 cubic microns per square micron) was rated to give a wet coating of approximately 9.65 microns. The printing was done at 10 meters per minute with high intensity UV curing under a nitrogen-purged atmosphere with a 236 Watt/$cm^2$ Fusion H bulb (available from Fusion UV Systems, Inc.) after the printing. The resulting printed layer was made up of: first regions having the nanovoided polymeric material, the first regions having a first refractive index; and second regions having the same nanovoided polymeric material but wherein the nanovoids were filled or partially filed with the cured clear ink, the second regions having a second refractive index greater than that of the first regions. The optical film consisting of this dot-printed nanovoided layer atop the 50 micron PET carrier film was substantially transparent, and objects could be seen with little distortion when looking through the film. Optical properties of this optical film, before being incorporated into the light guide, were measured using the BYK Gardner Haze Gard Plus instrument. Measurements made on one side or end of the film, at which the random gradient dot pattern had a low density, were: 96.6% transmission; 3.56% haze; and 95.6% clarity. Measurements made on the opposite side or end of the film, at which the random gradient dot pattern had a high density, were: 95.8% transmission; 6.82% haze; and 89.9% clarity. Note that the transmission measurements reported here are not corrected for Fresnel reflections at the outer surfaces of the film. The refractive index of the cured ink was measured to be approximately 1.525 as measured on a flat cured sample using a Metricon prism coupler (wavelength of light used to measure the refractive index was 589 nm).

A lighting device was then made using this dot-printed optical film together with a rectangular acrylic plate, a rectangular piece or portion of the microreplicated optical film (having the spiral multi-pitch diffractive surface features) described above in Example 1, and a linear array of discrete light sources. The dot-printed nanovoided layer of the dot-printed optical film was used as a patterned low index subsurface layer to spatially control the interaction of guided-mode light with curved diffractive surface features. A rectangular section or piece was cut out of a microreplicated optical film as described in Example 1, the center of the rectangular piece substantially coinciding with the center of the spiral groove pattern. The rectangular piece had a major in-plane dimension (length) of about 6 inches (about 150 mm) and a minor in-plane dimension (width) of about 4 inches (about 100 mm). A rectangular acrylic (PMMA) plate was obtained having a major in-plane dimension (length) of about 6 inches (about 150 mm), a minor in-plane dimension (width) of about 4 inches (about 100 mm), and a thickness of 3 mm. A piece of the dot-printed optical film described above was attached to one of the major surfaces of the acrylic plate using a pressure sensitive adhesive, 3M Optically clear adhesive 8171. The rectangular piece of the microreplicated optical film was attached to the opposite side of the dot-printed optical film using an additional layer of 3M Optically Clear Adhesive 8171, such that the microreplicated surface (diffractive surface features) faced away from the acrylic plate and was exposed to air, and such that the dot-printed nanovoided layer was buried or sandwiched between the microreplicated film and the acrylic plate with substantially no air gaps between the film pieces and the plate, the dot-printed nanovoided layer thus forming a patterned low index subsurface layer. The combination of the films and the plate resulted in a light guide with diffractive surface features on (only) one major surface thereof, the light guide having in-plane dimensions of about 6 inches and 4 inches (about 150 mm and 100 mm) and a thickness of about 3 mm.

Figure 44A:
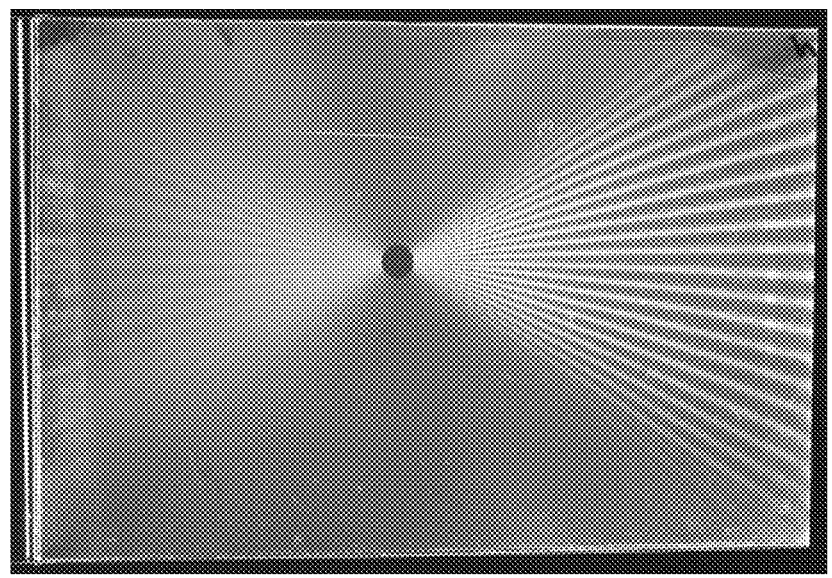
FIG. 44a is a photograph of a lighting device having a rectangular light guide, curved diffractive surface features, and a patterned low index subsurface layer (similar to that shown in FIG. 43)
Figure 44B:
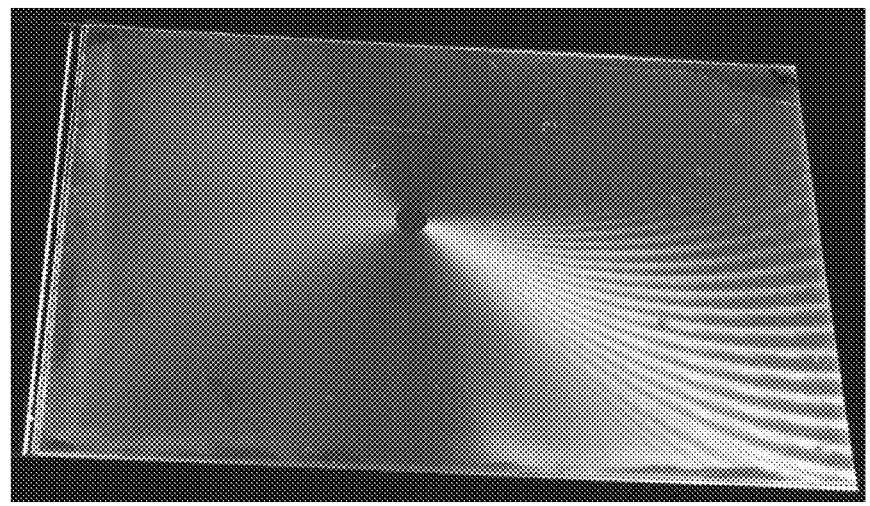
FIG. 44b is a photograph of the lighting device of FIG. 44a at an oblique viewing angle.

The light guide so constructed was then placed into an illumination test fixture which contained a light source module having eighteen equally spaced discrete light sources, the light sources being nominally identical LEDs (product code NCSL119T-H1 from Nichia), each LED emitting white light ("warm white") in a divergent distribution. The light source module was mounted along the short side of the light guide. The light sources were energized with a power supply and photographs were taken of the lighting device from various viewing geometries. A strip of black electrical tape was placed on one side of the LED array to block stray light, emitted in sideways directions from the LEDs, from reaching the camera. A photograph of the lighting device when viewed from a position substantially perpendicular to the face of the light guide is shown in FIG. 44*a*. In this view, the light sources are on the right side of this figure. A photograph of the same lighting device when viewed at an oblique angle to the plane of the light guide is shown in FIG. 44*b*. As a result of the gradient patterned low index subsurface layer, the lighting device exhibited a uniform-appearing luminance distribution when looking at the light guide, and also provided, on a diffusive surface located 1 meter from the light guide approximately along the optical axis, illumination that was substantially uniform in color. Bright bands associated with the discrete light sources can be clearly seen in each of the viewing geometries, and the bands were observed to change in shape and curvature with viewing geometry. Variable color hues could also be seen at different areas of the light guide, but the colors are not visible in the grayscale photograph of the figures.

EXAMPLE 4

Another lighting device suitable for use as a luminaire was made and evaluated. The device incorporated a circular-shaped light guide with diffractive surface features. The diffractive surface features filled 36 triangle-shaped areas which were uniformly sized and tiled to substantially fill the circular area of the light guide. The diffractive surface features in each of the triangle-shaped areas were straight and parallel to each other, and of a single pitch, although three different triangle types of three different pitches were used. A mounting ring was used to position thirty-six equally spaced LEDs around the curved side surface of the light guide to inject light into the light guide. Indicia in the shape of a United States map was formed by patterned printing on the diffractive surface features. Further details of construction will now be given.

A precision diamond turning machine was used to cut linear grooves into the copper surface of a cylindrical tool. The diamond was shaped so that the grooves had a sawtooth (asymmetric) profile in cross section similar to FIG. 6, with a height-to-pitch ratio (see FIG. 6) of about 1:1. During cutting, the groove pitch was maintained at a constant value of about 310 nm to produce a first single-pitch one-dimensional diffraction grating tool. This procedure was then repeated in another copper surface using a different groove pitch, the pitch now being maintained at a constant value of about 345 nm to produce a second single-pitch one-dimensional diffractive grating tool. The procedure was repeated a third time in still another copper surface using a third groove pitch, the third pitch being maintained at a constant value of about 410 nm to produce a third single-pitch one-dimensional diffractive grating tool.

The grooved surfaces of the resulting three copper tools were then replicated in three corresponding thin flexible light-transmissive films (see e.g. layers 1111*b* and 1111*c* in FIG. 11) using a cast-and-cure technique. This was done by coating the grooved surface of each copper tool with an organic phosphonic acid release layer (commonly known to those skilled in the art), and casting an acrylate resin composition against the coated precision tool using a transparent polyethylene terephthalate (PET) support film having a thickness of about 5 mils (about 125 micrometers). The acrylate resin composition included acrylate monomers (75% by weight PHOTOMER 6210 available from Cognis and 25% by weight 1,6-hexanedioldiacrylate available from Aldrich Chemical Co.) and a photoinitiator (1% by weight Darocur 1173, Ciba Specialty Chemicals). The resin composition was then cured using ultraviolet light. This resulted in three microreplicated optical films, each about 125 microns thick and having diffractive surface features in the form of negative or inverted versions (negative replicas) of the linear groove pattern from the first, second, and third precision copper tools, respectively. The refractive index of the PET support film was about 1.49 and the refractive index of the cured acrylate resin was about 1.5. Each of the microreplicated optical films had a transparent appearance when viewed at an angle normal to the surface of the film, with a slightly blue hue. Objects could be viewed through each film with low distortion.

The microreplicated optical films were then physically cut into triangle-shaped pieces, twelve such pieces obtained from each of the first, second, and third optical films. The pieces were substantially identically shaped into isosceles triangles with two long edges and one short edge, the long edges each being about 100 mm in length and the short edge being about 17 mm in length. The pieces were all cut from their respective optical films such that the diffractive surface features completely filled one major surface of the triangle piece, and the individual grooves or prisms of the diffractive surface features were all parallel to the short edge of the triangle shape.

All thirty-six of the triangle-shaped pieces of optical film were then directly attached to one major surface of a clear, light-transmissive circular acrylic plate of thickness 3 mm, the plate having a diameter of about 20 cm. For the attachment, the triangle-shaped pieces were laid next to each other in a tiled arrangement with the long edges of adjacent pieces abutting each other, and with the short edges of the pieces forming a thirty-six sided shape approximating a circle and substantially coinciding with the circular outer side surface of the acrylic plate. The film pieces were also arranged in a repeating sequential 1,2,3,1,2,3, . . . fashion such that any given piece from the first film abutted a piece from the second film along one long edge and abutted a piece from the third film along the other long edge. Attachment of the pieces to the plate was accomplished using a 1 mil (approximately 25 micrometer) thick optically clear pressure sensitive adhesive (Vikuiti™ OCA 8171 from 3M Company), with the microreplicated surface of each film piece facing away from the plate and exposed to air, and with substantially no air gaps between each film piece and the plate. The combination of the plate and the thirty-six film pieces resulted in a light guide with diffractive surface features on (only) one major surface thereof for light extraction, the light guide having a diameter of about 20 cm and a thickness of about 3 mm.

A sheet of lined optically clear pressure sensitive adhesive (PSA) was then obtained and printed with a curable ink in the pattern of a United States map. After the ink was cured, the resulting printed sheet was joined to the light guide by pressing the printed sheet against the surface of the microreplicated optical film pieces containing the diffractive surface features. Portions of the PSA layer that were not coated with the cured ink, corresponding to the background areas of the map image, flowed into and filled the spaces between the diffractive surface features, so that optical contact was made between the PSA layer, which had a refractive index of about 1.475, and the diffractive surface features, which had a refractive index of about 1.5. Portions of the PSA layer that were coated with the cured ink, corresponding to the foreground areas of the map image, did not flow into or make optical contact with the diffractive surface features due to the presence of the glass-like cured ink. In those areas, a very thin air pocket or layer remained between the cured ink and the diffractive surface features such that the diffractive surface features were in optical contact with air. The combination of the light guide (the plate and the optical film pieces) and the printed sheet resulted in a light guide with diffractive surface features on (only) one major surface thereof for light extraction, and with patterned printing forming indicia (a United States map image), the light guide having a diameter of about 20 cm and a thickness of about 3 mm.

A string of 36 nominally identical LEDs (product code NCSL119T-H1 from Nichia), each LED emitting white light ("warm white") in a divergent distribution, was used for light injection into the light guide. The LEDs were mounted in a ring-shaped bezel so that they were equally spaced in 10 degree increments around the circular side surface of the light guide, each LED pointed towards the center of the light guide and disposed immediately adjacent the side surface to directly inject light into the light guide. For improved efficiency, strips of high reflectivity mirror film (3M™ Vikuiti™ ESR) were laminated on the inside surface of the mounting ring between every two neighboring LEDs, the mirror film strips also being immediately adjacent to the circular side surface of the light guide.

Figure 45:
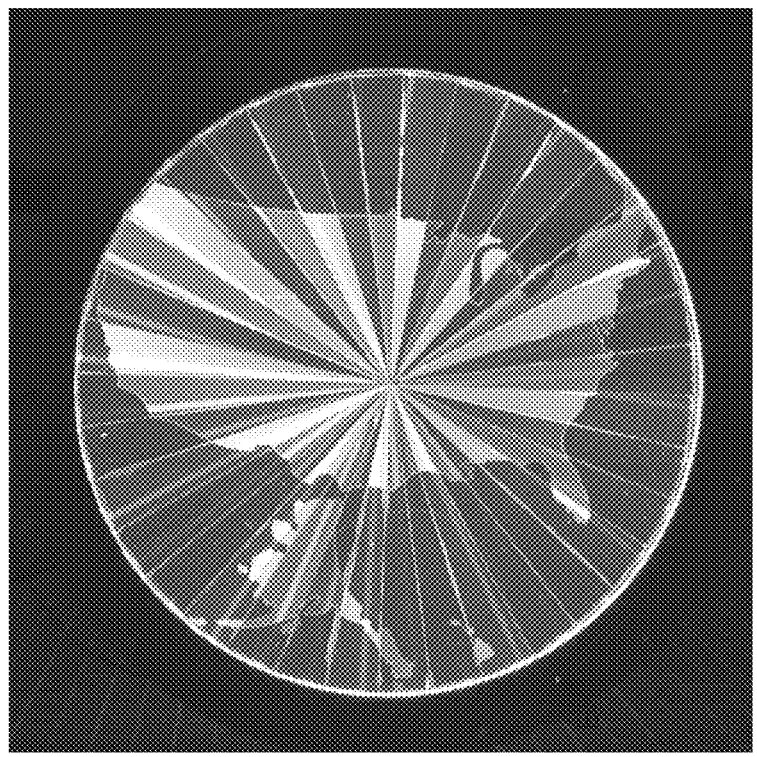
FIG. 45 is a photograph of another lighting device that was constructed and tested.

The lighting device so constructed was connected to a power supply and placed sideways on a table in a laboratory setting. With the power supply turned off and in ambient room light, objects across the room could be seen through the light guide with little or no significant distortion. Furthermore, in this "off" state, the light guide had a slightly bluish hue similar to that of the microreplicated film by itself, and the printed image of the U.S. map could not be easily perceived. FIG. 45 is a photograph of the lighting device of this Example 2 with the power supply (and thus all 36 LEDs) turned on and the ambient room lights turned off. The U.S. map of the patterned printing is clearly visible, and the contrast between printed regions and remaining regions is high. Variable color hues could also be seen at different areas of the light guide, with different triangle-shaped areas having different colors (particularly in the foreground areas of the map image) which are discernible in FIG. 45 even though the colors themselves are not visible due to the grayscale format of the photograph. Straight radial border features, which are relatively bright and caused by light scattering at the edges of the individual triangle-shaped pieces, can also be seen in the photograph. In addition to these bright border features, additional fainter radial bands can also be seen in some places over the output area of the light guide, superimposed on the printed pattern, these fainter bands being associated with particular ones of the energized light sources. The fainter bands are all relatively straight (radial) with little or no curvature from the viewing geometry of FIG. 45, but their shape changed as a function of viewing angle in a 3-dimensional fashion in the same way as the bright bands of Example 1 changed. Variable color hues could also be seen across the light guide at virtually any viewing direction.

The teachings of this application can be used in combination with the teachings of any or all of the following commonly assigned patent application publications, which are incorporated herein by reference and were filed on the same date as the present application: US 2014/0043846 (Yang et al.); US 2014/0043850 (Thompson et al.) (granted as U.S. Pat. No. 8,834,004 (Thompson et al.); and US 2014/0043847 (Yang et al.).

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. The reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A luminaire, comprising:
a light guide having opposed major surfaces, at least one of the major surfaces having diffractive surface features therein adapted to couple guided-mode light out of the light guide;
a first light source configured to inject light into the light guide; and
a second light source configured to project light through the light guide as non-guided-mode light.

2. The luminaire of claim 1, wherein the light guide has a low optical distortion such that the light projected by the second light source is not substantially deviated by the light guide.

3. The luminaire of claim 1, wherein the opposed major surfaces include a first major surface opposed to a second major surface, wherein the projected light from the second light source enters the first major surface and exits the second major surface, and wherein the diffractive surface features are configured to couple more guided-mode light out of the second major surface than out of the first major surface.

4. A luminaire, comprising:
a framework comprising a plurality of interconnected support members;
a plurality of light guides attached to the framework, each of the light guides having opposed major surfaces, at least one of the major surfaces of each light guide having diffractive surface features therein adapted to couple guided-mode light out of the light guide; and
a plurality of light sources disposed on and/or in the support members, the light sources being distributed to inject light into all of the light guides;
wherein at least some of the light guides are substantially co-planar.

5. The luminaire of claim 4, wherein all of the light guides are substantially co-planar.

6. A luminaire, comprising:
a framework comprising a plurality of interconnected support members;
a plurality of light guides attached to the framework, each of the light guides having opposed major surfaces, at least one of the major surfaces of each light guide having diffractive surface features therein adapted to couple guided-mode light out of the light guide; and
a plurality of light sources disposed on and/or in the support members, the light sources being distributed to inject light into all of the light guides;
wherein at least some of the light guides are arranged in a helix.

7. A luminaire, comprising:
a framework comprising a plurality of interconnected support members;
a plurality of light guides attached to the framework, each of the light guides having opposed major surfaces, at least one of the major or surfaces of each light guide having diffractive surface features therein adapted to couple guided-mode light out of the light guide; and
a plurality of light sources disposed on and/or in the support members, the light sources being distributed to inject light into all of the light guides;
wherein at least some of the light guides collectively form a concave shape.

8. A luminaire, comprising:
a framework comprising a plurality of interconnected support members;
a plurality of light guides attached to the framework, each of the light guides having opposed major or surfaces, at least one of the major surfaces of each light guide having diffractive surface features therein adapted to couple guided-mode light out of the light guide; and
a plurality of light sources disposed on and/or in the support members, the light sources being distributed to inject light into all of the light guides;
wherein the light guides collectively form a 3-dimensional structure that is closed and hollow.

9. A lunnuaire, comprising:
a framework comprising a plurality of interconnected support members;
a plurality of light guides attached to the framework, each of the light guides having opposed major surfaces, at least one of the major surfaces of each light guide having diffractive surface features therein adapted to couple guided-mode light out of the light guide; and
a plurality of light sources disposed on and/or in the support members, the light sources being distributed to inject light into all of the light guides;
wherein the plurality of light sources include light sources of substantially different first, second, and third output colors, and wherein the light sources are distributed such that at least a first one of the light guides is illuminated predominantly with light source(s) of the first output color, at least a second one of the light guides is illuminated predominantly with light source(s) of the second output color, and at least a third one of the light guides is illuminated predominantly with light source(s) of the third output color.

10. A luminaire, comprising:
a plurality of light guides, each of the light guides having opposed major surfaces, at least one of the major surfaces of each light guide having diffractive surface features therein adapted to couple guided-mode light out of the light guide; and
a plurality of light sources configured to inject light into the plurality of light guides;
wherein at least sonic of the light guides are arranged in a helix.

11. A luminaire, comprising:
a plurality of light guides, each of the light guides having opposed major surfaces, at least one of the major surfaces of each light guide having diffractive surface features therein adapted to couple guided-mode light out of the light guide; and
a plurality of light sources configured to inject light into the plurality of light guides;
wherein the light guides collectively form a concave shape.

12. The luminaire of claim 11 wherein the concave shape is an open concave shape.

13. A luminaire of claim 11, wherein the concave shape is a tubular shape with open ends.

14. A luminaire, comprising:
a plurality of light guides, each of the light guides having opposed major surfaces, at least one of the major surfaces of each light guide having diffractive surface features therein adapted to couple guided-mode light out of the light guide; and a plurality of light sources configured to inject light into the plurality of light guides;

wherein the light guides collectively form a 3-dimensional structure that is closed and hollow.

15. A luminaire, comprising:

a tube-shaped light guide, the light guide having a first major surface on which diffractive surface features are formed, the diffractive surface features adapted to couple guided-mode light out of the light guide; and a first light source configured to inject light into the light guide.

16. The luminaire of claim 15, wherein the tube-shaped light guide is hollow and has two open ends and an annular-shaped side surface proximate one of the open ends.

17. The luminaire of claim 16, wherein the first light source is disposed to inject light into the annular-shaped side surface.

18. The luminaire of claim 15, wherein the tube-shaped light guide is substantially cylindrical in shape.

19. The luminaire of claim 15, wherein the tube-shaped light guide is substantially conical in shape.

20. An optical device, comprising:

a light guide having opposed major surfaces, at least one of the major surfaces having diffractive surface features therein adapted to couple guided-mode light out of the light guide; and a patterned low index subsurface layer configured to selectively block some guided mode light from reaching at least some of the diffractive surface features.

21. The device of claim 20, wherein the patterned low index subsurface layer comprises first and second layer portions, the first layer portions comprising nanovoided polymeric material.

22. The device of claim 21, wherein the second layer portions comprise the nanovoided polymeric material and an additional material.

23. The device of claim 21, wherein the second layer portions comprise a polymer material that is not nanovoided.

24. The device of claim 20 the patterned low index subsurface layer is composed of one or more polymer materials none of which are nanovoided.

25. The device of claim 20, further comprising a light source disposed to inject light into the light guide.

* * * * *

UNITED STATES PATENT AND TRADEMARK OFFICE
CERTIFICATE OF CORRECTION

PATENT NO. : 8,944,662 B2  
APPLICATION NO. : 13/572835  
DATED : February 3, 2015  
INVENTOR(S) : Thompson et al.

Page 1 of 1

It is certified that error appears in the above-identified patent and that said Letters Patent is hereby corrected as shown below:

In the Specification,

Col. 7, line 18, delete "spectrally," and insert -- specularly, --

Col. 7, line 18, delete "semi-spectrally," and insert -- semi-specularly, --

In the Claims,

Col. 53, line 67, in Claim 7, after "major" delete "or"

Col. 54, line 12, in Claim 8, after "major" delete "or"

Col. 54, line 21, in Claim 9, delete "lunnuaire," and insert -- luminaire, --

Col. 54, line 50, in Claim 10, delete "sonic" and insert -- some --

Col. 54, line 61, in Claim 12, delete "11" and insert -- 11, --

Col. 56, line 18, in Claim 24, delete "20" and insert -- 20, wherein --

Signed and Sealed this  
Thirtieth Day of June, 2015

Michelle K. Lee  
*Director of the United States Patent and Trademark Office*